United States Patent
McClintock et al.

(10) Patent No.: US 7,797,889 B2
(45) Date of Patent: Sep. 21, 2010

(54) SOLAR PANEL AND FRAME AND RELATED METHODS

(75) Inventors: Meredith McClintock, Portola Valley, CA (US); Steven Scott, Poway, CA (US)

(73) Assignee: Telesis Solar, Inc., Portola Valley, CA (US)

( * ) Notice: Subject to any disclaimer, the term of this patent is extended or adjusted under 35 U.S.C. 154(b) by 0 days.

(21) Appl. No.: 12/013,328

(22) Filed: Jan. 11, 2008

(65) Prior Publication Data

US 2008/0172955 A1 Jul. 24, 2008

Related U.S. Application Data

(63) Continuation of application No. PCT/US2006/026968, filed on Jul. 11, 2006.
(60) Provisional application No. 60/778,771, filed on Mar. 2, 2006, provisional application No. 60/698,385, filed on Jul. 11, 2005.

(51) Int. Cl.
*E04D 13/18* (2006.01)
(52) U.S. Cl. .................... 52/173.3; 52/204.1; 52/204.5; 52/656.5
(58) Field of Classification Search ............... 52/173.3, 52/204.1, 204.5, 656.1, 653.1, 656.5, 663; 126/569, 704, 714; 136/251, 244, 246; 248/237, 248/346.01
See application file for complete search history.

(56) References Cited

U.S. PATENT DOCUMENTS

| | | | | |
|---|---|---|---|---|
| 4,205,486 A | * | 6/1980 | Guarnacci | 49/501 |
| 4,336,413 A | * | 6/1982 | Tourneux | 136/251 |
| 4,422,443 A | * | 12/1983 | Arendt | 126/570 |
| 4,454,703 A | * | 6/1984 | Sitzler et al. | 52/786.1 |

(Continued)

FOREIGN PATENT DOCUMENTS

DE 2637123 A * 2/1978

(Continued)

*Primary Examiner*—Brian E Glessner
*Assistant Examiner*—Adriana Figueroa
(74) *Attorney, Agent, or Firm*—Perkins Coie LLP

(57) ABSTRACT

In one embodiment, an apparatus is provided. The apparatus includes a first rail coupled to a second rail, a third rail coupled to the second rail, and a fourth rail coupled to the first rail and the third rail. The apparatus may form a rectangular frame from the four rails. The rails may be coupled through use of corner connectors or may be mitered and coupled through use of brackets in an abutting relationship. Additionally, further rails may be added by interposing the additional rails between a pair of the first, second, third and fourth rails, to extend the frame, and such additions may involve connectors or abutting rails and brackets, for example. The rails may have support ledges. Alternatively, the rails may have slots allowing for support brackets which slide along the slots. Moreover, the rails may be anchored using roof anchoring components to various surfaces. Additionally, the rails may support photovoltaic or other solar panels, and may have caps or top brackets to maintain the position of such solar panels.

In another embodiment, a method is provided. The method includes reviewing solar days of a site. The method further includes reviewing geographical features of the site. Also, the method includes estimating a guarantee of available solar energy for the site. Moreover, the method includes installing a solar system at the site.

14 Claims, 51 Drawing Sheets

U.S. PATENT DOCUMENTS

| | | | |
|---|---|---|---|
| 4,527,545 A * | 7/1985 | Bertels | 126/636 |
| 4,555,869 A * | 12/1985 | Kenkel | 49/449 |
| 5,645,045 A * | 7/1997 | Breslin | 126/669 |
| 6,108,997 A * | 8/2000 | Blais et al. | 52/656.7 |
| 7,012,188 B2 * | 3/2006 | Erling | 136/251 |
| 7,600,349 B2 * | 10/2009 | Liebendorfer | 52/173.3 |
| 2001/0034989 A1 * | 11/2001 | Geiberger et al. | 52/287.1 |
| 2003/0163969 A1 * | 9/2003 | Silverman | 52/655.1 |

FOREIGN PATENT DOCUMENTS

DE          3611542 A1 *  10/1987

* cited by examiner

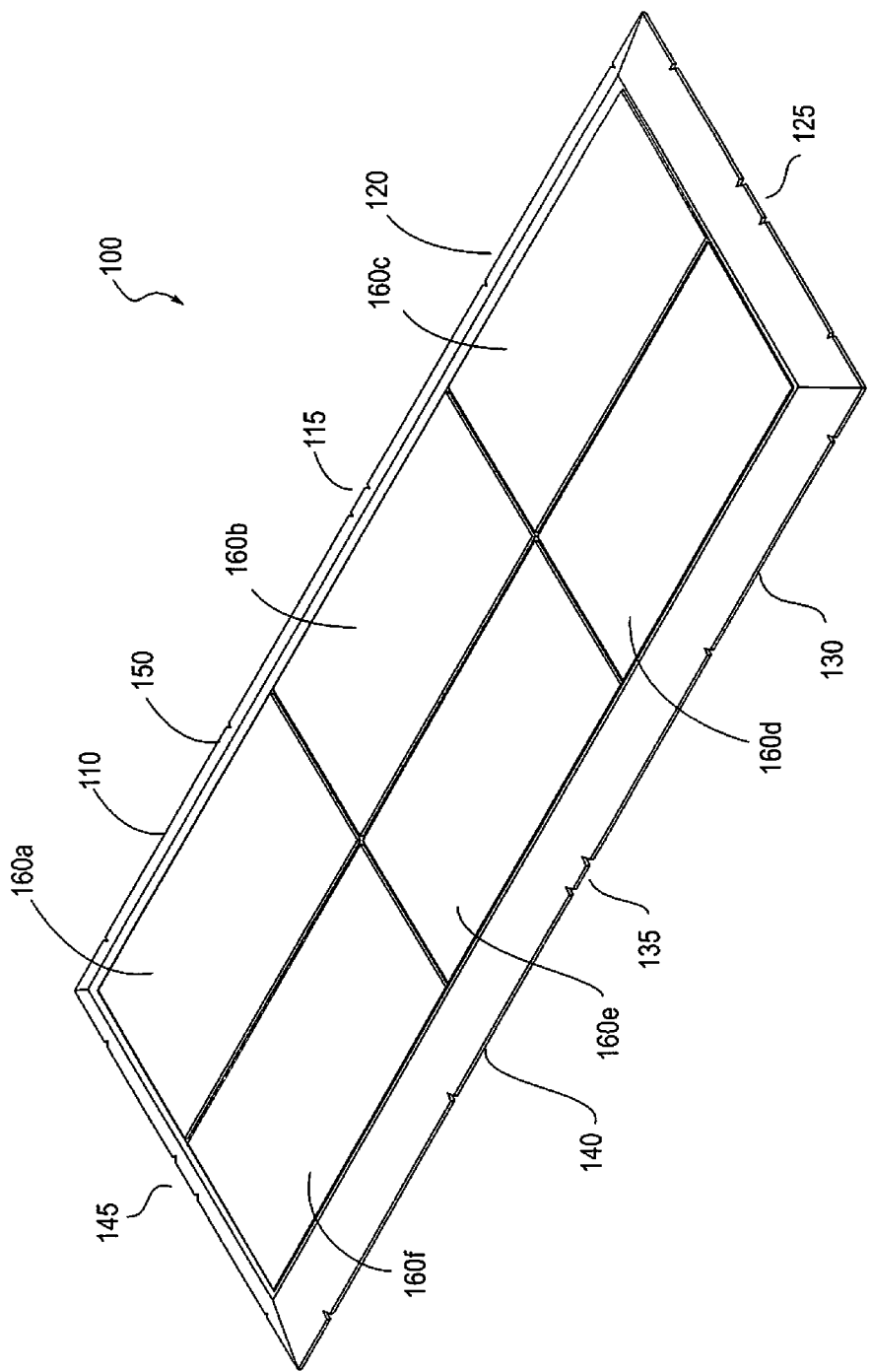

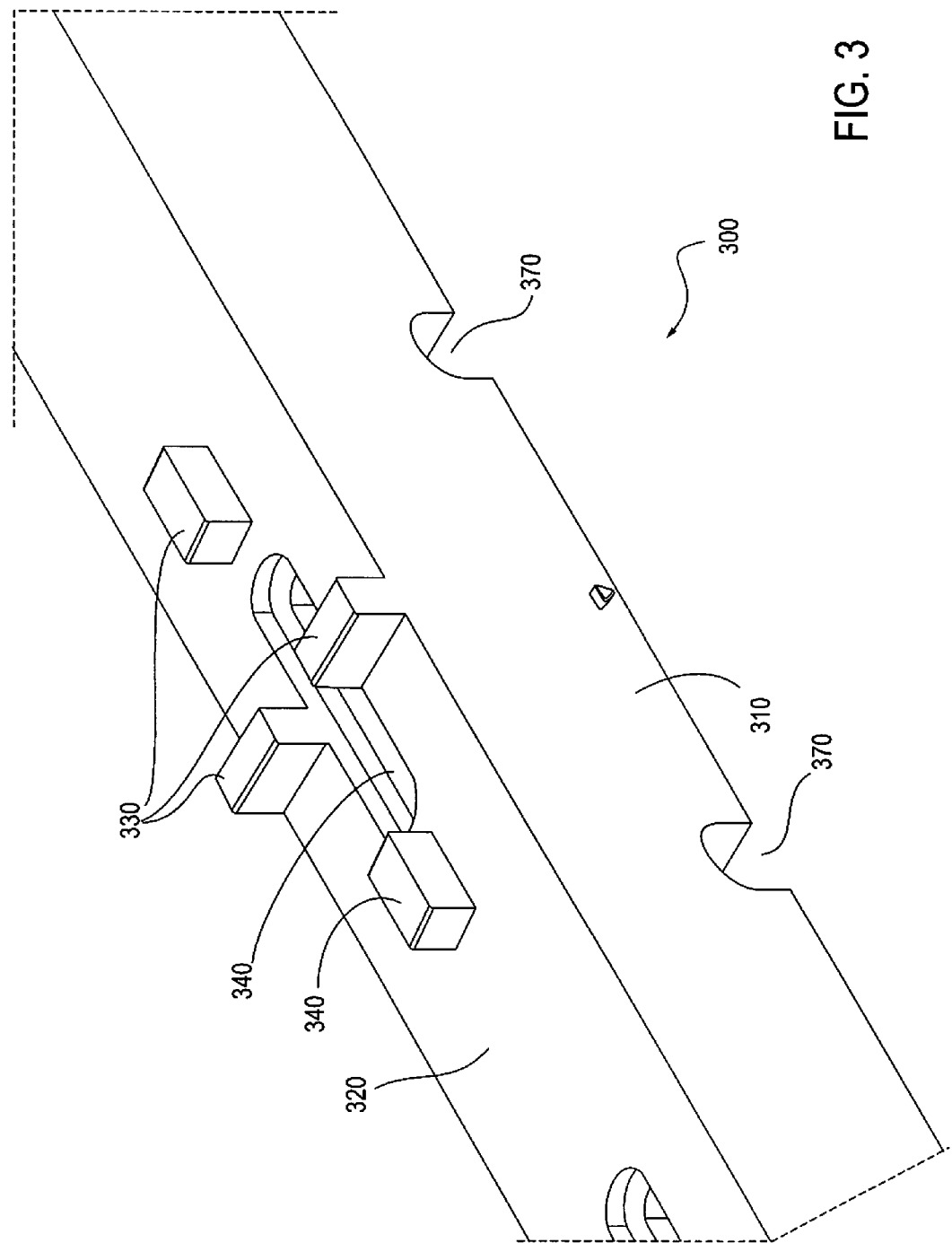

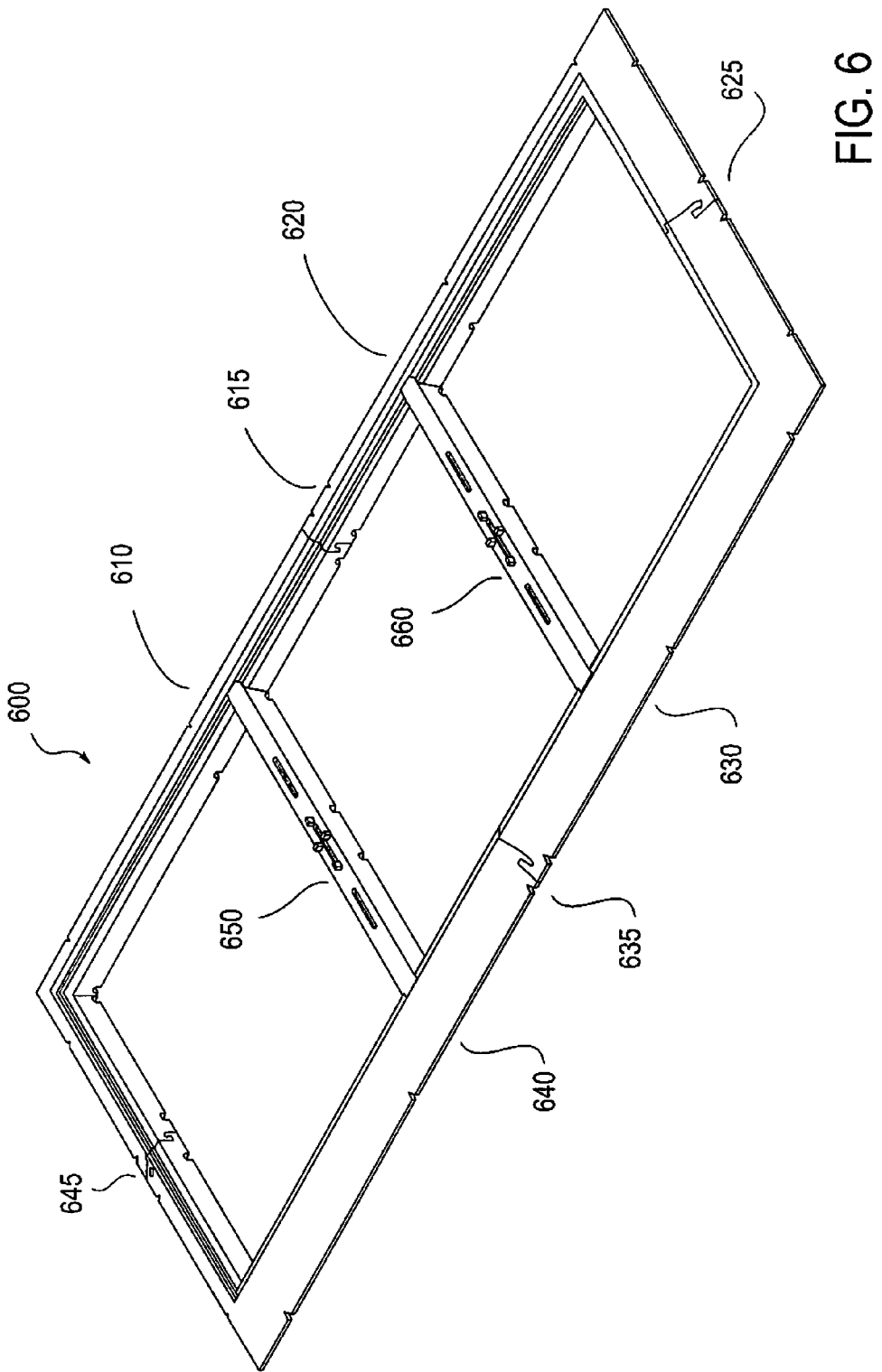

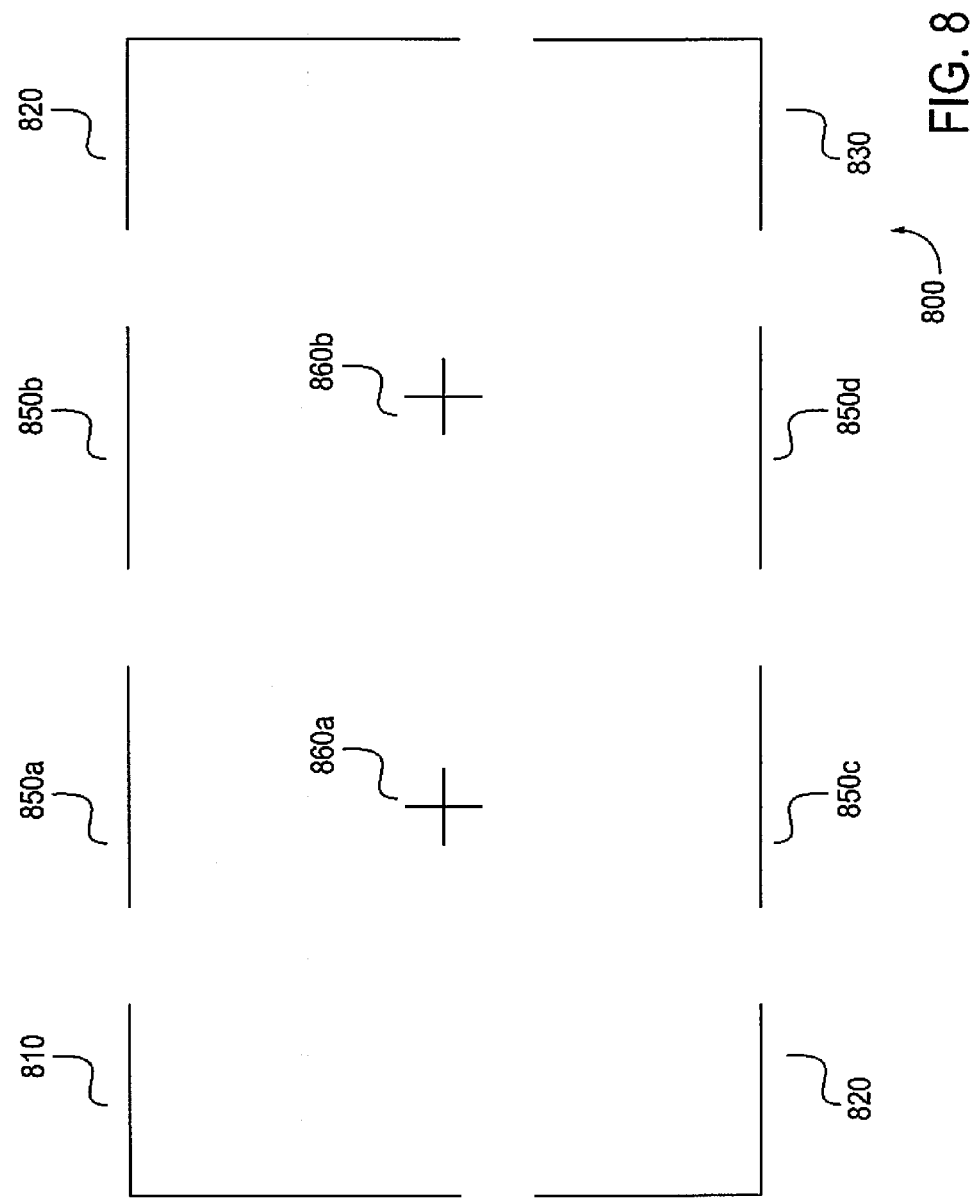

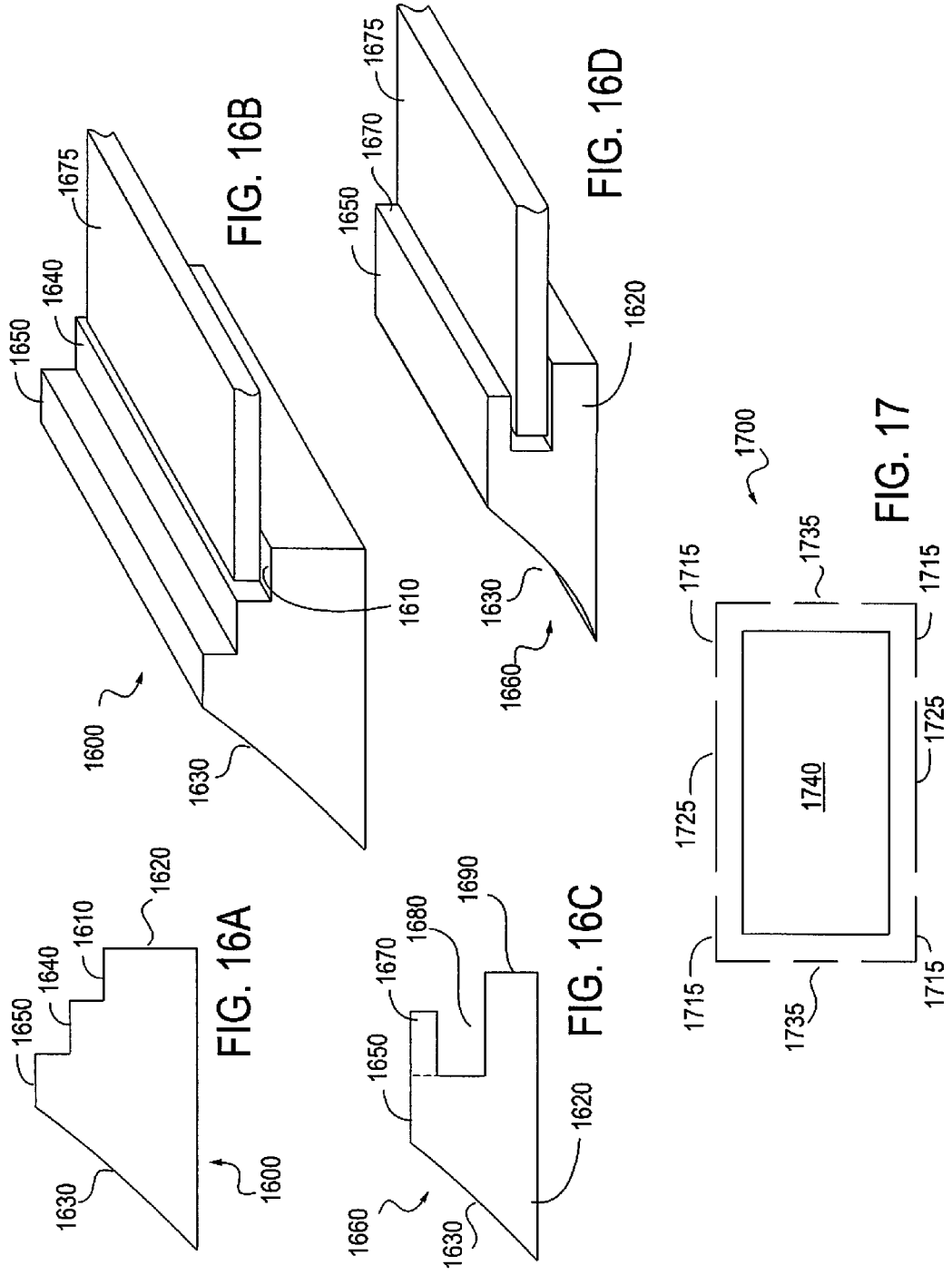

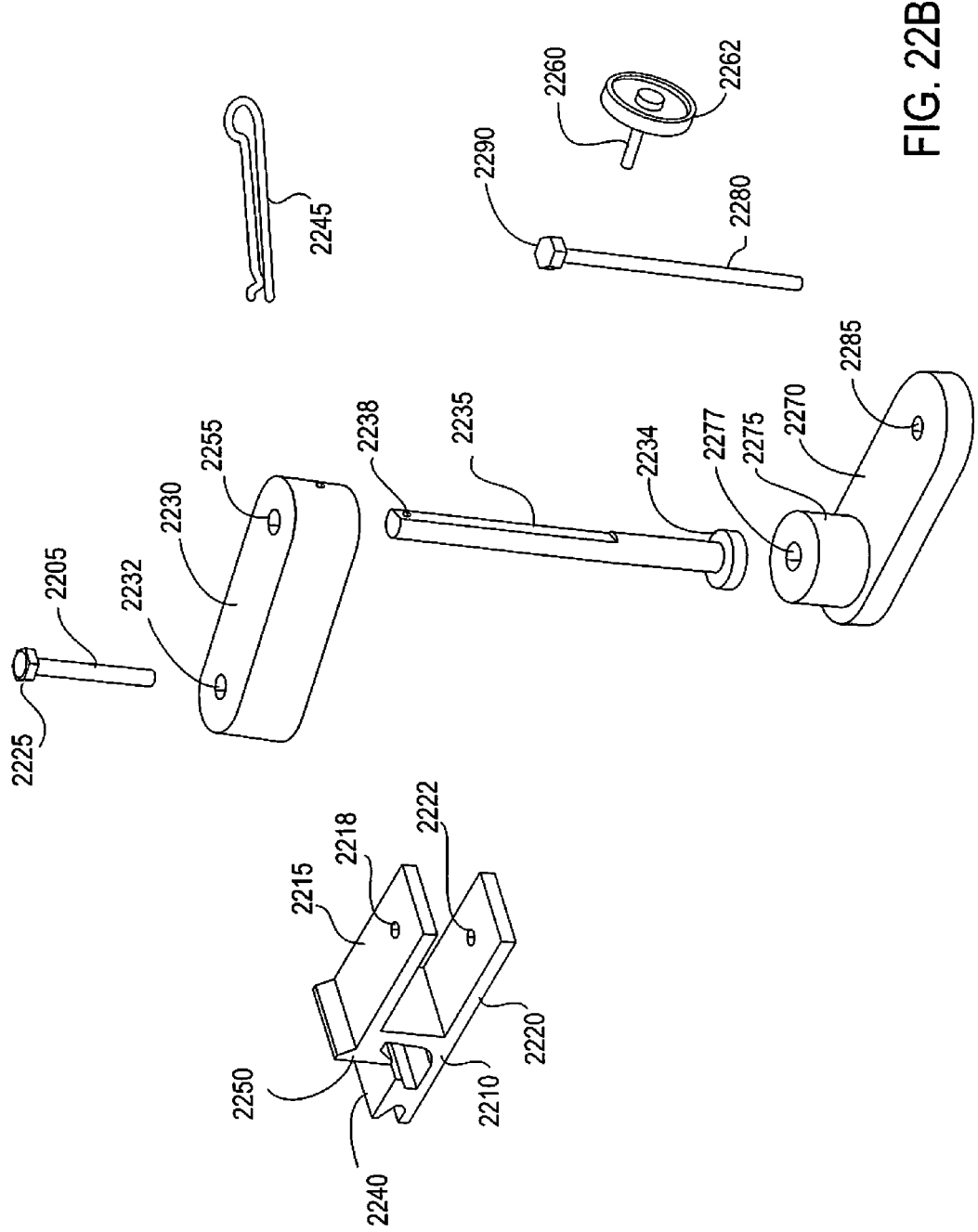

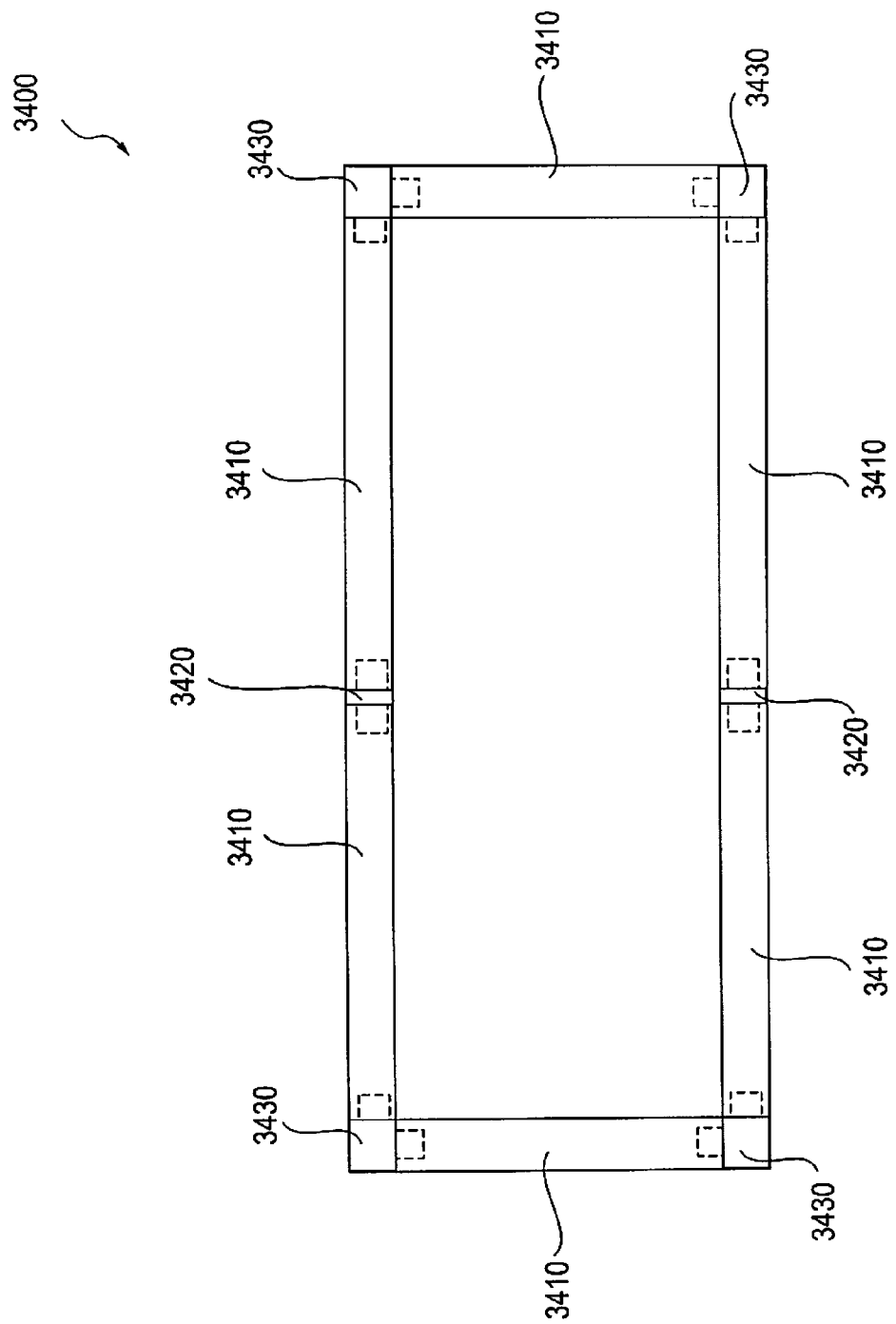

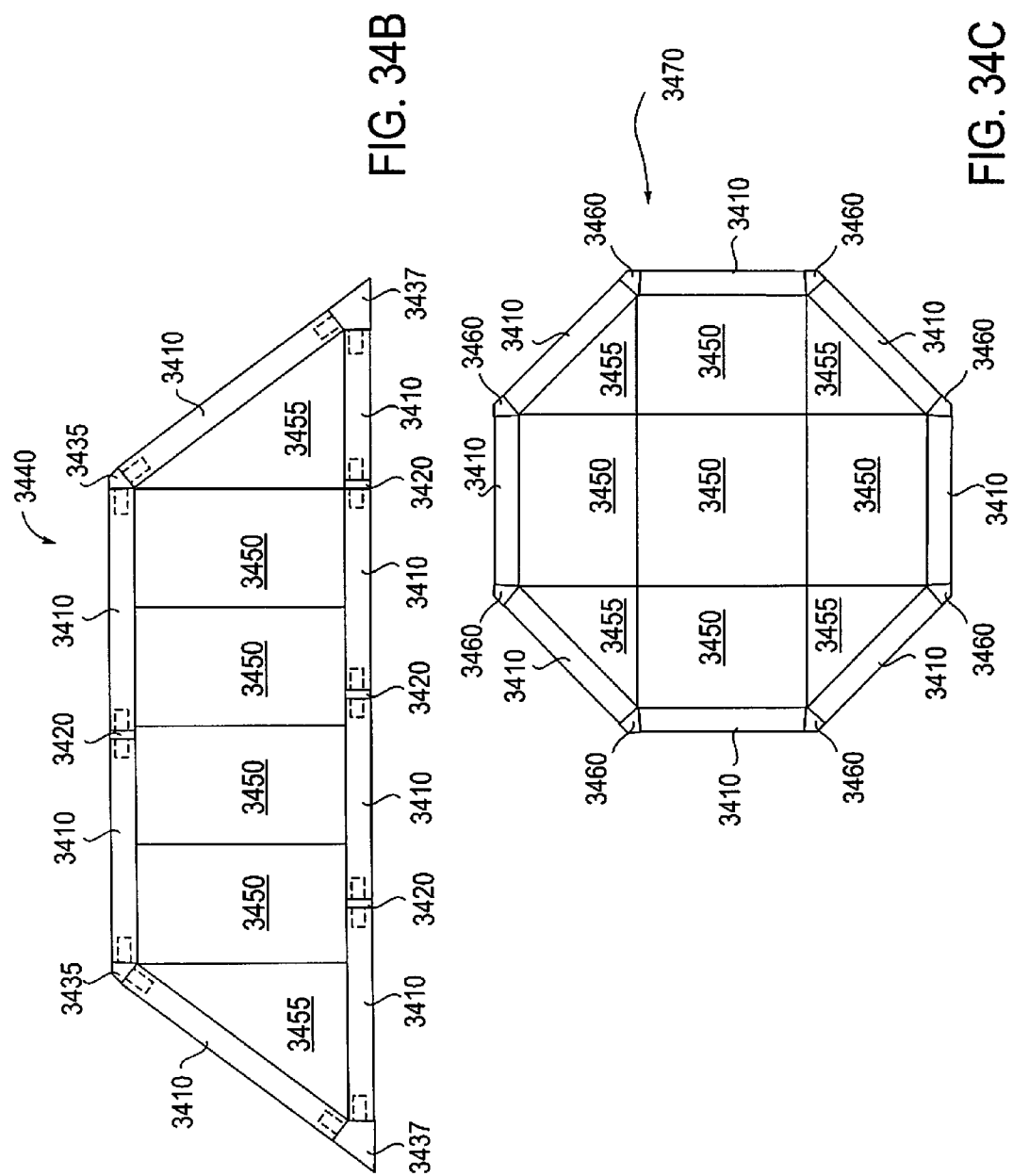

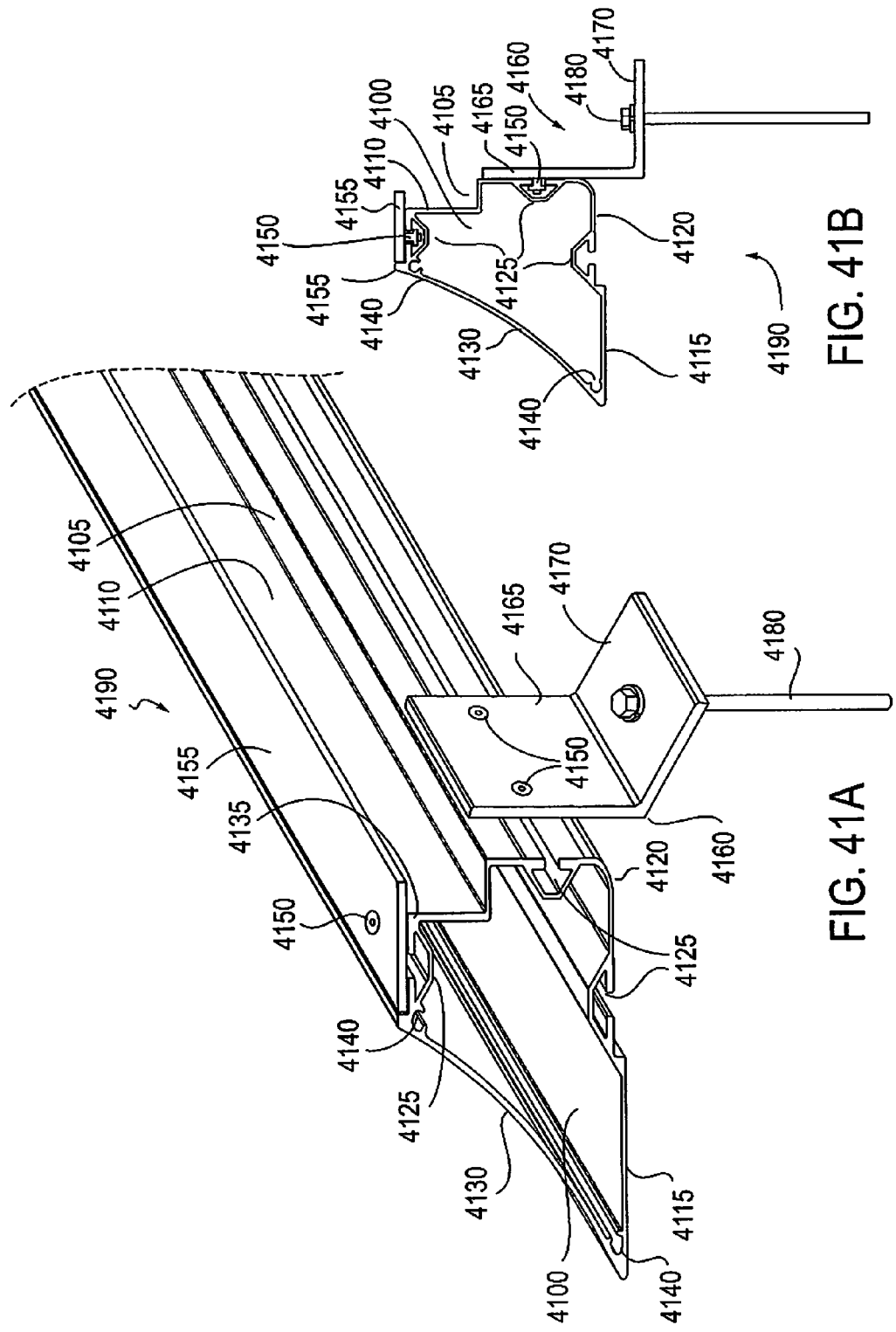

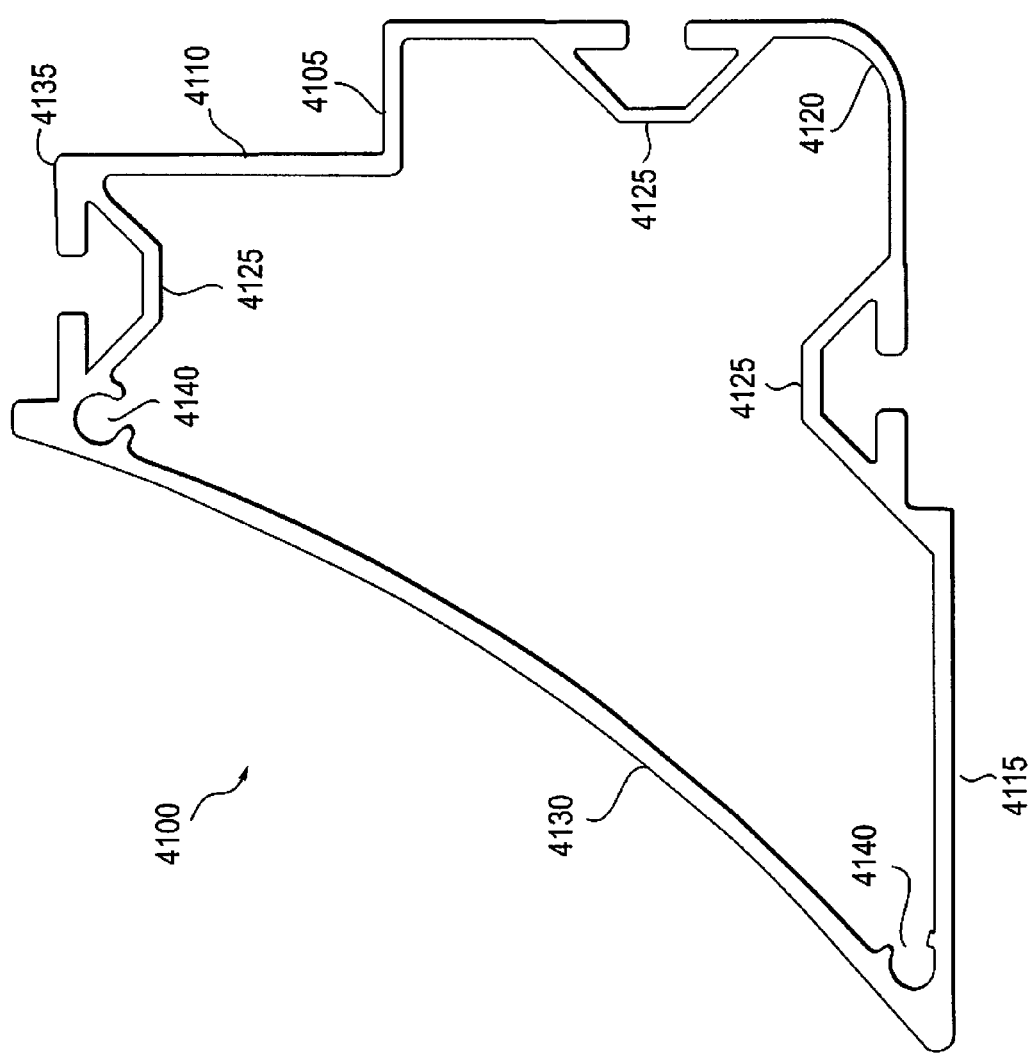

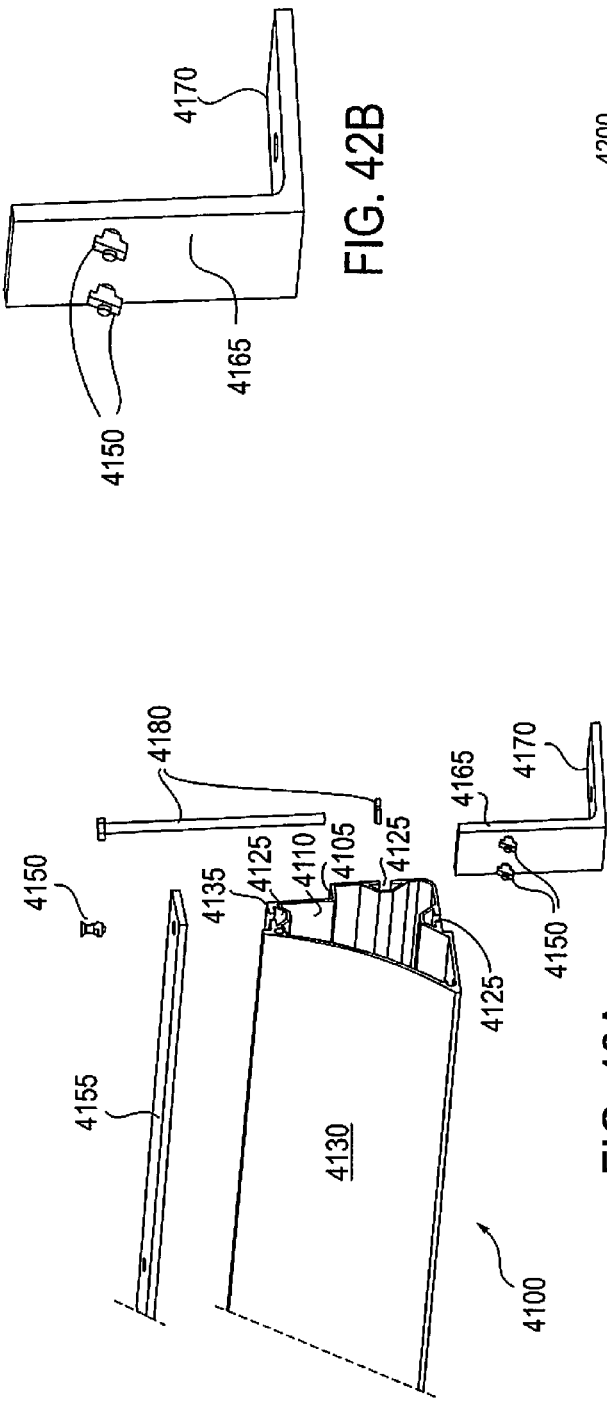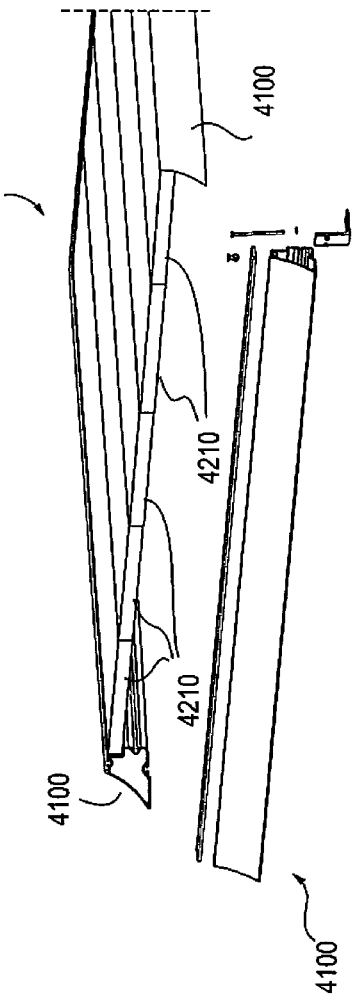

SOLAR PANEL AND FRAME AND RELATED METHODS

CLAIM OF PRIORITY

This application is a continuation of PCT application no. US06/26968, filed Jul. 11, 2006, which claims priority to U.S. Provisional Patent Application No. 60/778,771, filed Mar. 2, 2006 and U.S. Provisional Patent Application No. 60/698,385, filed Jul. 11, 2005, which are hereby incorporated herein by reference.

BACKGROUND

Solar systems have been available for residential and commercial use in various forms for a long time. Adoption of modern technologies has led to systems which can be installed on rooftops to deliver a rated 1 kW or 2 kW power output (for example). Likewise, systems can be installed which provide hot water for household use or for heated swimming pools.

Consumers typically must proactively seek their own alternatives to utility-provided electricity. This typically requires a significant investment in time & effort on the part of the consumer to learn about renewables, and then specifically solar options, to seek out providers (installers) and then to select and proceed with purchasing a system. Whether this involves self-installation or installation by a contractor, consumer self-education is a typical requirement.

Solar power and water systems generally do not have a standard design. Given the extreme variations in houses, this is not surprising. However, this means that every installation is unique. Not only is every installation unique, but standard products which may be used time and again on multiple installations are generally not available. Moreover, this leads to interesting and unusual situations, with extension cords snaking across roofs or water pipes running up and down from an external swimming pool to the roof of a house. With every installation a one-off design, economies developed from one design to the next are reduced. Thus, providing a standard design with components which are well organized for varying installations may be useful.

The solar power systems are rated for a specified output, but are not expected to actually deliver that output. Perversely, most government subsidy programs rely on a system rating rather than actual output for incentives. Actual output can have an effect down the road, when the user's power bill comes due, but it is not a significant part of the analysis initially. It may still be useful to develop a system which can be installed with a guarantee of how much power will be output on average.

BRIEF DESCRIPTION OF THE DRAWINGS

The present invention is illustrated by way of example by the accompanying drawings. The drawings should be understood as illustrative rather than limiting.

FIG. 1 illustrates an embodiment of a solar cell array.

FIG. 3 illustrates an embodiment of a cross-bar support for a solar cell array in a perspective view.

FIG. 6 illustrates an embodiment of an assembled set of support brackets for a solar cell array.

FIG. 8 illustrates an embodiment of brackets of an expanded solar cell array.

FIG. 16A illustrates an embodiment of a frame in a cross-section view.

FIG. 16B illustrates the embodiment of a FIG. 16A in a perspective view.

FIG. 16C illustrates an alternate embodiment of a frame in a cross-section view.

FIG. 16D illustrates the embodiment of a FIG. 16C in a perspective view.

FIG. 17 illustrates an alternate embodiment of a frame in a top schematic view.

FIG. 22B illustrates an embodiment of a roof fastener in an exploded view.

FIG. 34A illustrates an embodiment of a solar array configured as an N×M array of solar panels.

FIG. 34B illustrates an alternate embodiment of a solar array, configured in a trapezoidal shape.

FIG. 34C illustrates another alternate embodiment of a solar array, configured in an octagonal shape.

FIG. 41A provides an illustration of another embodiment of a main or side rail in a perspective view.

FIG. 41B provides an illustration of the embodiment of a main or side rail of FIG. 41A in a side view.

FIG. 41C provides an illustration of the embodiment of a main or side rail of FIG. 41A in a side view without additional attachments.

FIG. 42A provides an illustration of the embodiment of a main or side rail of FIG. 41A in another perspective view.

FIG. 42B provides an illustration of an embodiment of a mounting bracket in a perspective view.

FIG. 42C provides an illustration of the embodiment of a main or side rail of FIG. 41A as part of a solar array.

DETAILED DESCRIPTION

Figure 2A:
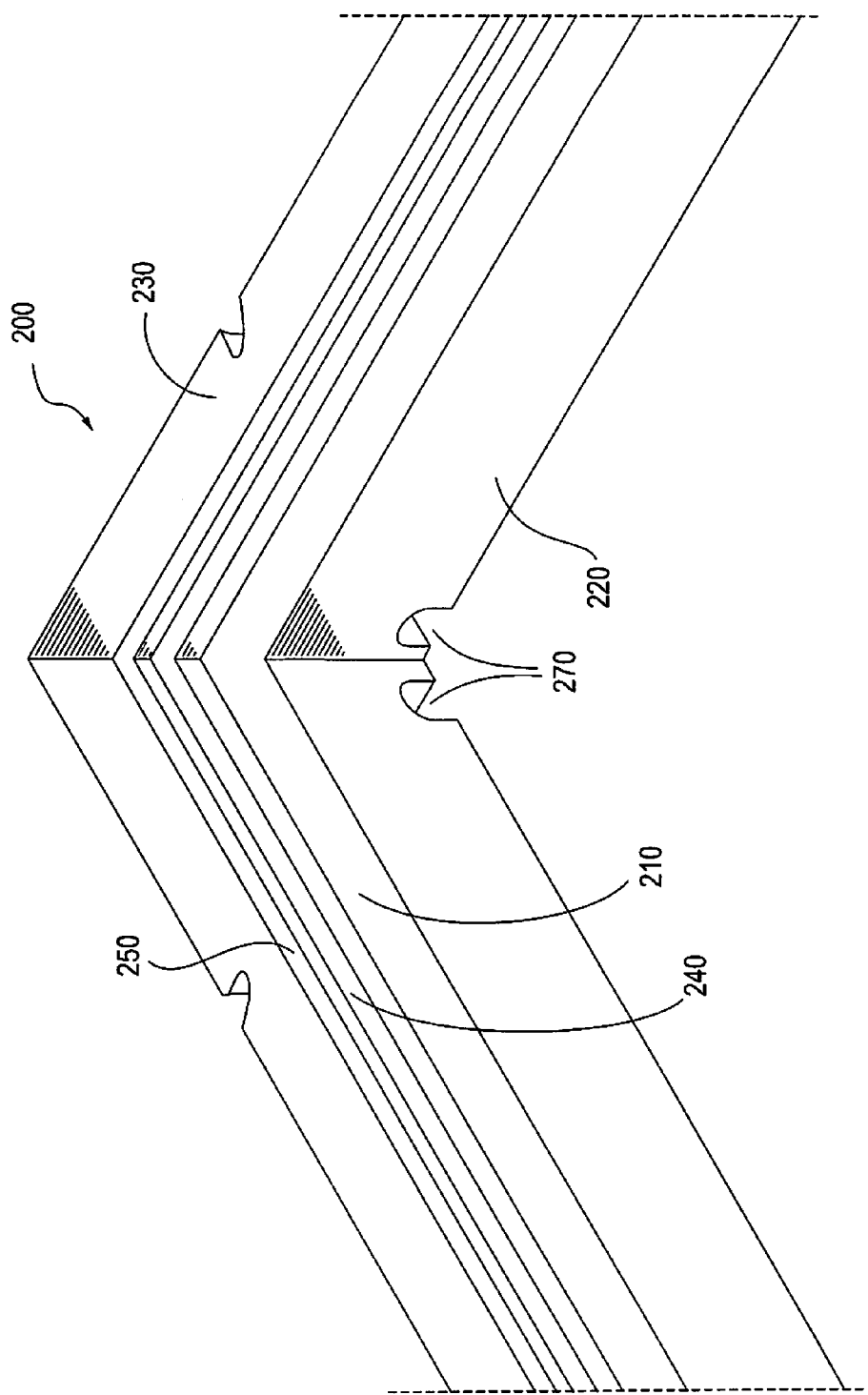
FIG. 2A illustrates an embodiment of a corner support of a solar cell array in a perspective view.

A system, method and apparatus is provided for a solar panel and frame. The specific embodiments described in this document represent exemplary instances of the present invention, and are illustrative in nature rather than restrictive in terms of the scope of the present invention. The scope of the invention is defined by the claims.

Solar panels (solar cell and/or solar heating modules) can be supported by a frame made up of corner supports and potentially other straight internal or edge supports. The frame can be made with interlocking supports and internal support edges of the supports. Such a frame may then be anchored or attached to a surface such as a roof or flat surface of a structure. A solar panel such as a panel of photovoltaic cells, a solar water heating panel (material and water pipes for example), or a thin-film photovoltaic panel may then be supported by the frame. The solar panel may then be integrated into an electrical or water system of the structure or a nearby structure, thereby allowing for conversion of solar energy into a form useful for running electrical appliances or into thermal energy in water.

By using a standard frame design and associated components, a solar panel may be mounted on a roof or other surface in a reasonable and economically feasible way. By requiring minimal customization based on site-specific considerations, expertise can be built up fairly quickly. Moreover, by using electronic databases for research, planning of an installation may be handled expeditiously and inexpensively. Thus, a standard design may be provided which may allow for installation without reinventing the design every time a new installation occurs.

With a solar panel installed, the panel may be monitored remotely and/or locally. When power output or water heating capacity drops unexpectedly, this may be detected automatically, within a system capable of evaluating such a change. In response, on-site observation and maintenance can be requested and performed. All of this reduces or eliminates a requirement of vigilance by the consumer over the lifetime of the solar panel. Moreover, the consumer can find out right away that the system is in need of maintenance, rather than noticing on the next energy bill that something is amiss.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

References to a solar panel generally refer to various different types of solar components, both photovoltaic cell panels and solar heating panels. Thus, most installations may involve one or both of a solar photovoltaic cell component and a solar heating component. Similarly, the various structures described may be used with both photovoltaic cells and solar heating elements. Some systems will incorporate both a heating element and a photovoltaic cell, whereas other systems will incorporate only one of the heating element and photovoltaic cell.

Many embodiments are set forth in this document, whether described in connection with figures or as variations of illustrated embodiments. In one embodiment, an apparatus is provided. The apparatus includes a first corner support having an internal support ledge. The apparatus also includes a second corner support having an internal support ledge and coupled to the first corner support. The apparatus further includes a third corner support having an internal support ledge and coupled to the second corner support. The apparatus additionally includes a fourth corner support having an internal support ledge and coupled to the third corner support and the first corner support. The first, second, third and fourth corner supports form a generally rectangular shape. The apparatus also includes a solar panel having edges supported by the internal support ledges of the first, second, third and fourth corner supports.

In another embodiment, a method is provided. The method includes reviewing solar days of a site. The method further includes reviewing geographical features of the site. Also, the method includes estimating a guarantee of available solar energy for the site. Moreover, the method includes installing a solar system at the site.

In yet another embodiment, an apparatus is provided. The apparatus includes a means for converting solar energy to a form useful for operation of machines and/or useful for heating water. Additionally, the apparatus includes a first means for supporting a corner of the means for converting. Moreover, the apparatus also includes a second means for supporting a corner of the means for converting. The second means is coupled to the first means for supporting. Also, the apparatus includes a third means for supporting a corner of the means for converting. The third means is coupled to the second means for supporting. Furthermore, the apparatus includes a fourth means for supporting a corner of the means for converting. The fourth means is coupled to the third means for supporting and the first means for supporting.

In still another embodiment, an apparatus is presented. A frame is provided as part of the apparatus. The frame includes a first corner support member with an internal supporting ledge. A second corner support member is coupled to the first corner support member, and the second corner support member has an internal supporting edge. Additionally, a third and fourth corner support member are coupled to the first and second corner support members and to each other, to form a generally rectangular shape. The third and fourth corner support members each have internal supporting ledges. A solar panel is also provided as part of the apparatus, with the solar panel resting on the internal support ledges.

In another embodiment, a method is presented. The method includes reviewing solar days of a site through access of a first database with an identifier of the site. The method further includes reviewing geographical features of the site through access of a second database with the identifier of the site. The method also includes estimating a guarantee of available solar energy for the site based on the solar days and the geographical features. The method additionally includes providing the guarantee to an owner of the site.

In still another embodiment, an apparatus is provided. A frame including interlocking supports and having a rectangular shape is part of the apparatus. The frame includes a first corner support having an internal support ledge and a second corner support having an internal support ledge, with the first corner support coupled to the first corner support. Similarly, the frame includes a third corner support having an internal support ledge and coupled to the second corner support. Additionally, the frame includes a fourth corner support having an internal support ledge, the fourth corner support is coupled to the third corner support and the first corner support. The apparatus also includes a solar panel having edges supported by the internal support ledges of the supports of the frame.

In an embodiment, an apparatus is provided. The apparatus includes a first rail coupled to a second rail, a third rail coupled to the second rail, and a fourth rail coupled to the first rail and the third rail. The apparatus may form a rectangular frame from the four rails. The rails may be coupled through use of corner connectors or may be mitered and coupled through use of brackets in an abutting relationship. Additionally, further rails may be added by interposing the additional rails between a pair of the first, second, third and fourth rails, to extend the frame, and such additions may involve connectors or abutting rails and brackets, for example. The rails may have support ledges. Alternatively, the rails may have slots allowing for support brackets which slide along the slots. Moreover, the rails may be anchored using roof anchoring components to various surfaces. Additionally, the rails may support photovoltaic or other solar panels, and may have caps or top brackets to maintain the position of such solar panels.

Solar arrays or systems can be provided in a variety of forms, provided a standard form is used. The standard form allows for repeatable assembly and installation processes, thereby allowing for economies of scale in manufacturing and installation. FIG. 1 illustrates an embodiment of a solar cell array. Array 100 includes a panel of solar cells and corner supports providing a frame for the panel.

Four corner supports (110, 120, 130 and 140) are used. They are joined at four seams or joints (115, 125, 135 and 145). Thus, the four corner supports (110, 120, 130 and 140) are fixedly attached to each other to form a frame which supports the panel 150 of solar cells. Each corner support includes an internal ledge which supports an edge of panel 150, and the four corner supports (110, 120, 130 and 140) collectively surround the panel 150.

Panel 150 includes photovoltaic solar cells, which are subdivided into six subpanels (160a, 160b, 160c, 160d, 160e and 160f). These subpanels may be components which can be switched out, allowing for repairs of smaller units than an entire panel 150. Panel 150 as a whole may be expected to generate a predictable amount of electric power, based on available solar days, angle of incidence, and nearby obstructions, allowing for prediction of solar generating capacity.

The components of the frame may provide additional details. FIG. 2A illustrates an embodiment of a corner support of a solar cell array in a perspective view. Corner support 200 is illustrated. Corner support 200 includes two terraced or stepped ledges, a base structure, a beveled external side, a top side, and conduit holes.

Base structure 220 supports the corner support 200 and underlies the beveled external edge 230, top 250, upper ledge 240 and lower ledge 210. In one embodiment, upper ledge 240 is an outer ledge and lower ledge 210 is an inner ledge. Lower ledge 210 provides a shelf upon which the edges of a panel of solar cells (such as plate 150 for example) may rest. Upper ledge 240 may be used to support a component used to secure a panel to lower ledge 210. Such a component may be a bracket or clamp, for example. Alternatively, a panel may be secured using fasteners coupling or connecting the panel to the frame through a through-hole, for example. Also shown are conduits 270, which penetrate base 220. Conduits 270 allow for passage of wires or cables through the structure, and may also allow for passage of fluids such as water around or through the structure.

Figure 2B:
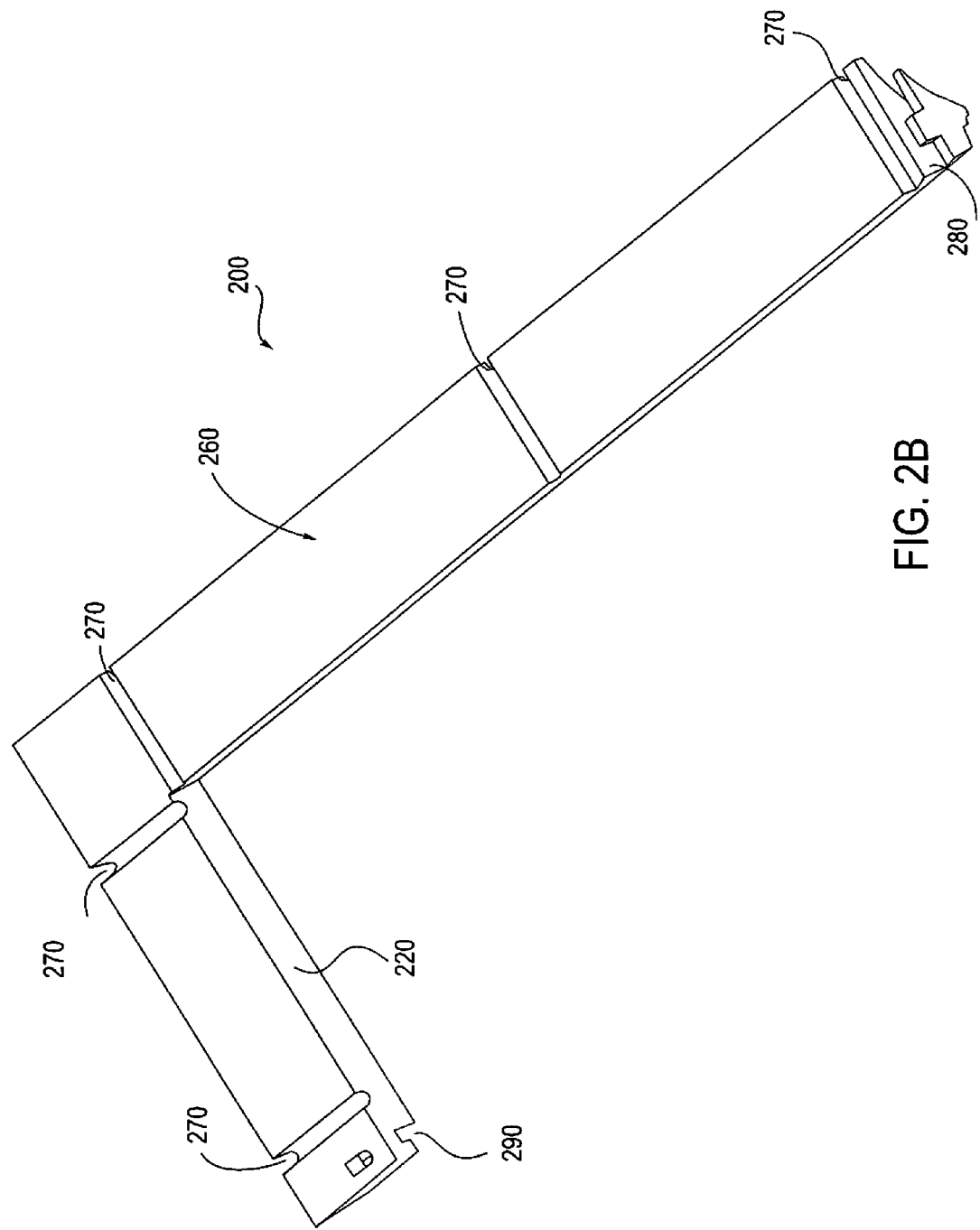
FIG. 2B illustrates the corner support of FIG. 2A in a bottom view.

FIG. 2B illustrates the corner support of FIG. 2A in a bottom view. Conduits 270 may be clearly seen as throughholes or grooves in base structure 220. Furthermore, end connectors 280 and 290 are illustrated. As illustrated, end connector 280 is a projecting flange or tab, with at least a portion of the tab connected to or coupled to base structure 220, but spaced apart from base structure 220. Connector 290 defines a slot with an outer portion of connector 290 connected to base structure 220 but spaced away from structure 220. Thus, connector 280 on one corner support 200 may be slid into connector 290 on another corner support 200, with the tab of connector 280 fitting into and potentially locking into the slot of connector 290. Other connection options may be useful, such as fasteners of various types, for example.

Figure 2C:
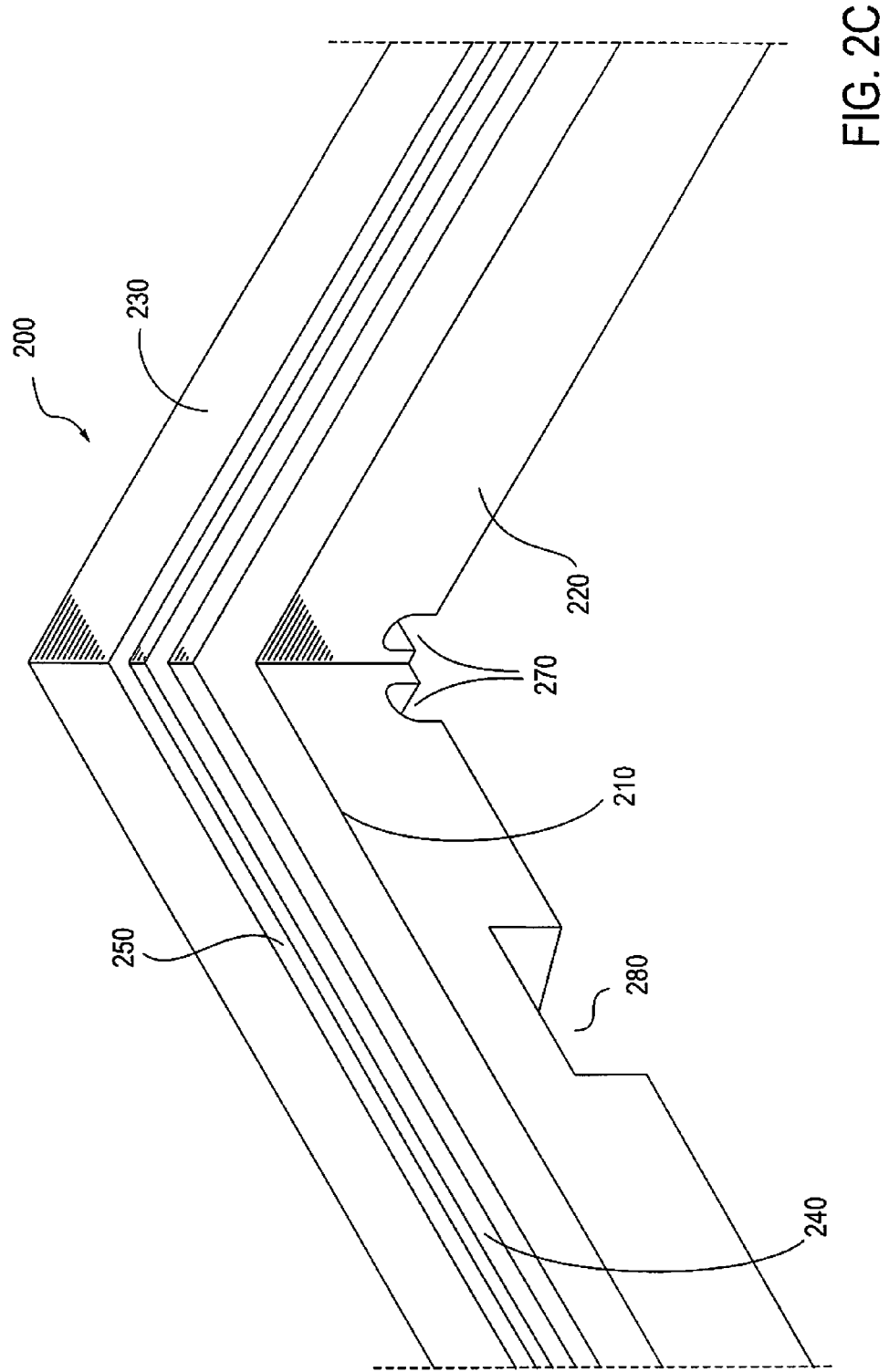
FIG. 2C illustrates an alternate embodiment of a corner support of a solar cell array in a perspective view.

FIG. 2C illustrates an alternate embodiment of a corner support of a solar cell array in a perspective view. Corner support 290 is similar in structure to corner support 200, and includes many of the same elements. However, corner support 290 provides an additional slot 280 through base structure 220. Slot 280 allows for flow of air and water between the inside and outside of a frame including corner support 290. When such a frame is arranged on a sloped roof, conduits 270 may tend to become plugged by grit or vegetable matter (e.g. pine needles or leaves). Slot 280, with a significantly bigger cross-section, is much less likely to experience the same plugging or clogging, and thus is likely to allow drainage of water and passage of air. Other, smaller slots may be provided in corner supports 200 and 290 to allow for mating with flanges of other internal members.

While the corner supports may form a rectangular base and potentially support a panel of photovoltaic cells, intervening support members may be useful, too. FIG. 3 illustrates an embodiment of a cross-bar support for a solar cell array in a perspective view. Cross-bar 300 includes a base, top, tabs, a slot, and conduits.

Base 310 underlies the cross-bar support 300. Above base 310 is top 320—a top surface of support 300. On top surface 320 are tabs 330 which may guide placement of subpanels of a panel or of multiple panels, for example. Additionally, slot 340 penetrates top 320 and base 310, allowing for drainage or routing of wires at the intersection point of subpanels or panels. Conduits 370 may allow for drainage of fluids (e.g. rainwater) and routing of wires or cables, for example. Cross-bar 300 may be expected to connect to corner support members, such as through an interlocking tab and slot, for example.

Figure 4A:
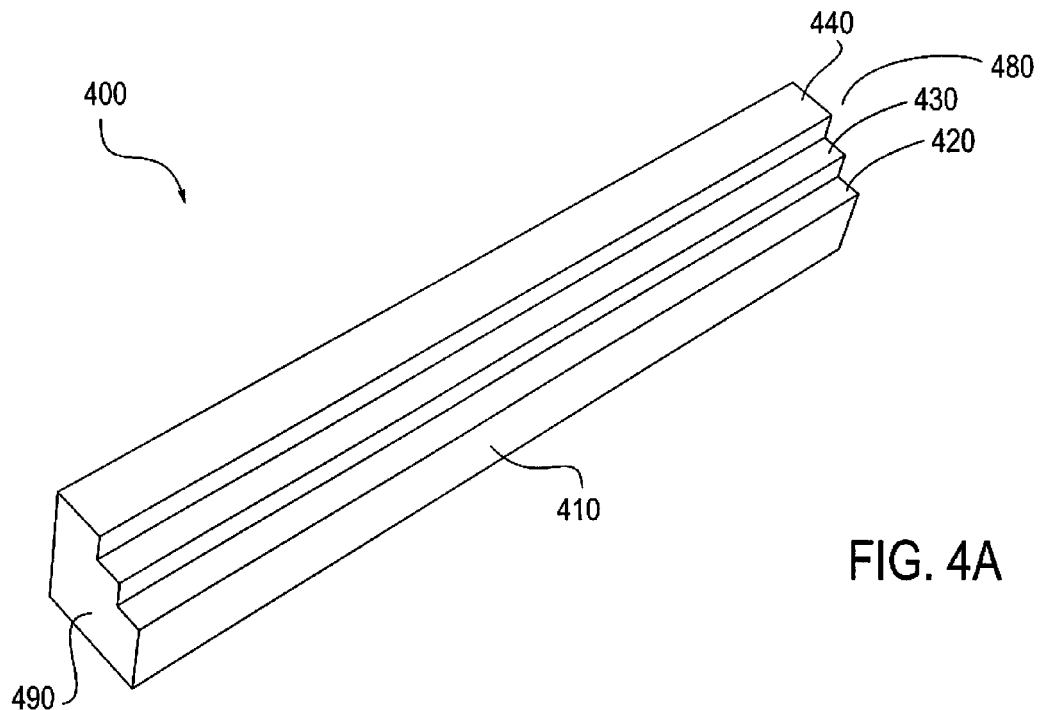
FIG. 4A illustrates an embodiment of a straight support of a solar cell array in a perspective view.

A basic rectangular solar cell array may be formed from four corner supports. A wider or longer array may require intervening straight supports. FIG. 4A illustrates an embodiment of a straight support of a solar cell array in a perspective view. Support 400 is a straight support member, which includes a base, top, end pieces and upper and lower ledges.

Base structure 410 underlies straight support 400, and has on top of it a lower ledge 420, upper ledge 430, and top surface 440. Top surface 440 may include a level top surface and/or a beveled edge. Lower ledge 420 may support a solar cell panel or subpanel, and upper ledge 430 may provide a base for components securing a solar cell panel to support 400. Additionally, end pieces 480 and 490 may be similar to connectors 280 and 290, allowing for interconnection with other components.

Figure 4B:
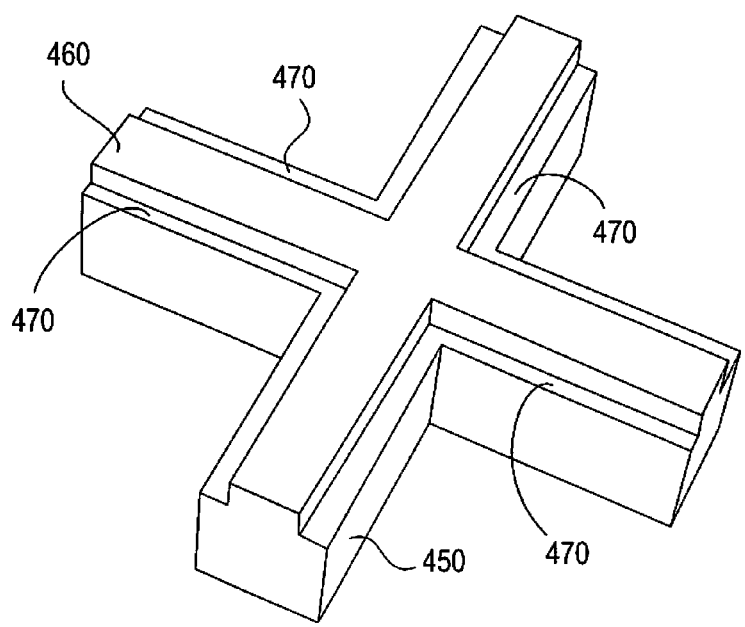
FIG. 4B illustrates an embodiment of an internal corner support of a solar cell array in a perspective view.

Internal support for solar cell panels or subpanels may also be useful. FIG. 4B illustrates an embodiment of an internal corner support of a solar cell array in a perspective view. A base 405 supports a ledge 470 and top surface 460. Ledge 470 may support a solar cell panel or subpanel, and the entire internal corner support may support internal corners of four solar cell panels or four subpanels.

Figure 5:
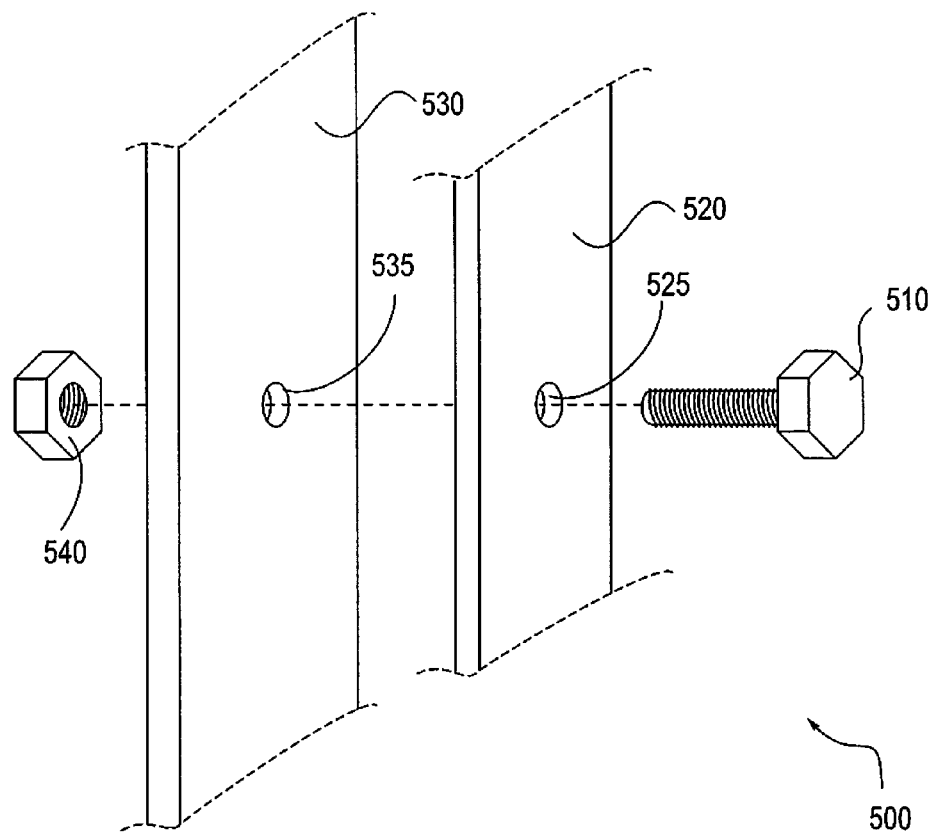
FIG. 5 illustrates an embodiment of a fastener system for a solar cell array in an exploded view.

All of these components are likely to be safer if anchored to a structure. FIG. 5 illustrates an embodiment of a fastener system for a solar cell array in an exploded view. System 500 uses a screw or bolt and a nut to fasten a support member to a roof using through-holes. Other types of fasteners may be useful, and other modes of fastening, such as adhering may also be appropriate.

Screw 510 is fit through a through-hole 525 of support 520, and through a through-hole 535 of roof or surface 530, and screwed into nut 540. Thus, support 520 is fixedly attached to surface 530. As may be appropriate, an adhesive may be substituted for screw 510 and nut 540, or a nail may be used, for example.

An assembled frame of support members may provide further insights. FIG. 6 illustrates an embodiment of an assembled set of support brackets for a solar cell array. Frame 600 includes four corner support members and two cross support members. Each of corner support members 610, 620, 630 and 640 are connected to adjacent corner support members, providing a rigid frame. These connections occur at joints 615, 625, 635 and 645. Also included are cross support members 650 and 660, which are connected to two of the four corner support members (610, 620, 630 and 640), providing internal support and further stiffening the frame.

Figure 7A:
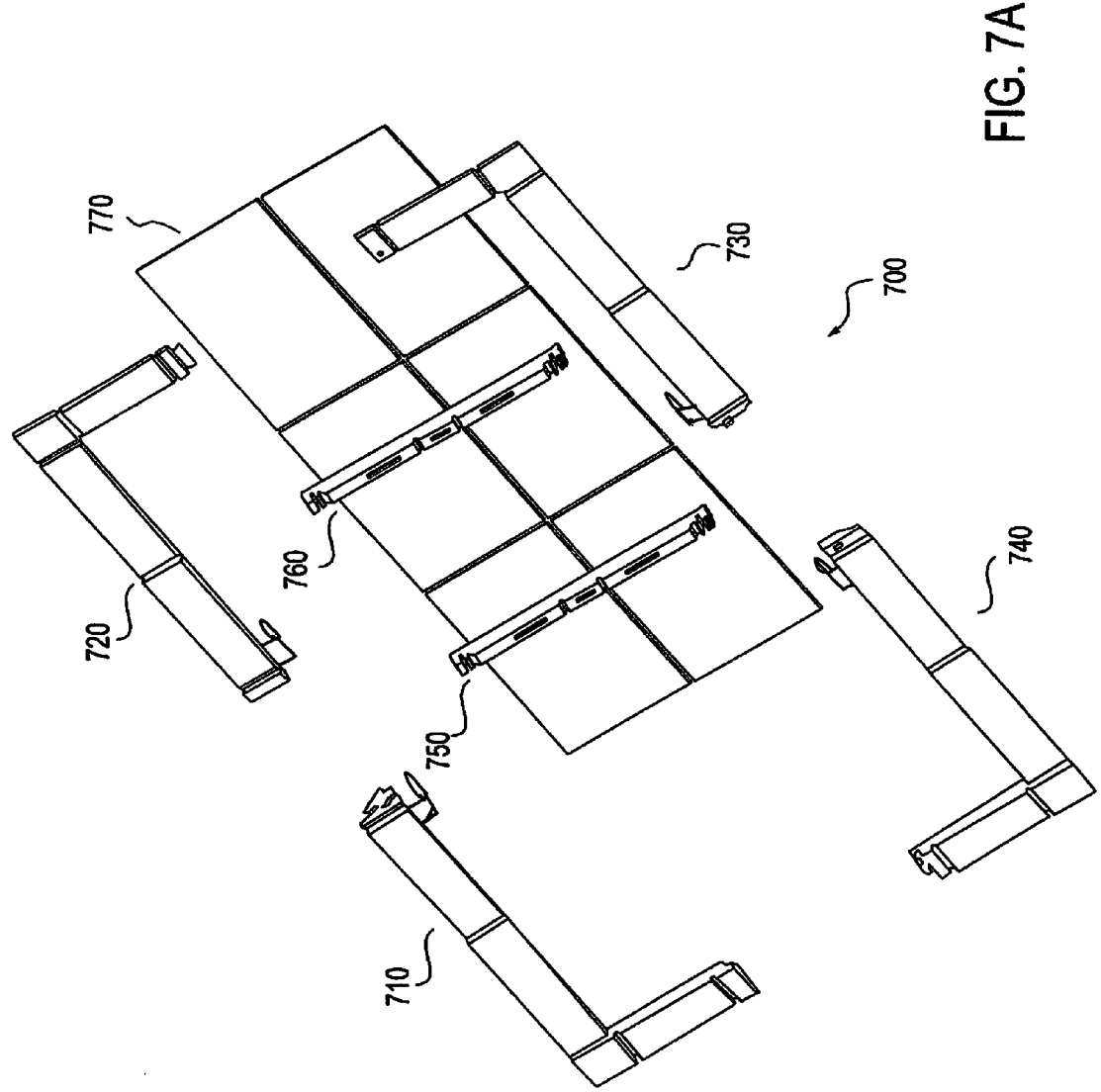
FIG. 7A illustrates an embodiment of a solar cell array in an exploded bottom view.

Using cross support members and corner support members, a frame can support a solar cell panel. FIG. 7A illustrates an embodiment of a solar cell array in an exploded bottom view. Array 700 is a solar cell array, including frame and solar cell panel. The frame includes four corner members 710, 720, 730 and 740 which may be attached to each other to form a rectangular frame. Providing further support are two cross support members 750 and 760 which couple two corner support members and provide internal support to the solar cell plate 770. Solar cell panel 770 rests on the cross support members 750 and 760, and rests on a ledge of corner members 710, 720, 730 and 740.

Figure 7B:
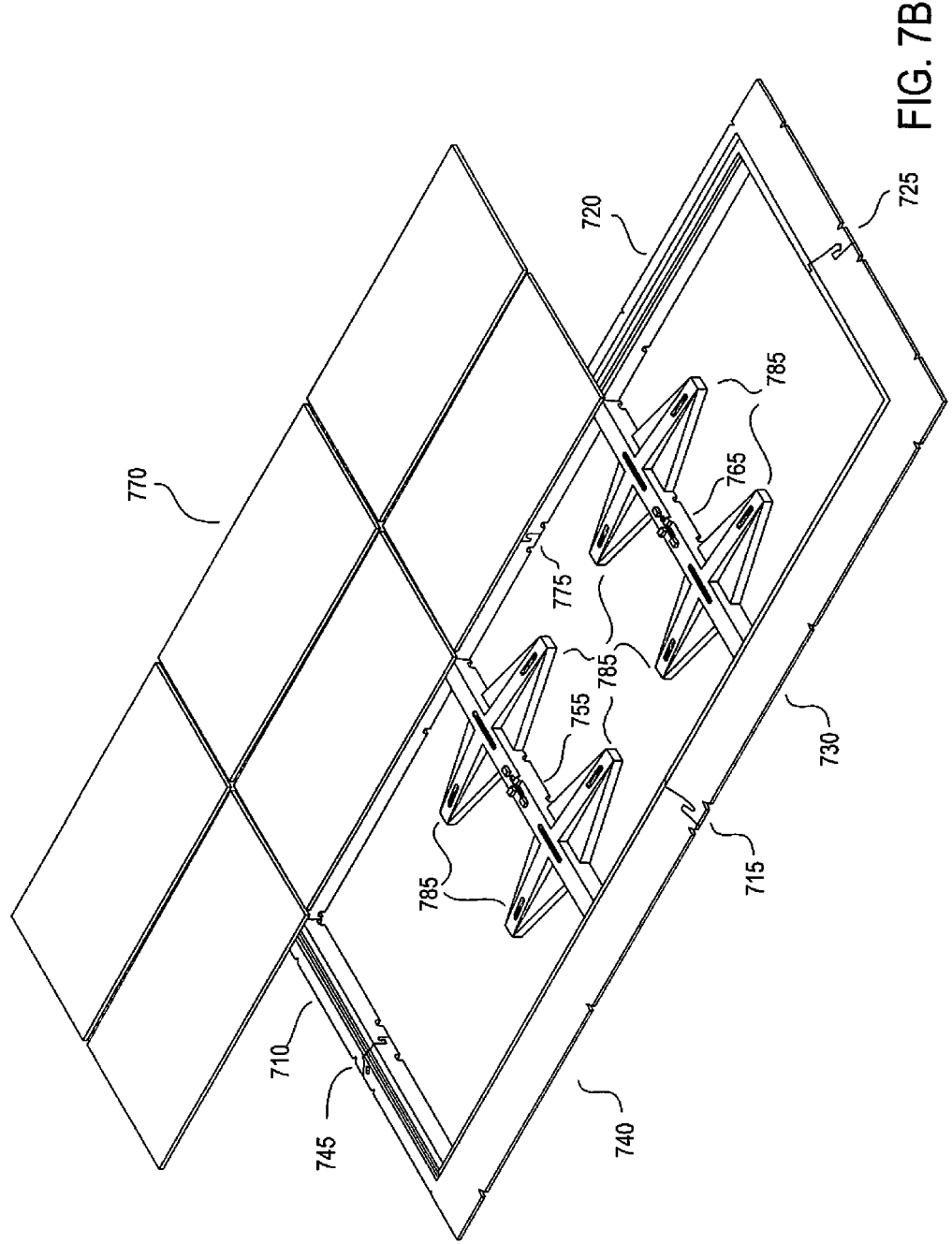
FIG. 7B illustrates an alternate embodiment of a solar cell array in an exploded top view.

Other types of frames may also be used. FIG. 7B illustrates an alternate embodiment of a solar cell array in an exploded top view. Rather than using cross support members 750 and 760, cross support members 755 and 765 are used. Members 755 and 765 have further projections 785 which extend laterally from cross support members 755 and 765. Projections 785 may be used for one or both of further supporting subpanels of a solar cell panel 770, or further supporting and stabilizing cross support members 755 and 765. As can be seen, corner members 710, 720, 730 and 740 each join at joints 715, 725, 735 and 745, providing the rigid frame structure.

Figure 7C:
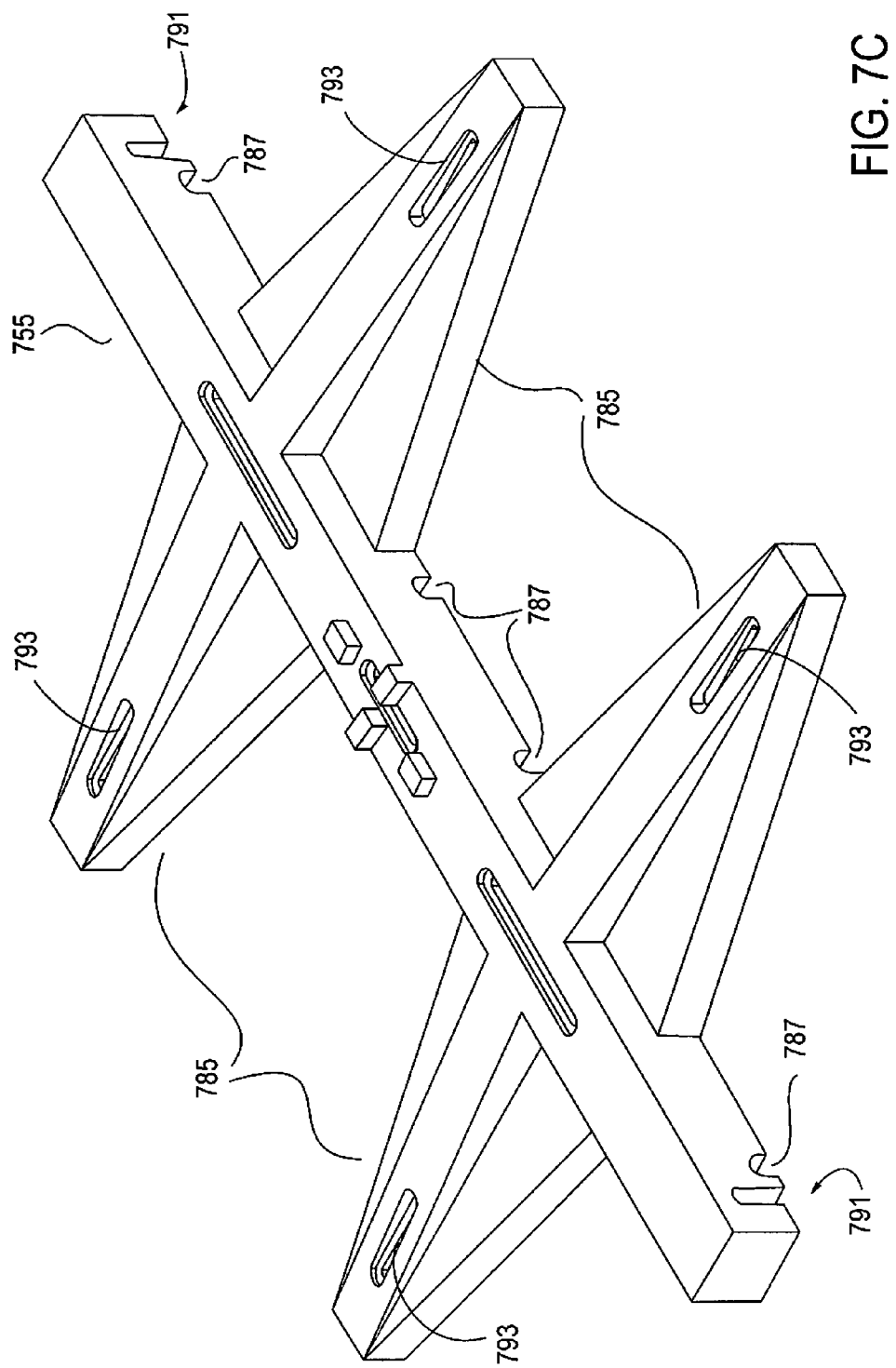
FIG. 7C illustrates an alternate embodiment of a cross-bar support of a solar cell array in a perspective view.

FIG. 7C illustrates an alternate embodiment of a cross-bar support of a solar cell array in a perspective view. Cross-bar support 755 provides an interior connection between sides of a frame, and provides support for solar panels such as solar cells or solar heating elements. Conduits 787 are included to allow for flow of water or liquids and airflow.

Also included are stabilizing platforms 785, which extend out from a central cross-bar portion of cross-bar support 755. Platforms 785 provide further stability, greater surface area in contact with an underlying surface, and space for fasteners attaching to the underlying surface. Slots 793 are apertures through platforms 785, through which a fastener may pass for attachment to an underlying surface. As illustrated, slots 793 provide for placement of a fastener in various locations within the slot 793, allowing for registration tolerances between cross-bar support 755 and an underlying surface. Fasteners may include various different structures, such as those illustrated with respect to FIG. 5, and other fasteners useful for coupling surfaces together.

Also illustrated are flanges 791. Flanges 791 are provided at the ends of the cross-bar 755, and define slots into which a corresponding flange of an exterior frame may project. Thus, the exterior frame and cross-bar support 755 may mate, providing a secure fit. Friction fit or various forms of attachment (fasteners or adhesives) may be used, such as nuts and bolts or rivets, for example to secure the mating between cross-bar support 755 and an exterior frame. Through-holes (not shown) may be necessary for some fasteners.

Wider solar cell arrays have been previously discussed, and a schematic diagram may further explain this feature. FIG. 8 illustrates an embodiment of brackets of an expanded solar cell array. Frame 800 is designed to support six solar cell panels (not shown). A larger number of such solar cell panels may be desirable when larger roof sections are available, or when commercial use is contemplated rather than residential use.

Frame 800 includes four corner support members 810, 820, 830 and 840. Depending on design choices, these corner support members may or may not provide sufficient length to support multiple panels of solar cells. Thus, straight support members 850*a*, 850*b*, 850*c* and 850*d* are interposed between the corner support members, providing an extended frame. Moreover, as falling solar cell panels would be undesirable, internal corner supports 860*a* and 860*b* are also provided. Such internal corner supports were illustrated, in one embodiment, in FIG. 4B. It may also be useful to provide similar straight supports between corner supports 810 and 840, and similarly between 820 and 830, to extend the length of the associated sides of frame 800. Thus, a set of six solar cell panels may then be supported. Moreover, this frame 800 may be expanded through use of additional straight support members.

Figure 9:
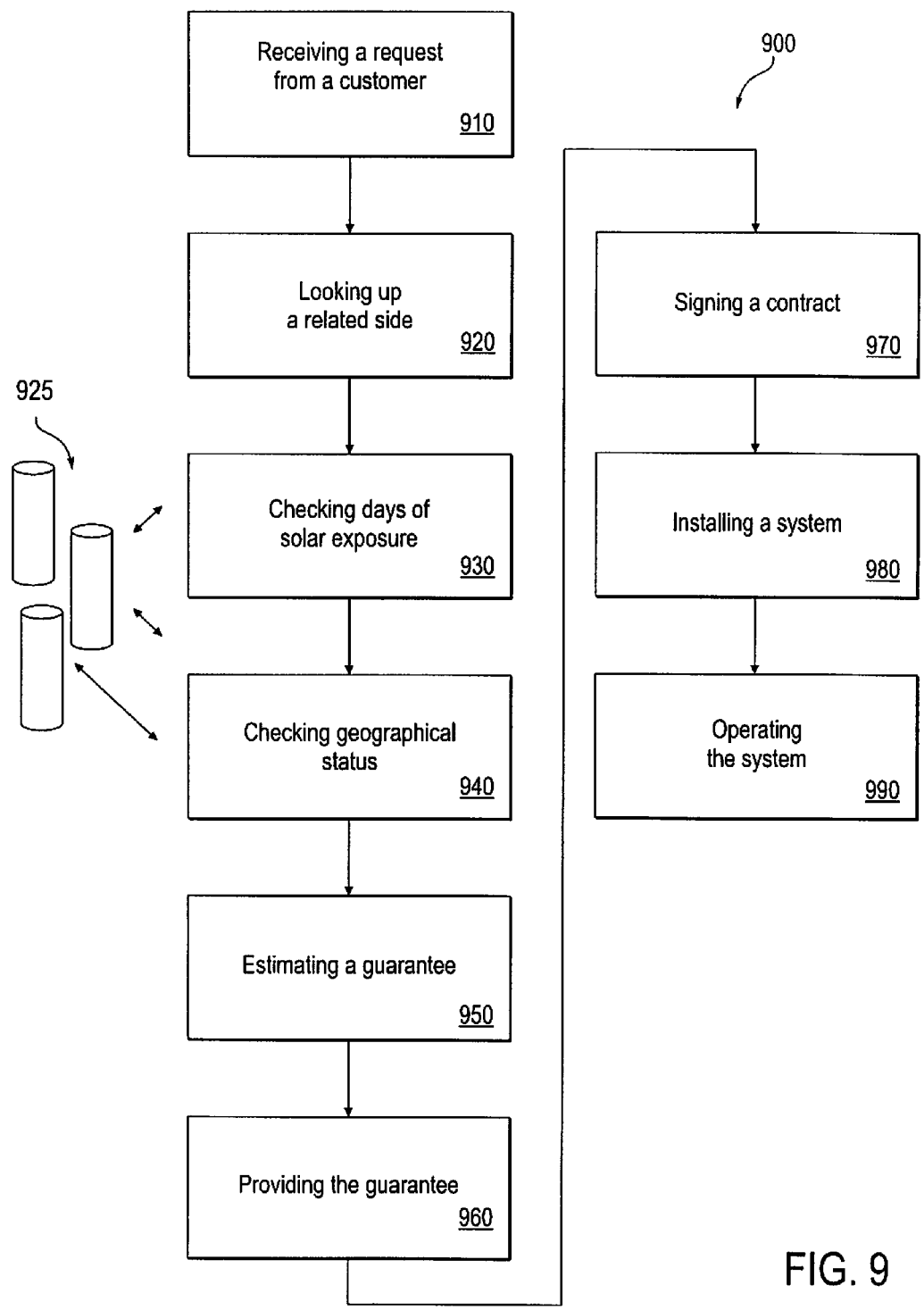
FIG. 9 illustrates an embodiment of a process of providing a solar cell array.

The solar arrays described above and other embodiments may be provided in a variety of ways. Under some circumstances, incentives may exist for a less efficient distribution process. However, ultimately, providing solar arrays in an efficient manner is likely to be useful. FIG. 9 illustrates an embodiment of a process of providing a solar cell array.

Process 900 and other processes of this document are implemented as a set of modules, which may be process modules or operations, software modules with associated functions or effects, hardware modules designed to fulfill the process operations, or some combination of the various types of modules, for example. The modules of process 900 and other processes described herein may be rearranged, such as in a parallel or serial fashion, and may be reordered, combined, or subdivided in various embodiments.

Process 900 includes receiving a request from a customer, looking up a site, checking days of solar exposure and geographical status, estimating and providing a guarantee, signing a contract, and installing and operating a system. Process 900 begins with receipt of a request from a customer at module 910. At module 920, a site or location for a solar installation is looked up. At module 930, a check into the number of days of solar exposure for the site is made, such as through use of databases of solar exposure keyed to geographical locations. Similarly, at module 940, a check of geographical information about the site is made, such as through geographical databases or satellite photographs of the site. Databases 925 may be used for the lookup and check processes. These checks provide basic information about whether the site is suitable for a solar installation, by determining how much solar exposure occurs, and whether geographical features may detract from available solar exposure. Checking the site geographically may also involve a site visit in some instances, to determine if trees will interfere, for example. Otherwise, these checks (of modules 930 and 940) may be automated—with software querying databases and determining whether initial criteria for solar exposure and geographical features are met.

Based on these checks, at module 950, a guarantee of solar power or heat capacity is estimated. This estimate may be derived automatically from data retrieved from databases 925, with factors for solar exposure and geographical features included in a formula, for example. At module 960, this guarantee, or a guarantee derived from the estimate of module 950, is provided to the customer in response to the request of module 910. If the guarantee is deemed useful by the customer, at module 970, a contract is signed. At module 980, a solar system is installed at the site, and at module 990, the solar system is operated. The solar system may be a solar power system or a solar heating system (or a combination of both), for example.

Figure 10:
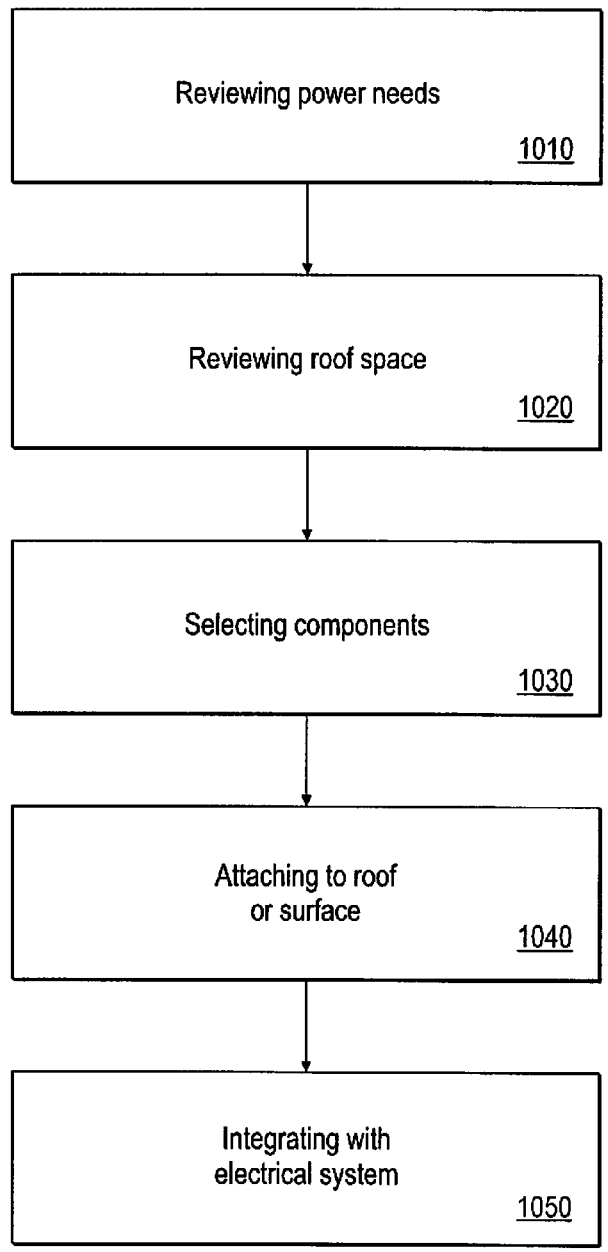
FIG. 10 illustrates an embodiment of a process of installing a solar cell array.

Further discussion of a method of installation may be useful. FIG. 10 illustrates an embodiment of a process of installing a solar cell array. Process 1000 includes reviewing power needs, reviewing roof or surface space, selecting components, attaching the components to a roof or surface, and integrating the solar cell array with an electrical system.

Process 1000 begins at module 1010, with a review of power needs. A home which typically uses 1 kW/h would (potentially) not be a suitable candidate for a large 5 kW solar cell system, for example. Thus, a review of power consumption and the built-in electrical system occurs. This review is potentially automated, by accessing information publicly available such as size of building, records of power requirements, and other similar information. Similarly, at module 1020, roof or other surface space is reviewed, determining where a solar system may be sited. This may include determining which surface faces the sun most often, whether the surface is suitable for attachment of a solar array, and whether any obstructions will interfere with solar power or heat generation. This review may also be automated, based on access of geographical information, for example.

At module 1030, components of the solar array are selected. Preferably, kits may be prepackaged for expected sizes of solar arrays, and such a kit may be selected. Alternatively, standard components may be selected and assembled into a solar array which is ready for installation. At module 1040, the solar array is attached to the roof or other surface. This may involve something as simple as use of fasteners or may involve filling components with ballast material (e.g. sand or water) and adhering the components to the surface. After installation, at module 1050, the solar cell array is integrated into an existing (or new) electrical system. For a heating array, integration with a heating or water system may be in order.

Note that this process may also involve surveying or inspecting a building to determine other opportunities to save power or efficiently use hot water, for example. Thus, an inspection and upgrades may be provided as part of the process of determining what solar array would be helpful and installing the solar array. This inspection may also reveal some details of the amount of power which is likely to be consumed, and whether excess power can be generated, for example.

Figure 11:
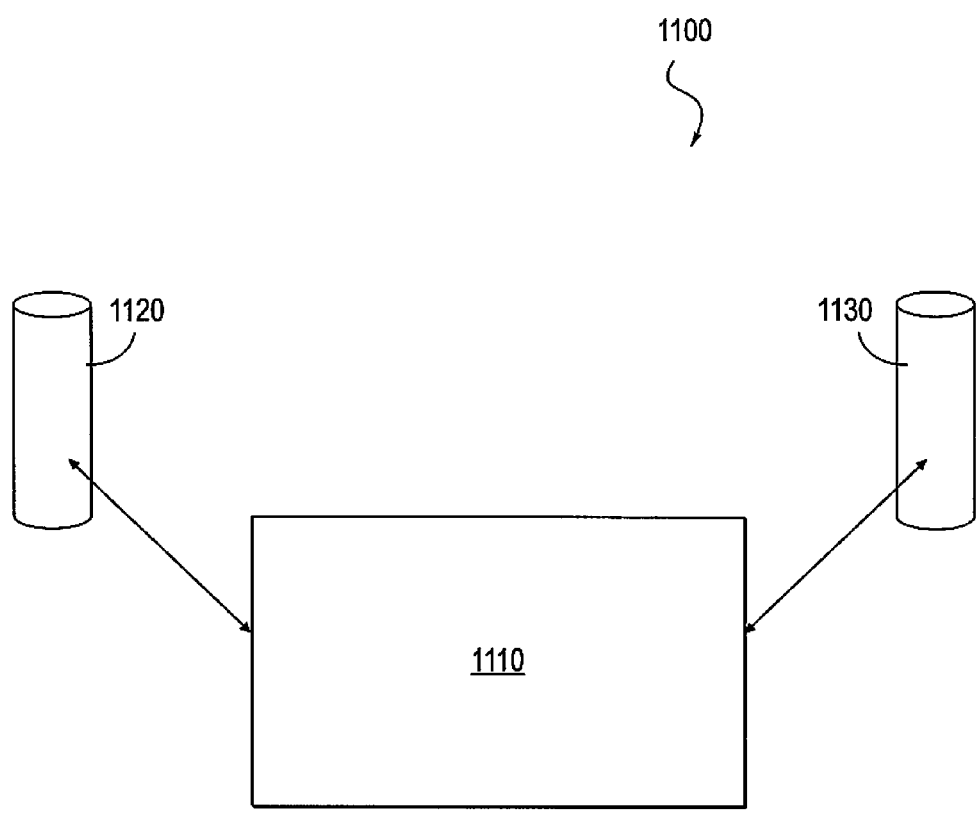
FIG. 11 illustrates an embodiment of a system useful in providing a solar cell array.
Figure 12:
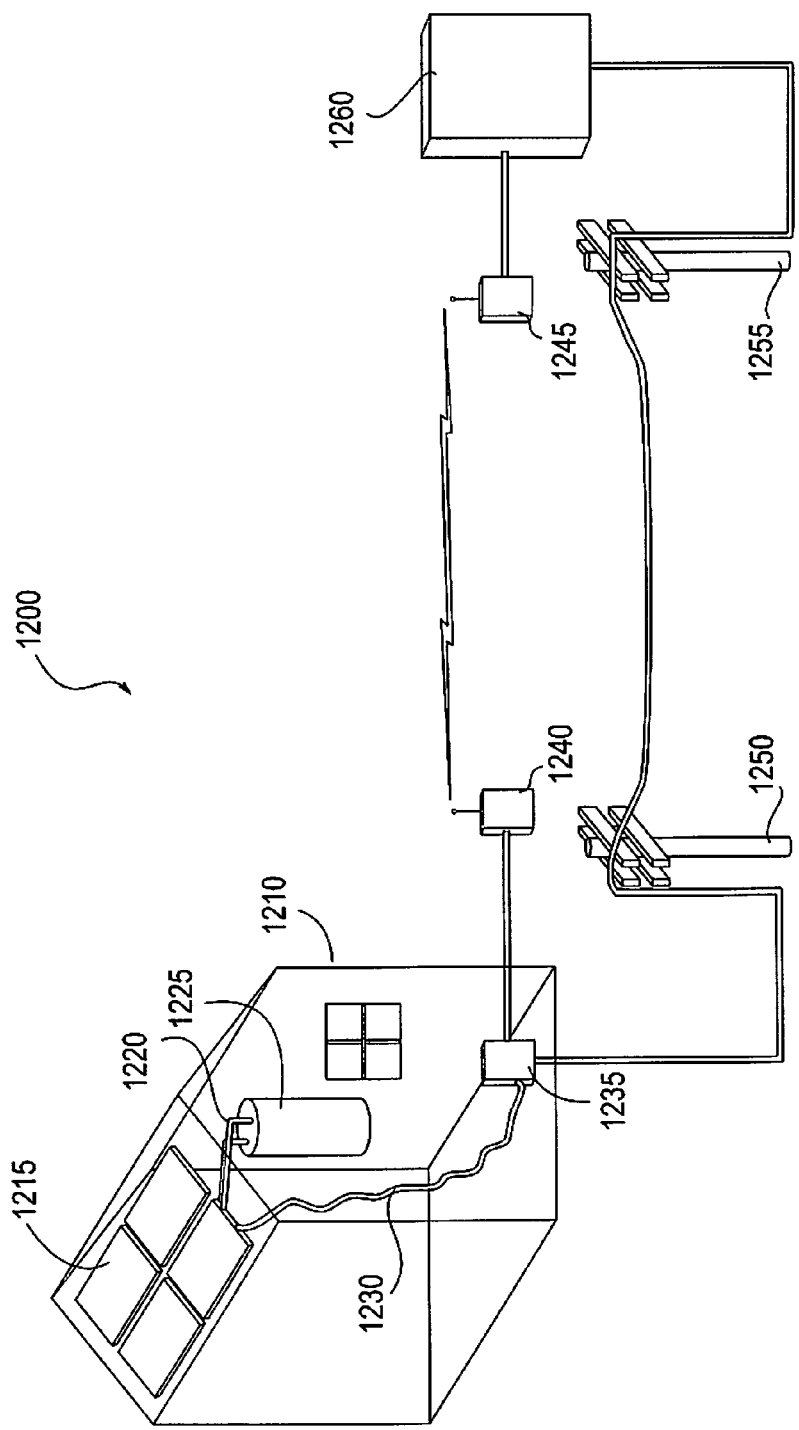
FIG. 12 illustrates an embodiment of a system for solar power production, heating, and monitoring.

Various systems may be used in conjunction with evaluation of sites for solar arrays. FIG. 11 illustrates an embodiment of a system useful in providing a solar cell array. System 1100 includes a computer or terminal, and databases which may be accessed during the process. Terminal 1110 is a computer or similar device, useful for accessing stored data in databases 1120 and 1130. In one embodiment, database 1120 is a geographical database, such as a database of satellite photos or a geographical database as is maintained by the United States government with topographical information. Likewise, in one embodiment, database 1130 is a database with information on expected solar days or number of solar hours per day for geographical regions. Thus, databases 1120 and 1130 may be checked through terminal 1110 to determine suitability of a location for solar power or heat generation. Note that databases 1120 and 1130 may be accessible over a network such as a local area network or the internet, for example.

Where a solar system is used may be instructive as well. FIG. 12 illustrates an embodiment of a system for solar power production, heating, and monitoring. System 1200 is an overall system including a solar installation at a house, a monitoring station or office, and available linkages therebetween. House 1210 has a solar array 1215 installed. Solar array 1215 provides heated water which travels through pipes 1220 to water heater 1225. Solar array 1215 also provides electrical power which travels through cable or wiring 1230 to power junction box 1235. Junction box 1235 may implement an isolation or separation function, along with providing access to a power grid and potentially a surveillance component, too.

By way of illustration, two linkages for junction box 1235 are shown. Pole 1250 is linked to junction box 1235, allowing for telephone-line based monitoring of the junction box 1235, and corresponding monitoring of solar array 1215 for electrical performance. If array 1215 suddenly starts providing less power than expected, a signal can travel along a telephone wire to tower 1255, and then to a monitoring station 1260. Alternatively, only raw data is transmitted, and monitoring station 1260 is expected to determine, either manually or automatically, whether the raw data indicates a problem or not. Whether data or a warning is sent out, it may also be done based on a wireless solution. Transmission station 1240 is coupled to junction box 1235, allowing station 1240 to either review incoming communications or to simply pass along incoming communications. Receiver station 1245 is provided near monitoring station 1260, and allows for receipt of data provided over airwaves about the project. A wireless coupling between stations 1240 and 1245 occurs, and information about a particular location and customer may influence collecting such statistics.

Note that the solar array 1215 is illustrated as mounted on the roof of the house 1210. However, the solar array 1215 may be mounted on any structure which provides good sun exposure. Also, the solar array 1215 may be mounted using fasteners or an adhesive to attach the frame to the roof. Alternatively, straps may attach the frame to the roof or other supporting structure if attachment points are not convenient to where the solar array 1215 needs to be attached, for example.

Figure 13:
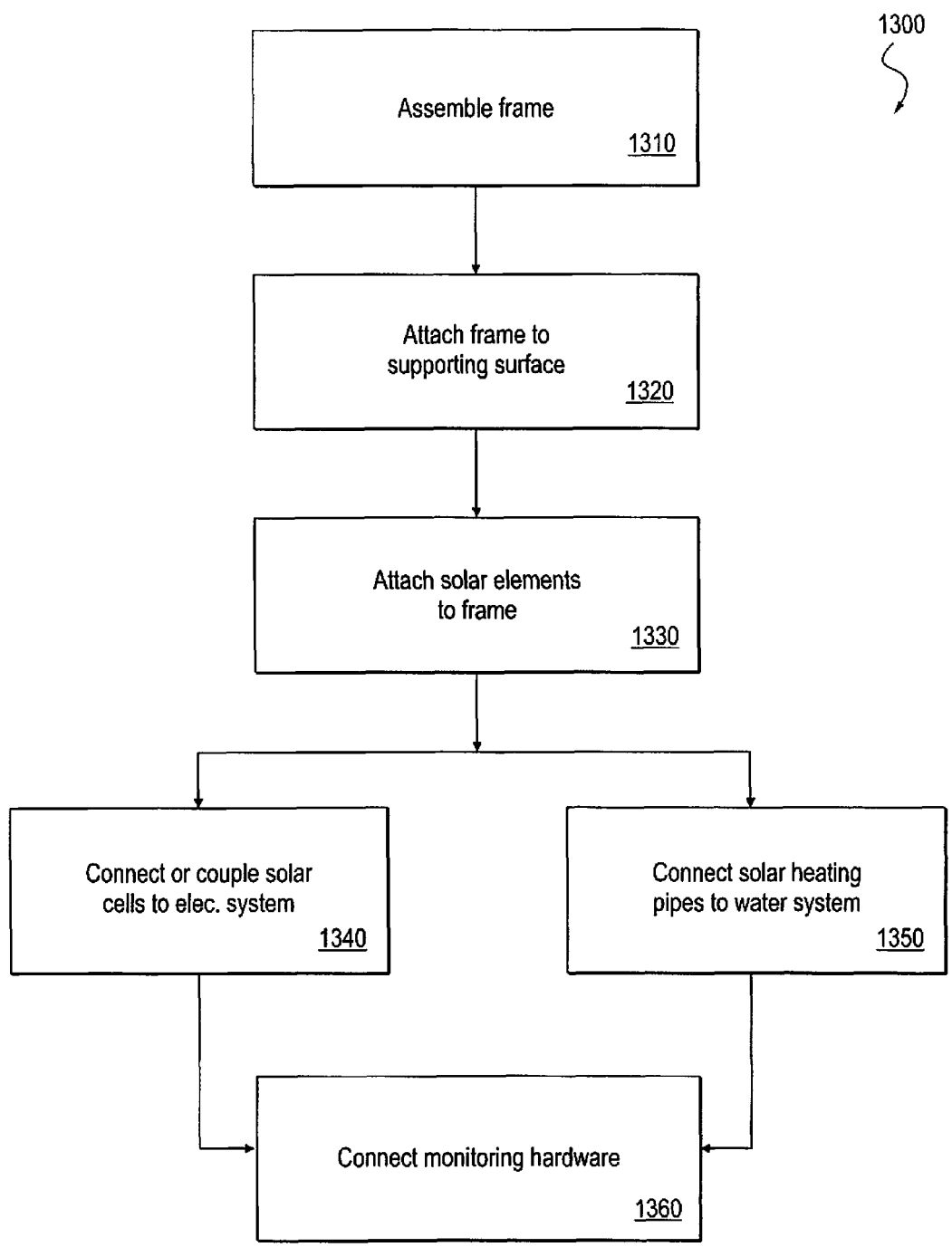
FIG. 13 illustrates an embodiment of a process of installing a solar array.

An exemplary installation procedure may be useful for further understanding the solar array and associated processes. FIG. 13 illustrates an embodiment of a process of installing a solar array. Process 1300 includes assembling a frame, attaching the frame to a supporting surface, attaching solar panels to the frame, connecting or coupling the solar panels to existing systems of the structure, and connecting monitoring hardware. Thus, process 1300 preferably results in an installed solar array which is integrated into a supporting house or building.

Process 1300 begins with assembly of a frame at module 1310. The frame may be one such as is illustrated in FIG. 1, for example. Moreover, it may be assembled before it is moved up on a roof, or after components are moved up on a roof, for example. Additionally, as the frame may be made of simple interlocking parts, this assembly process may occur as components for the frame are selected.

At module 1320, the frame is attached to the supporting surface. The supporting surface is traditionally the roof of a building which is to use the solar array. However, that supporting surface may be a cover of a carport, a trellis, or some other surface on which the frame may be mounted. Moreover, in some instances, the solar panel and frame may be mounted on a platform which moves to attempt to maximize exposure to the sun.

At module 1330, solar panels are attached to the frame. The solar panels may be photovoltaic cells, heating elements, or some combination of the two. A combination may be, for example, a photovoltaic cell with an underlying water pipe which allows for heat transfer to water in the pipe.

At module 1340, solar cells are connected or coupled to the electrical system. Such a coupling may involve routing electrical energy through an inverter, for example. Moreover, in coupling the solar array to a junction box, some form of automatic switch may be installed, with the switch triggering when the external power grid loses power (brownout or blackout), and thereby allowing the house to retain solar power without attempting to power the grid from the solar array.

Likewise, at module 1350, solar heating pipes may be connected to an existing water system, allowing for supply of hot water when solar heating is available. This may involve connecting or coupling through a pump, for example, to allow water to get to or from the solar array. Additionally, at module 1360, monitoring hardware may be installed. Monitoring hardware may detect current generated by the photovoltaic cells or temperature and pressure of water for solar heating panels and record data related to these detections. The monitoring hardware may also provide such data to a local system such as a computer, or to a transmission station for transmission to a remote monitoring facility (or both).

Figure 14A:
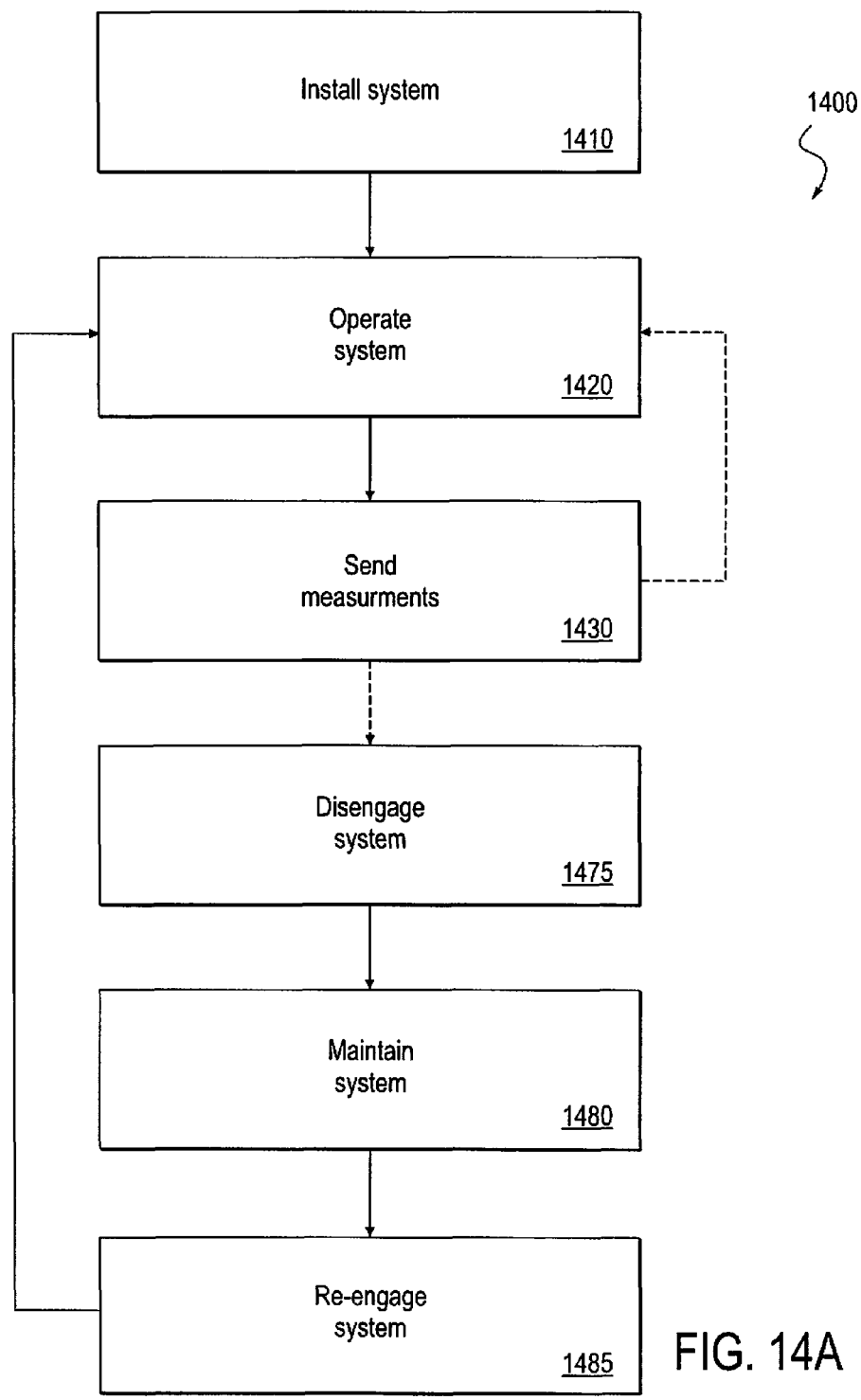
FIG. 14A illustrates an embodiment of a process of operating and monitoring a solar installation.

With the system installed, a process for operating the system may also be useful. FIG. 14A illustrates an embodiment of a process of operating and monitoring a solar installation. Process 1400 includes installing the system, operating the system, sending measurements, disengaging the system if necessary, maintaining the system, and re-engaging the system. Thus, process 1400 includes operation and maintenance of the system.

Process 1400 initiates with installation of the solar installation at module 1410. Installation may be handled through a process such as process 1300 of FIG. 13, for example. The process 1400 then proceeds to module 1420 and operation of the solar installation. This may involve generation of power and/or heating of water. At module 1430, measurements of the effectiveness of the system are made, and those measurements are sent to a monitoring system, either on-site (local), off-site, or both.

Monitoring of the system may result in continued operation at module 1420, or in disengagement of the system for maintenance at module 1475. If the system is disengaged, this will typically be responsive to maintenance personnel acting to disengage the system. Then, at module 1480, the system will be maintained—necessary repairs, adjustments or replacements may be made without fear of an electrical shock from an external power grid or a rush of hot water from a water heater. The system may then be re-engaged or reconnected at module 1485, once the system is believed to be ready to operate.

Figure 14B:
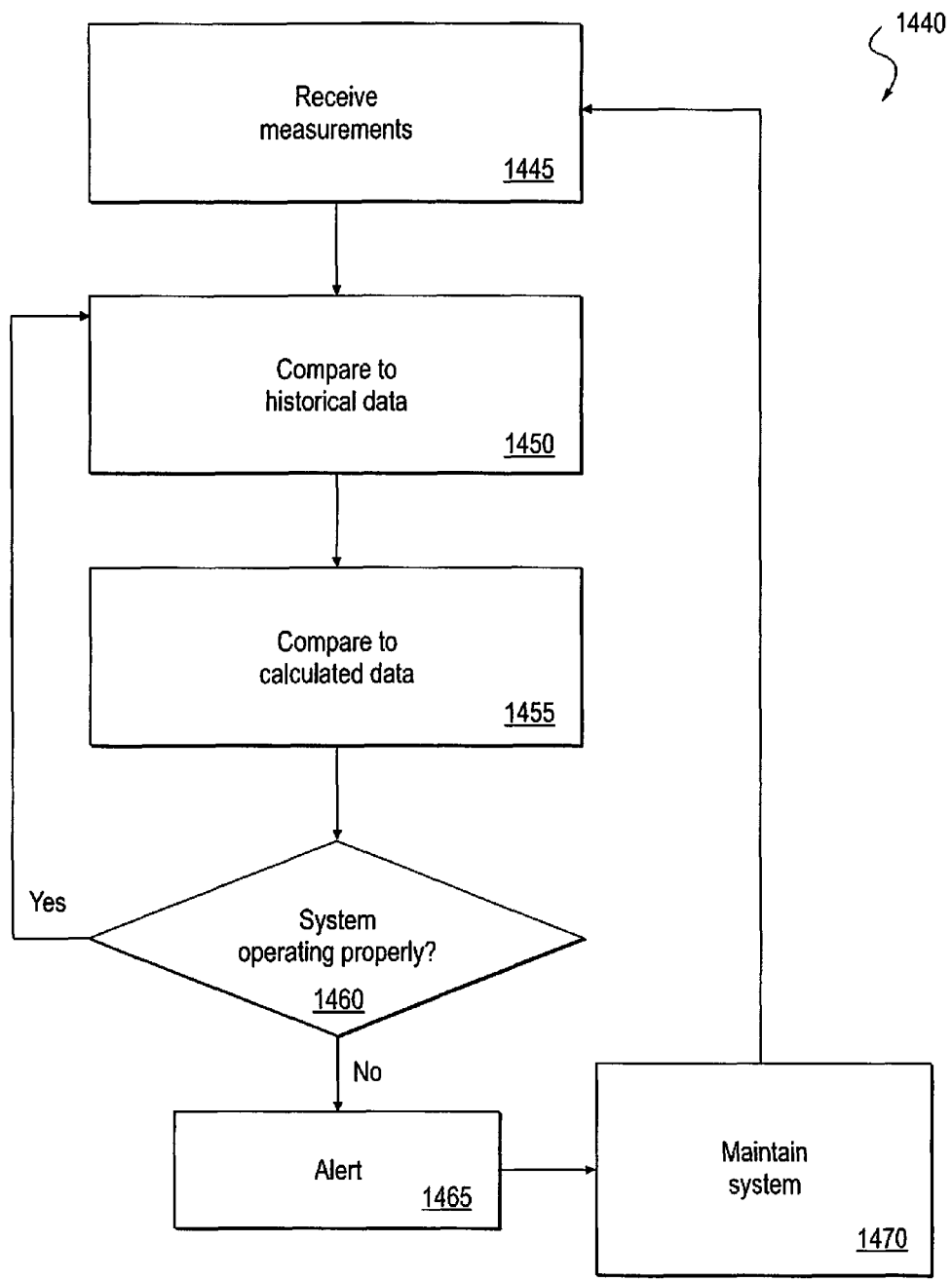
FIG. 14B illustrates an embodiment of a process of monitoring a solar installation.

Determining whether to repair a system may be done locally or remotely, based on measured performance. FIG. 14B illustrates an embodiment of a process of monitoring a solar installation. Process 1440 includes receiving measurements, comparing to historical data and calculated data, determining if the system is operating properly, and potentially alerting an operator and maintaining the system.

Process 1440 begins with module 1445 and receiving measurements from a solar array. At module 1450, the measurements (data) are compared with historical data. At module 1455, the received measurements are also compared to calculated data, such as expected solar power output or efficiency, for example. The calculated data may be related to or derived from a calculated guarantee of solar power output, for example.

At module 1460, a determination is made as to whether the solar array is operating properly. This determination may indicate that the solar array has experienced a sudden and unexpected drop in power or heat output. Alternatively, it may indicate the solar array is not performing up to par with regard to a guaranteed level of performance. If the solar array is performing adequately, the process returns to receiving measurements at module 1445. If the solar array is not performing adequately, at module 1465, an operator of a system is alerted as to the situation. The system is then maintained, such as through dispatch of a maintenance person or crew to the solar array, at module 1470. Thus, maintenance may be invoked automatically based on remote monitoring.

Note that this process may further include monitoring whether an installed solar system is delivering power adequate to needs of a house, for example. Thus, a system may have been installed to deliver 1 kW, but the needs of the house may prove to be greater, in the range of 1.5 kW, thus resulting in the house always drawing power from an external grid. This may point toward installing an enlarged system if the owner so desires. Similarly, if the house consistently uses more hot water than is supplied, that may be recorded and the owner notified. When consumption outstrips supply, this may indicate a problem, either a malfunctioning appliance which consumes excess power or a water leak, for example. Thus, increase in supply may not be necessary where demand may be decreased.

Figure 15:
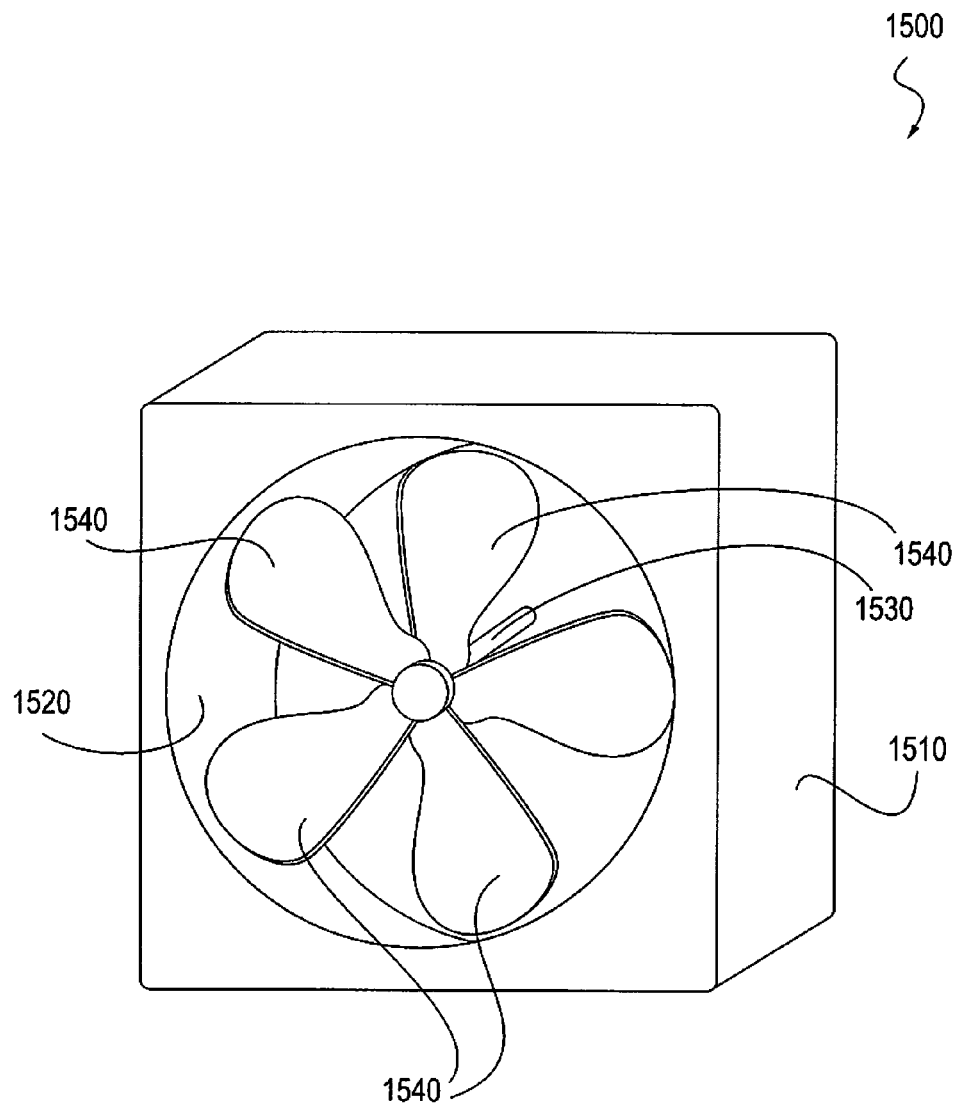
FIG. 15 illustrates an embodiment of a pancake fan.

In some embodiments of the various systems, it may be useful to add on a cooling component. FIG. 15 illustrates an embodiment of a pancake fan. Pancake fans are generally understood to be relatively self-contained and typically thin relative to a diameter of the fan. Pancake fan 1500 includes a housing with an aperture and a set of fan blades mounted on an axle. Axle 1530 may be attached to coupled to housing 1510, such as through a side panel or grate (not shown). Axle 1530 may include a motor for turning the fan, or be run from a separate motor hidden in the housing (also not shown). Fan blades 1540 are attached to the axle 1530, and may be integrally formed with the axle 1530. Fan blades revolve around axle 1530 within aperture 1520, an opening within housing 1510. A power source may also be supplied, such as from an electrical system.

Pancake fan 1500 may be used with a solar array and frame to provide ventilation and cooling as necessary. In some systems, pancake fan 1500 may be mounted at or near a slot 280 of a corner support 290 of FIG. 2C, to draw or propel air through the interior of an associated frame. This may be useful to prevent overheating of photovoltaic cells, for example. Some photovoltaic panels decrease in efficiency as their temperature rises. Thus, this may enhance efficiency of photovoltaic panels. Fan 1500 may be powered from an associated solar array in such an instance, and may be controlled by some form of local controller which also monitors measurements of the solar array, for example.

Similarly, air gaps or other structural features in the frame may be placed to create a chimney effect or continuous air current, to cool photovoltaic panels and increase performance. In another embodiment, the skirt may be perforated, allowing air flow which may cool the panels or dry out the system after rain, without requiring a fan. The skirt refers to the outer surface of the frame, however perforations would typically be extended through holes in the inner surface of the rail as well.

Another aspect of various embodiments that may provide further understanding is the cross-section of some components. FIG. 16A illustrates an embodiment of a frame in a cross-section view. FIG. 16B illustrates the embodiment of a FIG. 16A in a perspective view. Frame component 1600 includes a base support 1620, beveled exterior surface 1630, ledge 1610, ledge 1640 and top surface 1650. Typically, as can be seen in FIG. 16B, a solar panel 1675 will rest on ledge 1610. This is essentially the configuration illustrated with respect to components such as those in FIGS. 2A, 2B and 2C, for example.

In contrast, another cross-section can be used with essentially the same components in other embodiments. FIG. 16C illustrates an alternate embodiment of a frame in a cross-section view. FIG. 16D illustrates the embodiment of a FIG. 16C in a perspective view. Component 1660 has a base support 1620, ledge 1610, top surface 1650, beveled exterior edge 1630, as with component 1600. However, component 1660 has a top flange 1670 extending laterally outward from the top portion of base support 1620, such that the top surface 1650 is extended outward, and a slot 1680 is defined between flange 1670 and ledge 1610. This provides a "C" shaped cross-section into which a solar panel may be fit. Thus, the frame may be assembled around the solar panel 1675, with the frame holding the solar panel 1675 in place by virtue of its surrounding relationship with the edges of the panel 1675. This cross-section may be used with any of the components discussed in various embodiments of this document.

Also, in relationship to the various components of different embodiments, it should be noted that these components may be made of a variety of materials. These components may be molded or otherwise formed as single pieces of such materials as plastics or metals (e.g. aluminum). Likewise, these components may be assembled from various materials, such that the components may be made from plastic, metal, wood, or any other material which is expected to withstand the environment in which the system is deployed. Manufacturing cost and tolerances will play a part in choosing materials, but the components are generally intended to be interchangeable to allow for ease of assembly and use.

Also of potential interest is an alternate structure for a single panel system. FIG. 17 illustrates an alternate embodiment of a frame in a top schematic view. While FIG. 8 provides a design for a multiple panel embodiment with straight support components, slightly different components can be used in making a single panel array with straight components. Array 1700 includes corner supports, straight edge supports, and the solar panel. Corner supports 1715 are relatively small corner support pieces, with a shape either using two identical arms or two similar arms at right angles. Edge supports 1725 support the long edges of solar panel 1740, while edge supports 1735 support the short edges of solar panel 1740. The corners of solar panel 1740 are supported by corner supports 1715. The interlock or fastening between the supports (1715, 1725, 1735) uses a design identical to or similar to the end designs for the components previously discussed, such as the component of FIG. 2B, for example.

Figure 18:
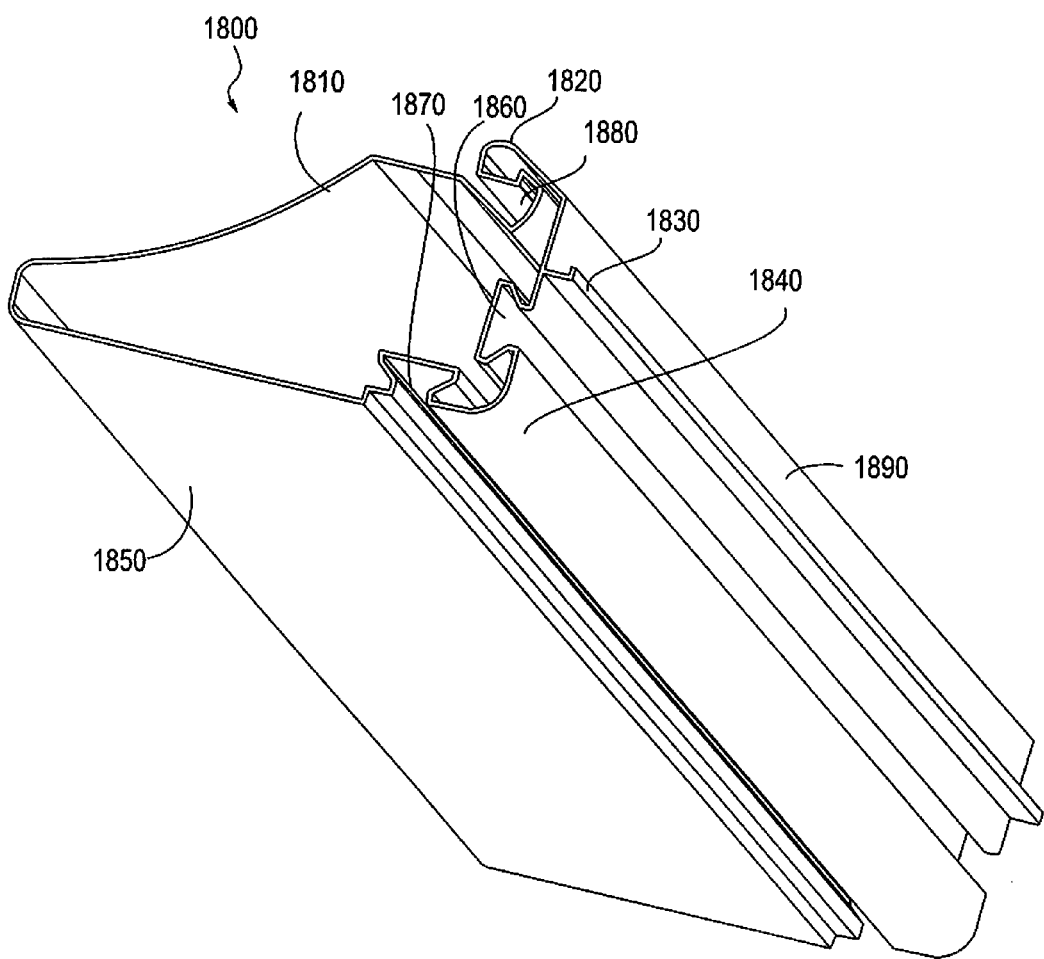
FIG. 18 illustrates an alternate embodiment of a side rail in a perspective view.

Additional alternative components may be used to substitute for parts of a frame, or to provide an alternate embodiment of a frame entirely. FIG. 18 illustrates an alternate embodiment of a side rail in a perspective view. Side rail 1800 may be used in place of other side rails previously described and illustrated. Rail 1800 includes a base 1850 and a curved upper portion 1810. Extending out from curved upper portion 1810 is a j-shaped portion 1820, which forms slot 1880. Extending continuously from portion 1820 is side 1890. J-shaped portion 1820 includes a flat segment extending out from curved upper portion 1810, another flat portion extending therefrom at a small angle, a curved segment extending from the angled segment, a stepped segment extending back from the curved segment above the flat portion at an angle, and a top curved segment extending from the stepped segment to the side 1890. Side 1890, along with rounded corner

1840, defines slot 1860. Additionally, ledge 1830 extends out from side 1890. Corner 1840 and base 1850 also join to form slot 1870. Thus, rail 1800 provides a continuous piece with a set of three slots into which various components may be inserted.

While the rail is shown with a skirt as part of a unitary unit, other options exist for assembly of such a frame. For example, a frame may be made up of rails with a rectangular cross-section, to which a skirt with a more aesthetically pleasing appearance is bolted or otherwise attached. Thus, while unitary components are described and illustrated, it should be borne in mind that these components may be subdivided or combined in various embodiments, while still providing an embodiment within the spirit of that which is described.

Figure 19:
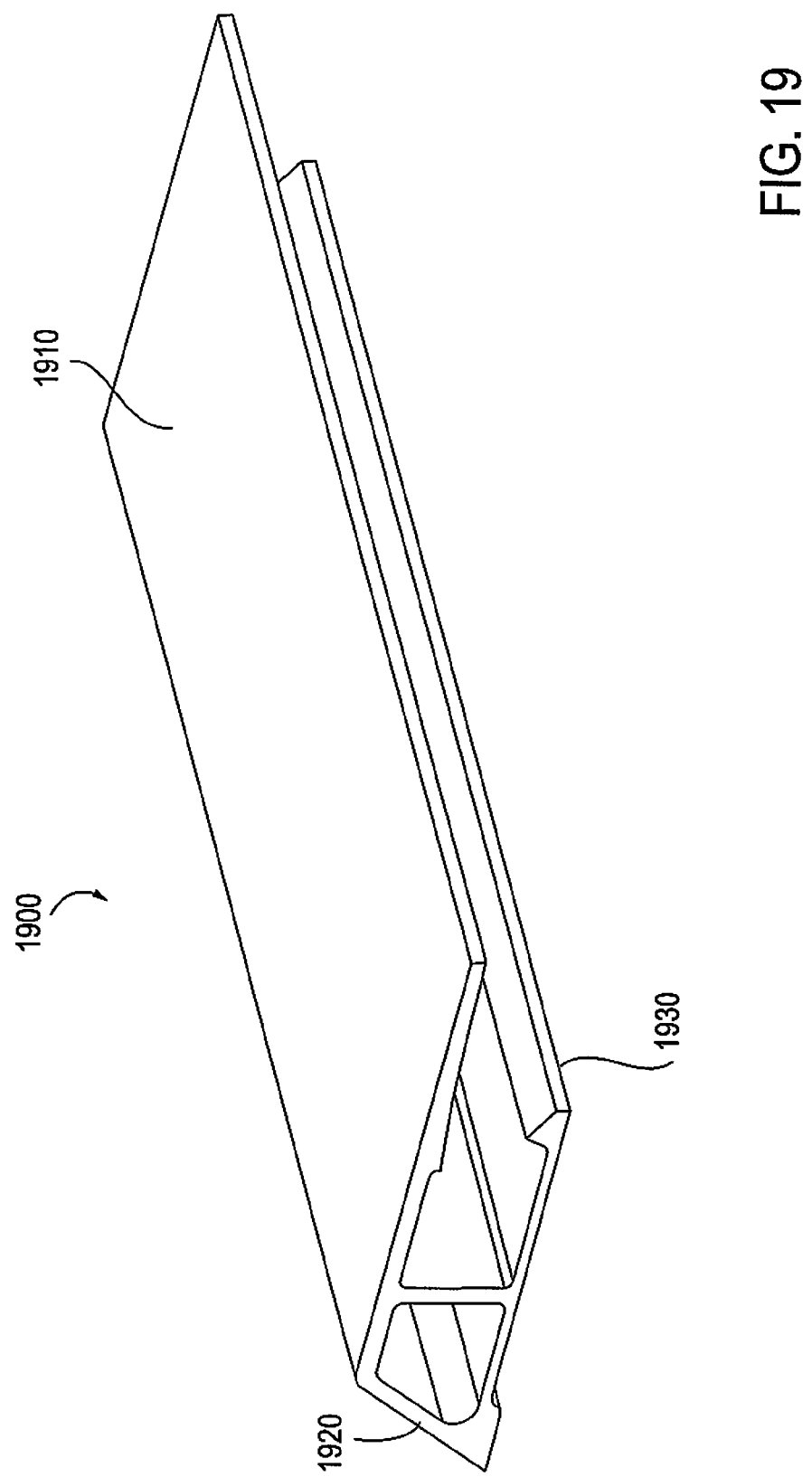
FIG. 19 illustrates an embodiment of a cap in a perspective view.

A cap may be used with rail 1800. FIG. 19 illustrates an embodiment of a cap in a perspective view. Cap 1900 includes a top 1910, base 1930 and an angled side wall 1920. As illustrated, side wall 1920 attaches to base 1930 and to top 1910, such that top 1910 and base 1930 are substantially parallel. An internal wall may be included as shown. Base 1930 is provided in the illustration with a lip at one end. Additionally, top 1910 extends beyond base 1930, and may also include a shallow lip as illustrated.

Figure 20:
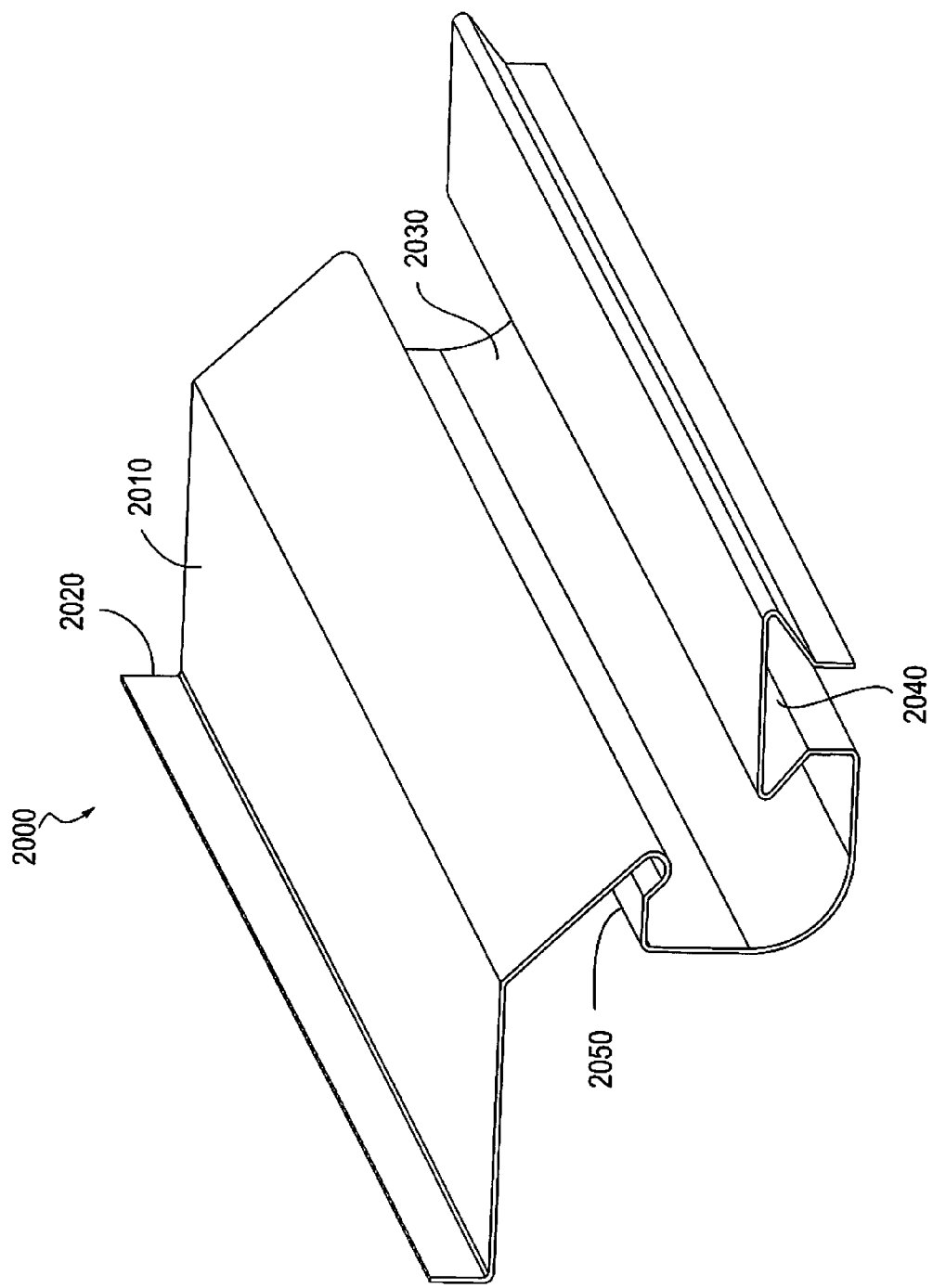
FIG. 20 illustrates an embodiment of an underside support in a perspective view.

Also potentially useful with rail 1800 is an underside support. FIG. 20 illustrates an embodiment of an underside support in a perspective view. Underside support 2000 includes an angled top portion 2010, a bottom corner 2030, and a flange 2020. Top portion 2010 includes two continuously joined segments at angles thereto. Attached to the end of one segment is flange 2020. Attached to the end of the other segment is a portion of rounded corner 2030. Rounded corner 2030 and angled top portion 2010 collectively define tab 2050. Additionally, rounded corner 2030 extends out with a trapezoidal set of segments to define tab 2040. Thus, underside support 2000 may be mated with rail 1800 to provide a ledge upon which a component such as a solar panel may rest.

Figure 21:
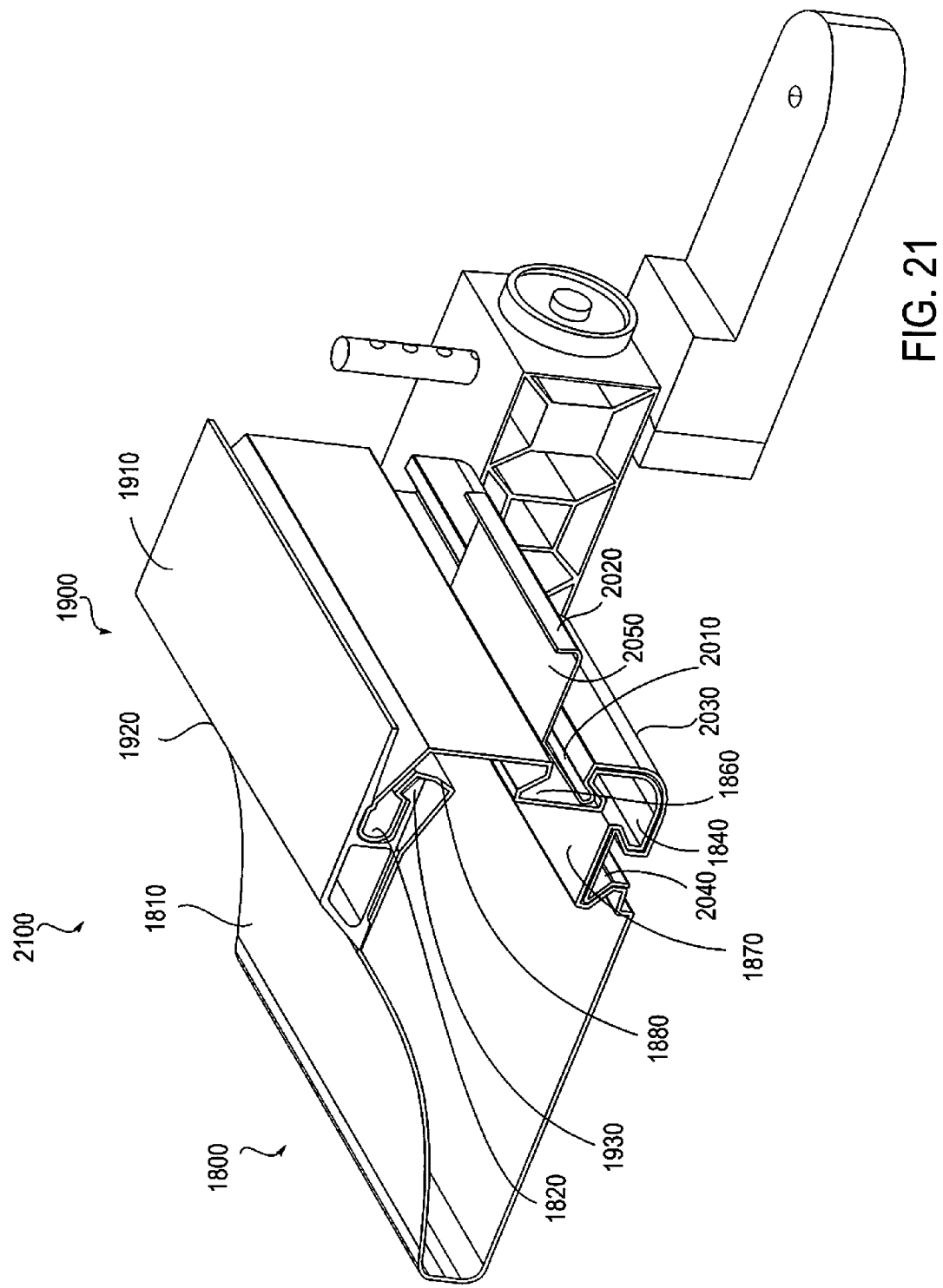
FIG. 21 illustrates an embodiment of an assembly of the side rail of FIG. 18, the cap of FIG. 19, the underside support of FIG. 20 and the roof fastener of FIG. 22 in a perspective view.

Various components are described separately, but those components collectively combine to form a frame for solar panels. FIG. 21 illustrates an embodiment of an assembly of the side rail of FIG. 18, the cap of FIG. 19, the underside support of FIG. 20 and the roof fastener of FIG. 22 in a perspective view. Side rail 1800 is mated with top cap 1900, with base 1930 inserted into slot 1880. In particular, the lip at the end of base 1930 mates with the stepped segment of j-shaped portion 1820. Similarly, side rail 1800 mates with underside support 2000. Tab 2040 mates with slot 1870, and tab 2050 mates with slot 1860, allowing underside support 2000 to slide along side rail 1800. Additionally, roof fastener 2200 mates with side rail 1800. Tabs 2240 and 2250 (not illustrated) mate with slots 1870 and 1860 respectively, allowing a similar sliding relationship with side rail 1800 as is provided for underside support 2000. As illustrated, roof fastener 2200 uses pin 2235 to couple pivot 2270 to slider 2210. Pin 2235 passes through a through-hole 2218 in slider 2210, and is held in place by pin 2260 (not shown) which attaches to adjustment wheel 2262. Pin 2235 also passes through through-hole 2277 of pivot 2270, and is retained against the bottom of pivot 2270 with an endcap (or head) 2234 (not shown).

Figure 22A:
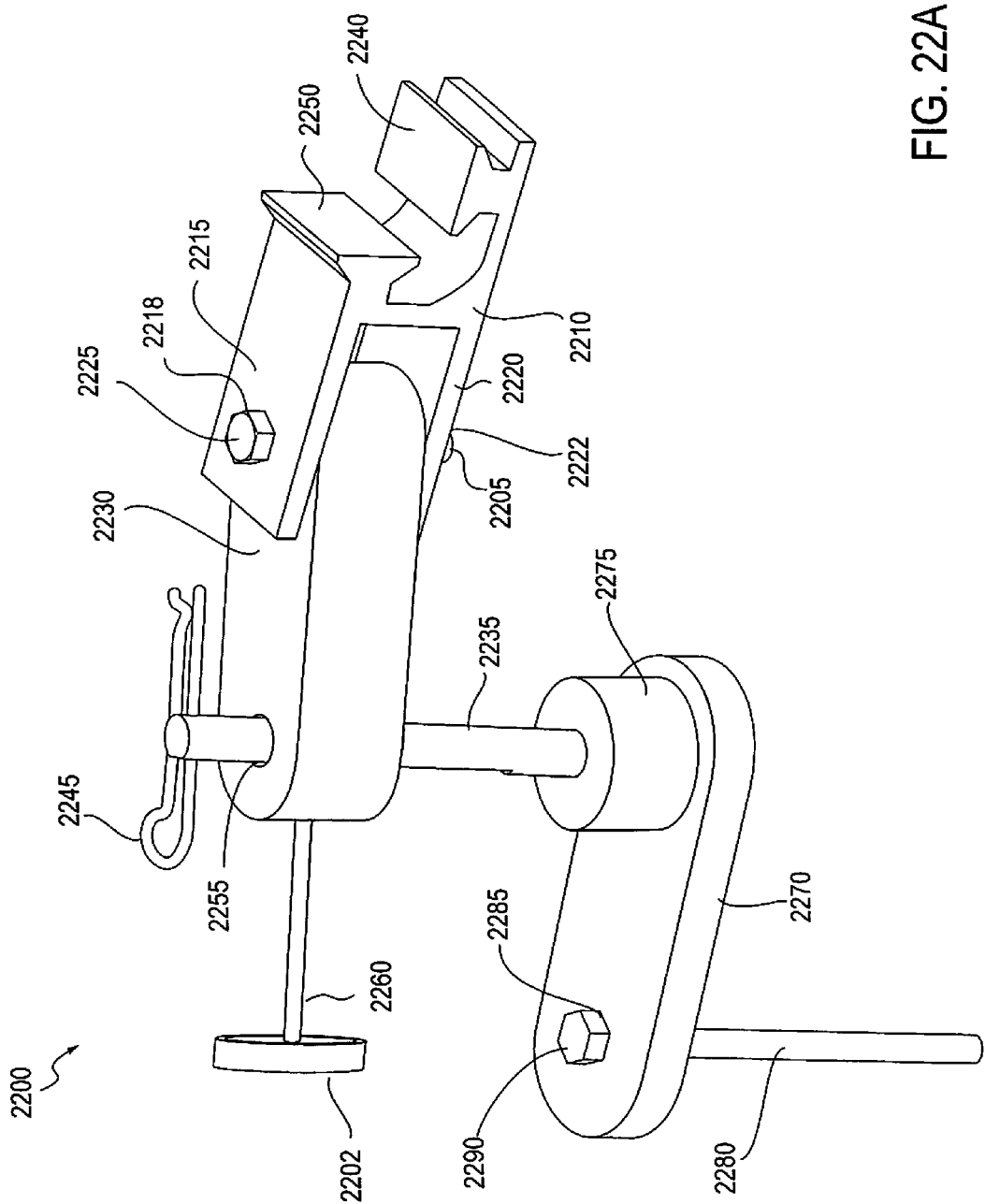
FIG. 22A illustrates an embodiment of a roof fastener in a perspective view.

As indicated in FIG. 21, a roof fastener may be used with rail 1800 as well. FIG. 22A illustrates an embodiment of a roof fastener in a perspective view, and FIG. 22B illustrates the embodiment of a roof fastener in an exploded view. Fastener 2200 may be implemented in a variety of ways, such that the fastener 2200 of FIG. 21 includes some different embodiments of components used in the fastener 2200 of FIG. 22. Fastener 2200 of FIG. 22 includes slider 2210, pin 2225, pivot 2230, pin 2235, pivot 2270, pin 2290, fastener 2245, and set-screw 2260. Slider 2210 is joined to pivot 2230 through use of pin 2225. Specifically, slider 2210 includes top and bottom plates 2215 and 2220, each of which have through-holes 2218 and 2222, respectively. Shaft 2205 of pin 2225 passes through through-holes 2218 and 2222, along with through-hole 2255 of pivot 2230, to rotatably connect pivot 2230 to slider 2210. Slider 2210 also includes tabs 2240 and 2250, which are provided at right angles to each other on one end of the set of flanges 2215 and 2220. Thereby, slider 2210 can also connect to a rail 1800 as shown with a similar embodiment in FIG. 21.

Pivot 2230 is also coupled to pivot 2270 through pin 2235. A through-hole 2255 is used to connect pin 2235 to pivot 2270. Similarly, through-hole 2277 of pivot 2270 is used to connect pin 2235 to pivot 2270, and thereby to rotatably couple pivot 2230 to pivot 2270. Through-hole 2238 of pin 2235 receives fastener 2245, which retains pin 2235 within through-hole 2255. Additionally, set-screw 2260, with adjustment wheel 2262, may force pin 2235 against an internal side of through-hole 2255 for a friction-based hold of pin 2235. Base 2234 retains pin 2235 within through-hole 2277 of pivot 2270. Pivot 2270 includes cylindrical portion 2275 (through which through-hole 2277 passes) along with through-hole 2285. Pin 2280 passes through through-hole 2285, and may then be used to attach to a roof, or some component attached to a roof such as a bracket (not shown). Head 2290 retains pin 2280 within through-hole 2285. With the other end of pin 2280 fastened elsewhere (on a roof for example), this is sufficient to maintain the connection. The components of fastener 2200 provide a highly flexible pivot component which can slide along a rail. With several options for pivoting the component, and the ability to slide the component along the rail, an initial anchor location can be much more flexible when a rail or frame must be moved slightly to accommodate other aspects of an installation.

Figure 23:
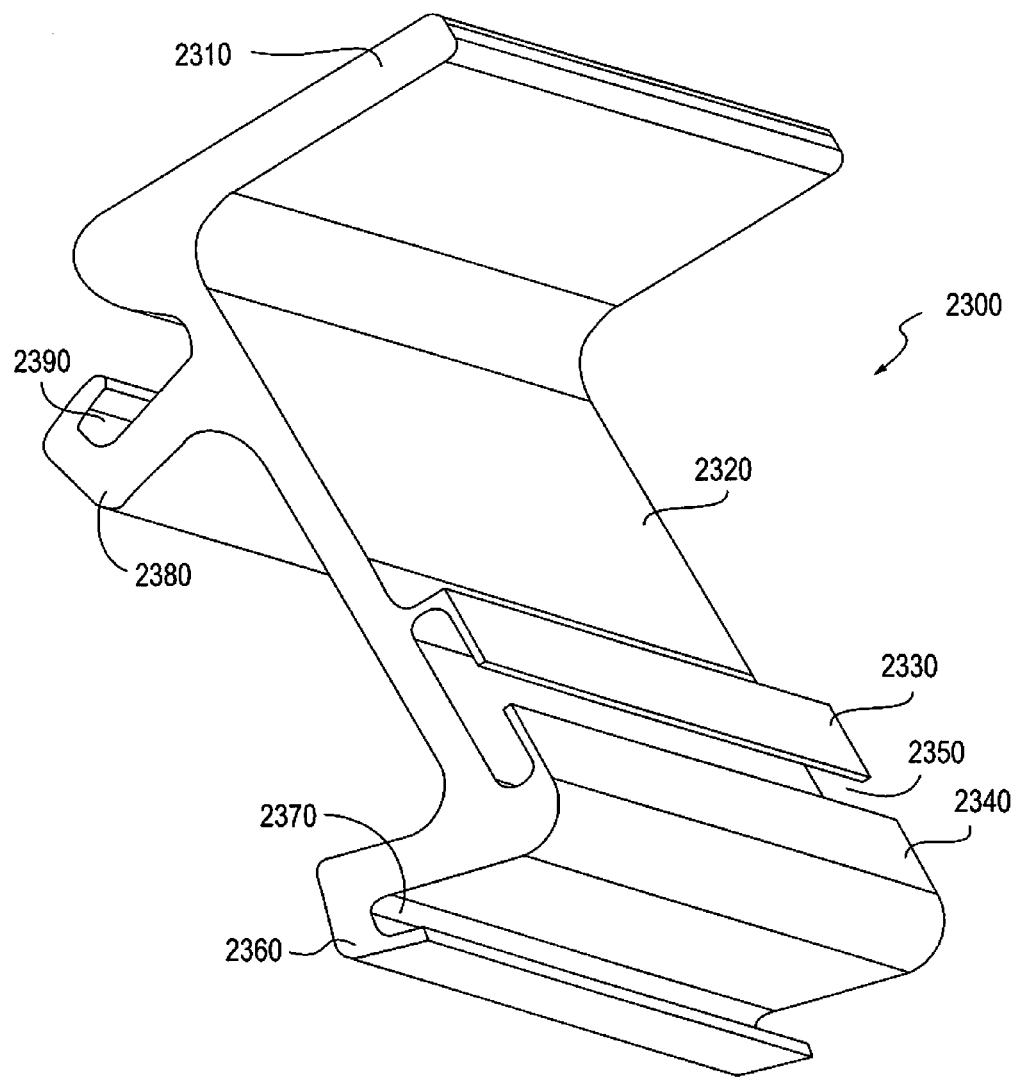
FIG. 23 illustrates an embodiment of a snap rail in a perspective view.

A snap rail may also be used to hold a solar panel in place. FIG. 23 illustrates an embodiment of a snap rail in a perspective view. Snap rail 2300 includes a top flange 2310 which is connected to a side plate 2320. Side plate 2320, on a first surface, includes a first j-shaped bracket 2380 which defines slot 2340 and a second j-shaped bracket 2360 which defines slot 2370. On a second surface opposite the first surface, side plate 2320 includes brackets 2330 and 2340, which oppose each other to form slot 2350.

Figure 24:
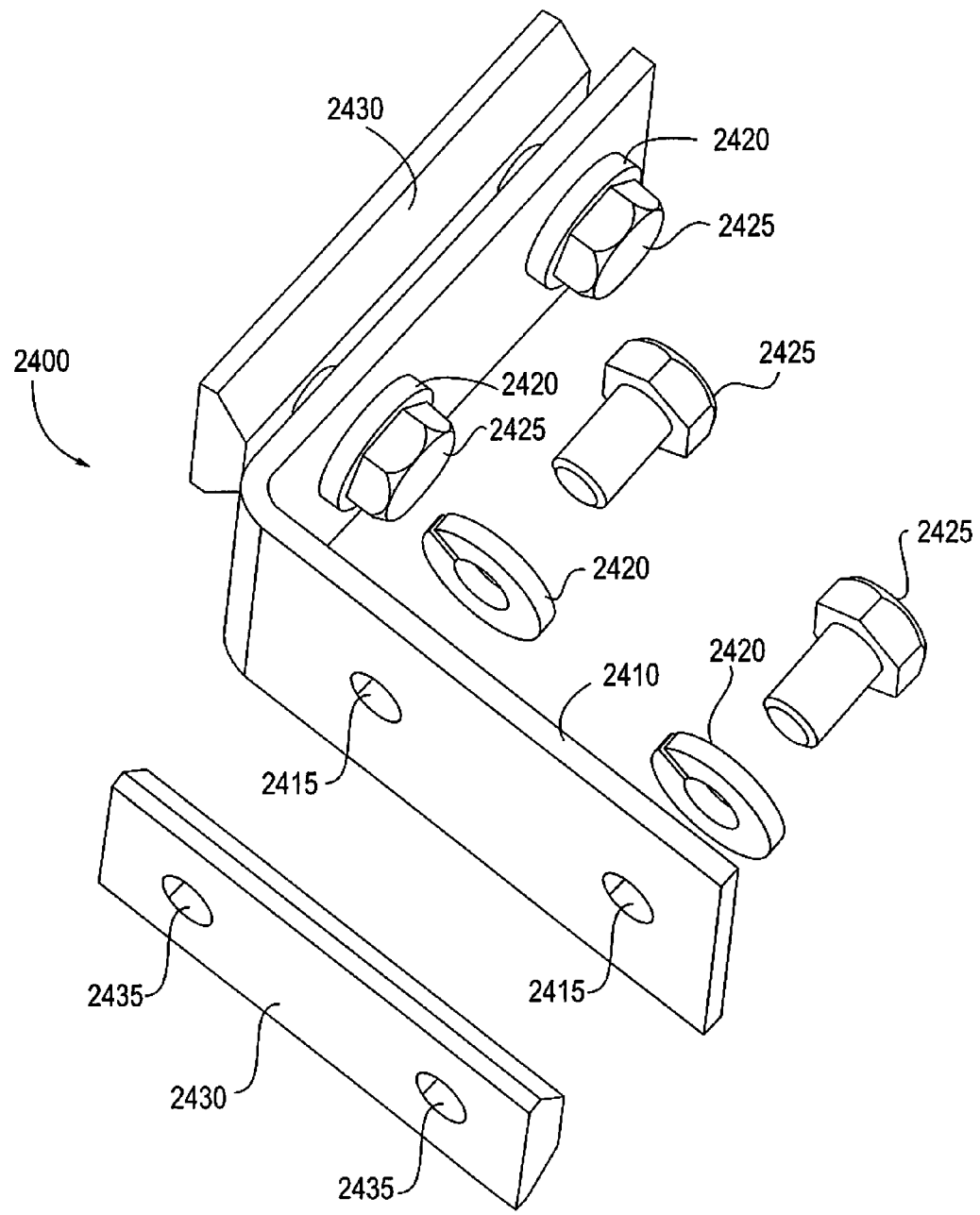
FIG. 24 illustrates an embodiment of a corner fastener in a perspective view with some components exploded.

The side rails form the frame, but must be joined together to accomplish this task. FIG. 24 illustrates an embodiment of a corner fastener in a perspective view with some components exploded. Fastener 2400 uses two sliders along with an L-shaped bracket to provide a coupling between two side rails at right angles. Bracket 2410 is L-shaped, with a first leg and a second leg. The first leg and second leg extend from a curved join at 90 degree angles from each other. In each of the first leg and the second leg are two through-holes 2415 (although some embodiments may use only a single through-hole). Each through-hole 2415 receives a screw or pin 2425, which is separated from the bracket 2410 by a washer 2420. Screw or pin 2425 fastens to through-hole 2435 of slider 2430, such as by mating threads of the screw or pin 2425 and the through-hole 2435. Thus, slider 2435 is coupled to bracket 2410. Since each bracket 2410 has two legs, a slider 2430 is coupled to each leg.

Figure 25:
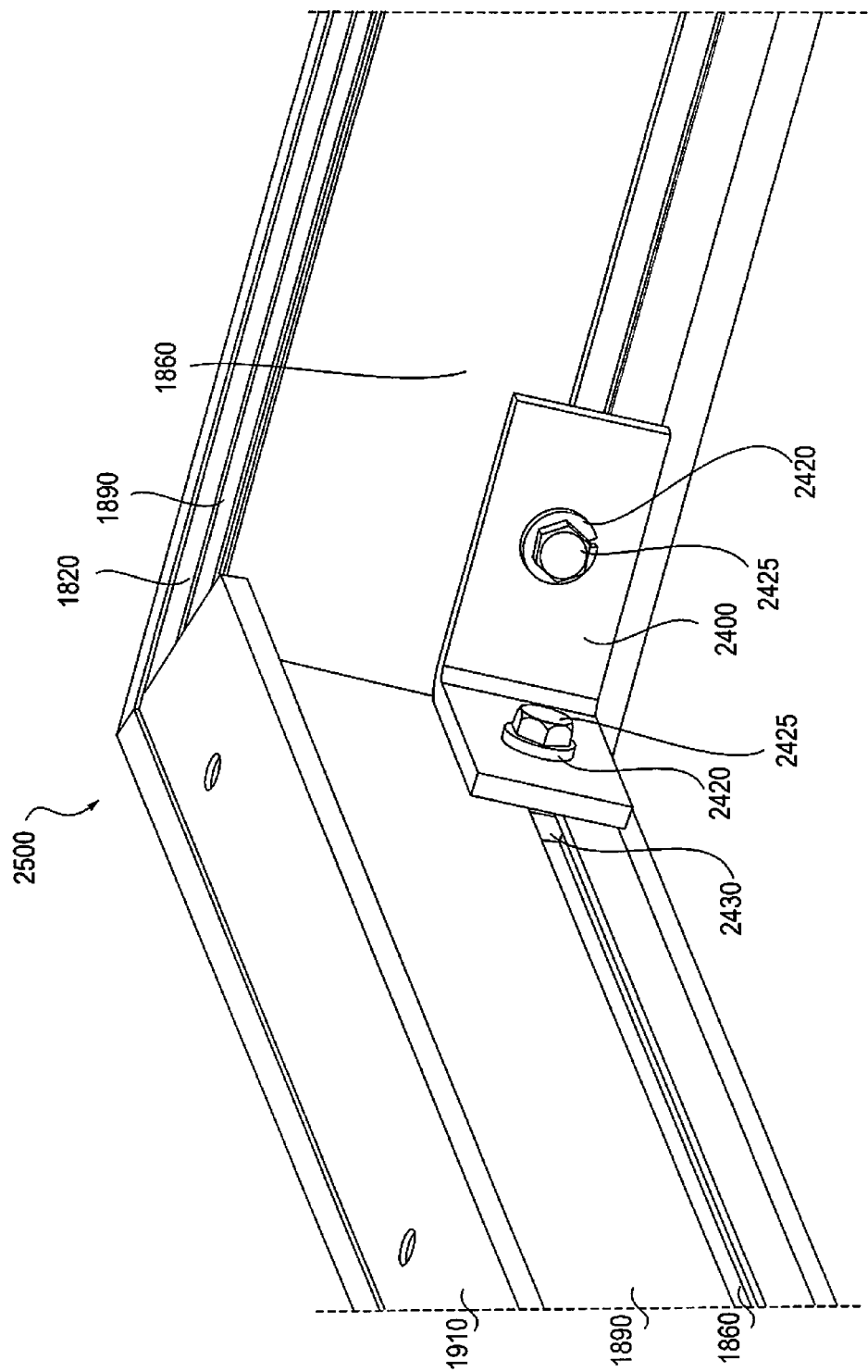
FIG. 25 illustrates an embodiment of an assembly of two rails of FIG. 18 and a corner fastener of FIG. 24 in a perspective view.

The sliders 2430 can then mate with slots of a pair of rails 1800 to couple the two rails 1800 together. FIG. 25 illustrates an embodiment of an assembly of two rails of FIG. 18 and a corner fastener of FIG. 24 in a perspective view. Assembly 2500 includes 2 rails 1800, a corner fastener 2400 and a top cap 1900. Each of rails 1800 has a slider 2430 within a slot 1860. As illustrated, each slider 2430 is coupled to bracket 2410 with a single screw 2425, providing a right angle coupling of the two rails 1800. For ease of illustration, one top cap 1900 is also shown on one of the rails 1800. Note that the rails 1800 are shown with ends cut at 45 degree angles to the side surfaces (1890) of the rails. This type of cut may be useful to provide a mated or nearly mated frame when the rails are fastened together.

Figure 26:
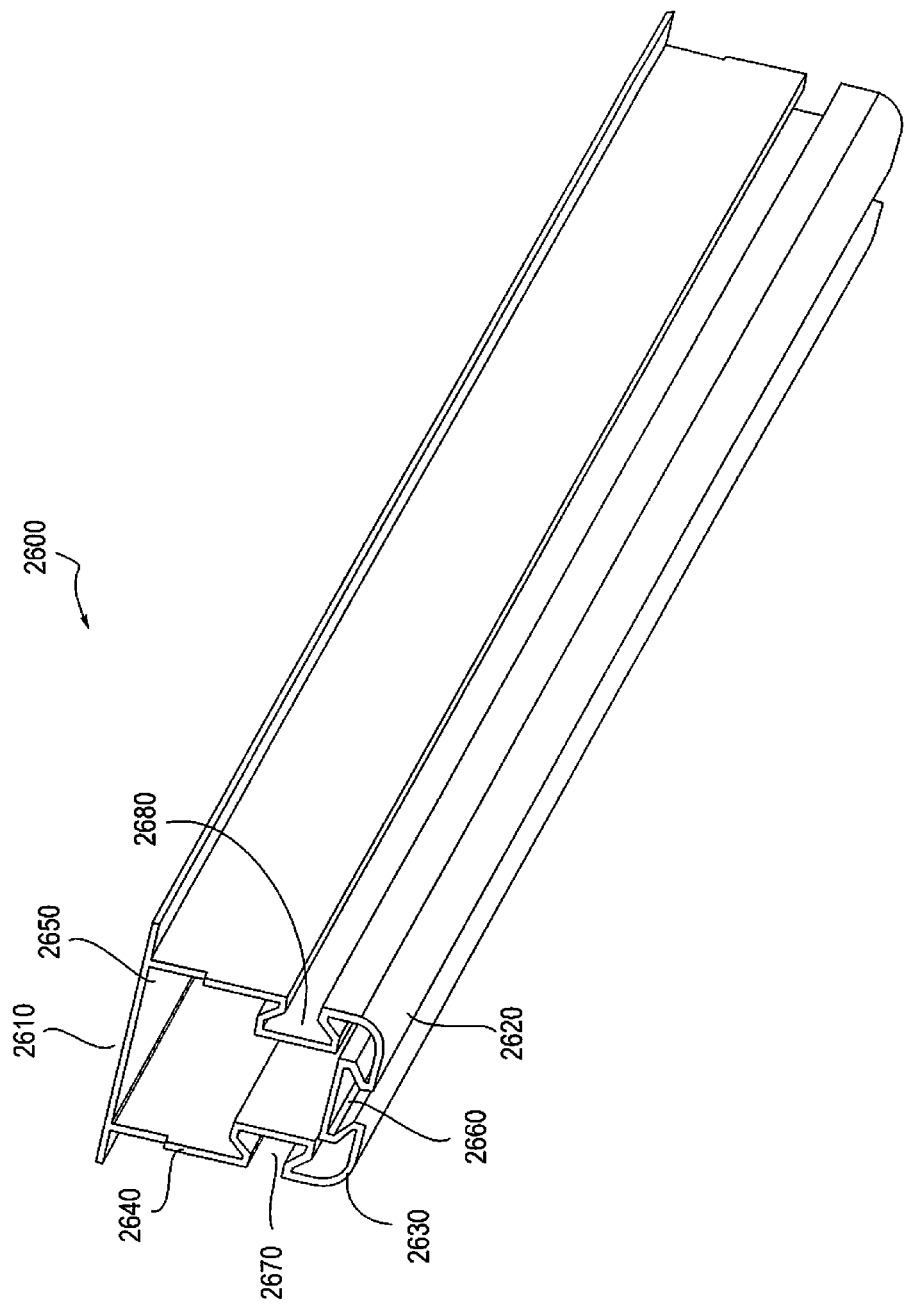
FIG. 26 illustrates an alternate embodiment of a center rail in a perspective view.

Given the size of frames used, a center rail may also be necessary. FIG. 26 illustrates an alternate embodiment of a center rail in a perspective view. Center rail 2600 includes a top surface 2680, sides 2640 and 2650 extending down therefrom, and bottom corners 2620 and 2630. Bottom corners 2620 and 2630 are both rounded, and are joined together to form slot 2660 with a trapezoidal cross-section. Similarly, bottom corner 2620 is joined with side 2650 to form slot 2680 with a trapezoidal cross-section, and bottom corner 2630 is joined with side 2640 to form slot 2670 with a trapezoidal cross-section. Slots 2660, 2670 and 2680 allow other components to be mated with center rail 2600.

Figure 27:
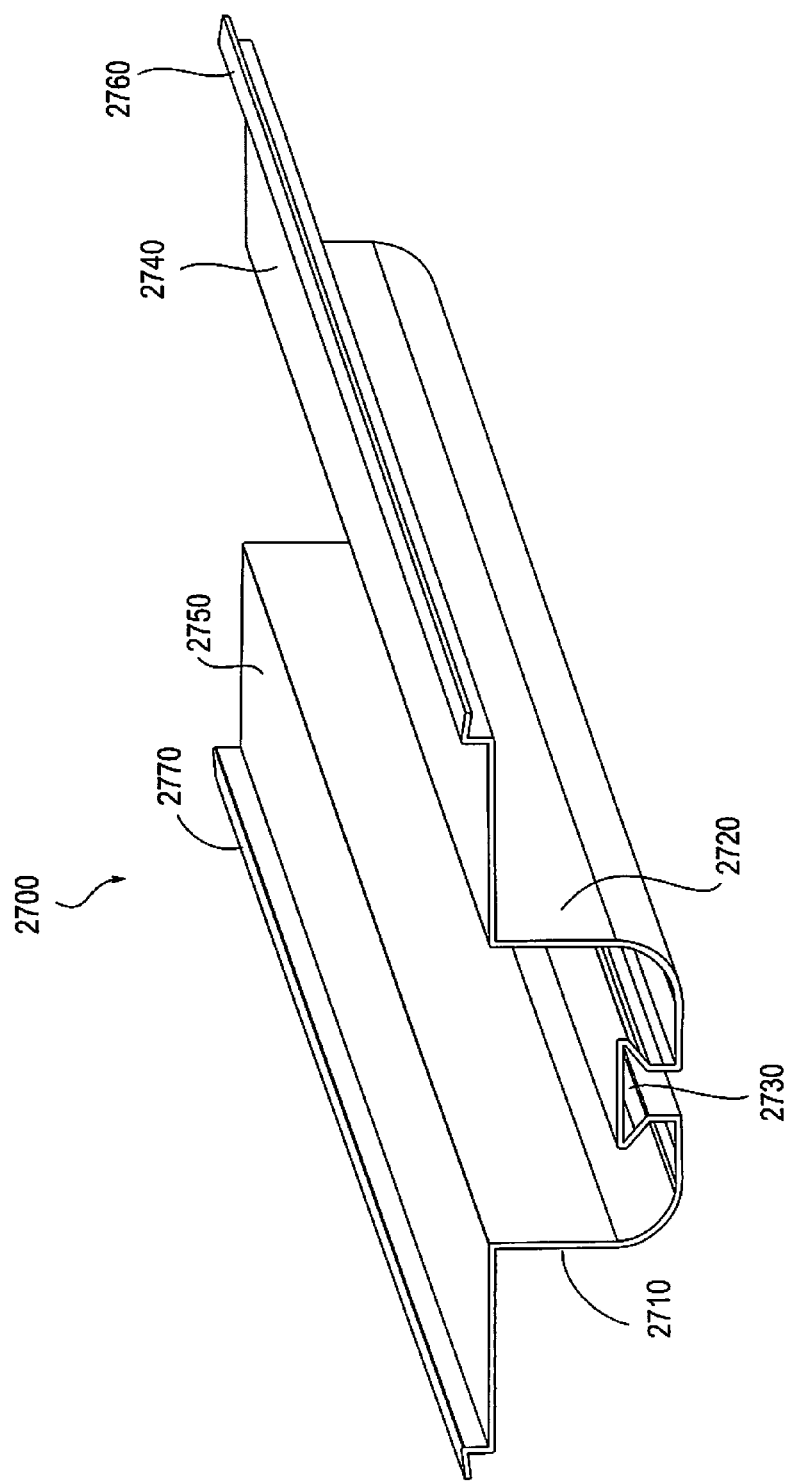
FIG. 27 illustrates an embodiment of a support spring in a perspective view.

One such component is a support spring. With top surface 2610 extending out from the rest of rail 2600, a top for a solar panel is provided, and a supporting spring can then frictionally sandwich in the solar panel. FIG. 27 illustrates an embodiment of a support spring in a perspective view. Spring 2700 has side walls 2710 and 2720, which join in a base to form tab 2730, with a cross-section suitable for mating with slot 2660 of center rail 2600. Extending out from side 2710 is top plate 2750, which ends in flange 2770. Similarly, extending out from side 2720 is top plate 2740, which ends in flange 2760. In use, flanges 2760 and 2770 may support a panel, or the spring 2700 may flex such that flanges 2760 and 2770 provide support in combination with top plates 2740 and 2750.

Figure 28:
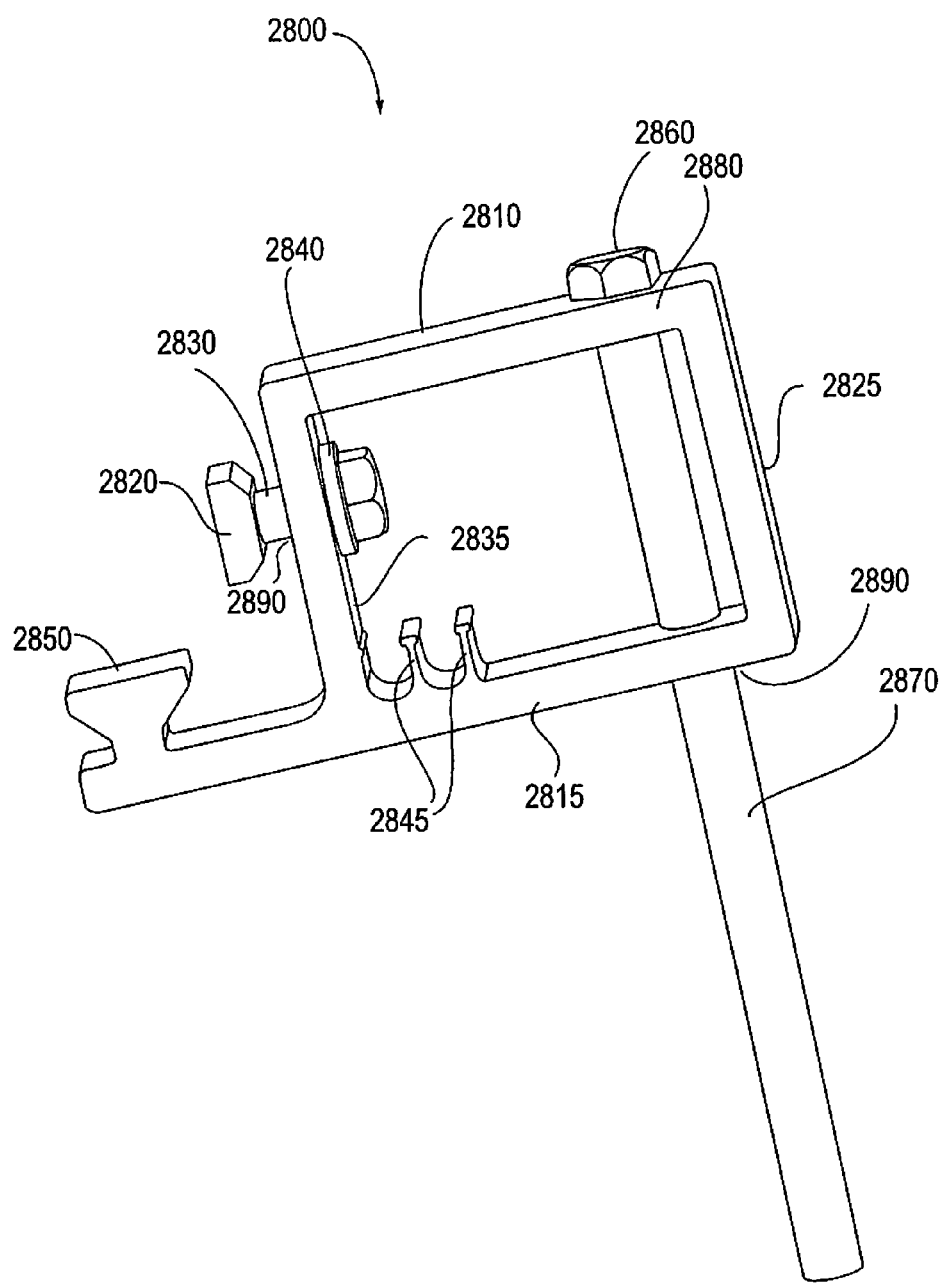
FIG. 28 illustrates an embodiment of a slider assembly for a roof fastener in a perspective view.

The center rail may also need to be attached to the roof. FIG. 28 illustrates an embodiment of a slider assembly for a roof fastener in a perspective view. Slider assembly 2800 includes upper and lower plates 2810 and 2815, which are joined by side plates 2825 and 2835. Lower plate includes through-hole 2890 and upper plate 2810 includes through-hole 2880. Pin 2870 passes through through-holes 2880 and 2890, and is retained against plate 2810 by head 2860. Plate 2815 also has extending from it tab 2850, which can slide along a slot 2660 of center rail 2600, for example. Also extending from plate 2815 are flanges 2845, which define two narrow slots. Side plate 2835 has a through-hole 2890, and receives screw 2830 therethrough. Screw 2830 is separated from side plate 2835 by washer 2840, and mates with a through-hole of tab 2820. Tab 2820 can slide along a slot of center rail 2600 such as slot 2870 or slot 2880, for example.

Figure 29:
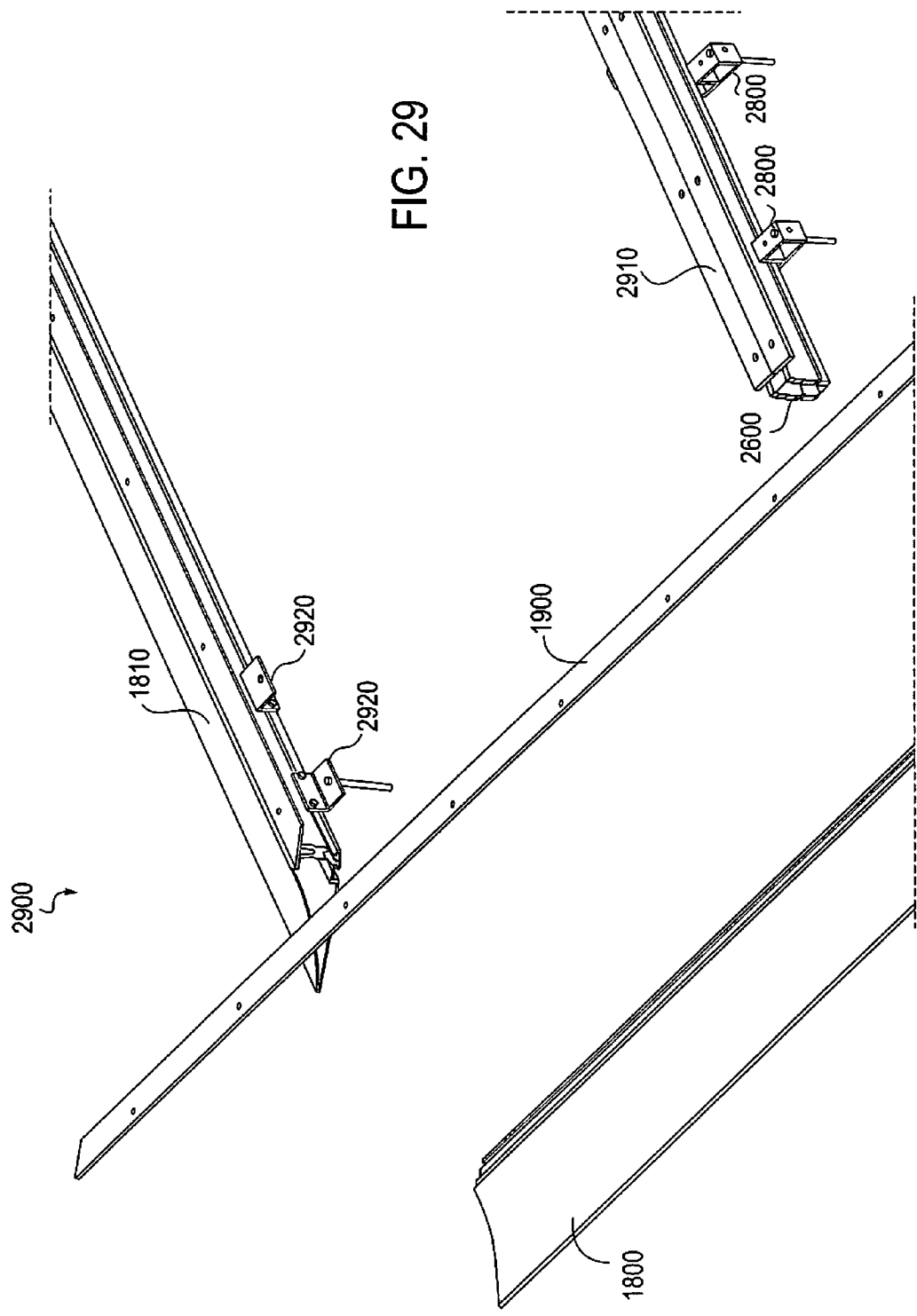
FIG. 29 illustrates an embodiment of an exploded view of an assembly of components for a solar array.

FIG. 29 illustrates an embodiment of an exploded view of an assembly of components for a solar array. The illustration provides some insight into how the components may combine. Assembly 2900 provides a semi-exploded view of various components. Center rail 2600 is illustrated with two roof fastener sliders 2800 attached. Side rail 1800 is illustrated with two L-brackets 2920 attached thereto. Also illustrated is another side rail 1800 with cap 1900 as they may come together.

Figure 30:
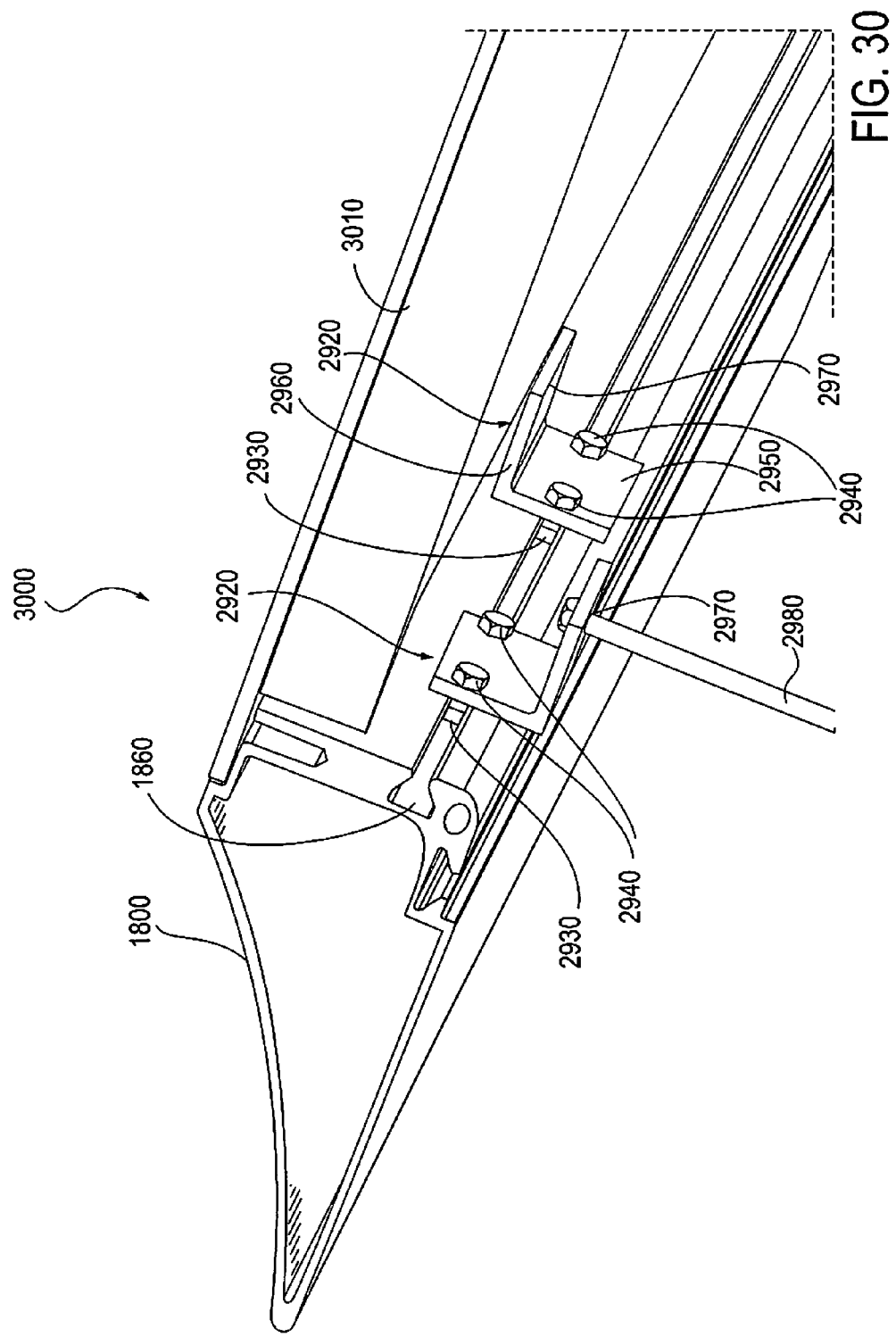
FIG. 30 illustrates an embodiment of an assembly of components of a solar array in a cross-sectional view.

The L-brackets of FIG. 29 have not previously been introduced, but such brackets can serve many purposes. FIG. 30 illustrates an embodiment of an assembly of components of a solar array in a cross-sectional view. L-brackets 2920 each have a slider leg 2950 and an off leg 2960. Off leg 2960 can then be used to fasten the bracket to a roof fastener assembly, or to support a solar panel 3010, for example. Slider leg 2950 includes through-holes through which screws 2940 pass, thereby attaching slider tabs 2930. Slider tabs 2930 may have threaded through-holes which mate with threaded ends of screws 2940. Slider tabs 2930 are shaped to slide along slot 1860 of side rail 1800. For an L-bracket used as part of a roof fastener, pin 2980 passes through through-hole 2970. For an L-bracket used as a support for a solar panel 3010, off leg 2960 contacts solar panel 3010.

Figure 31:
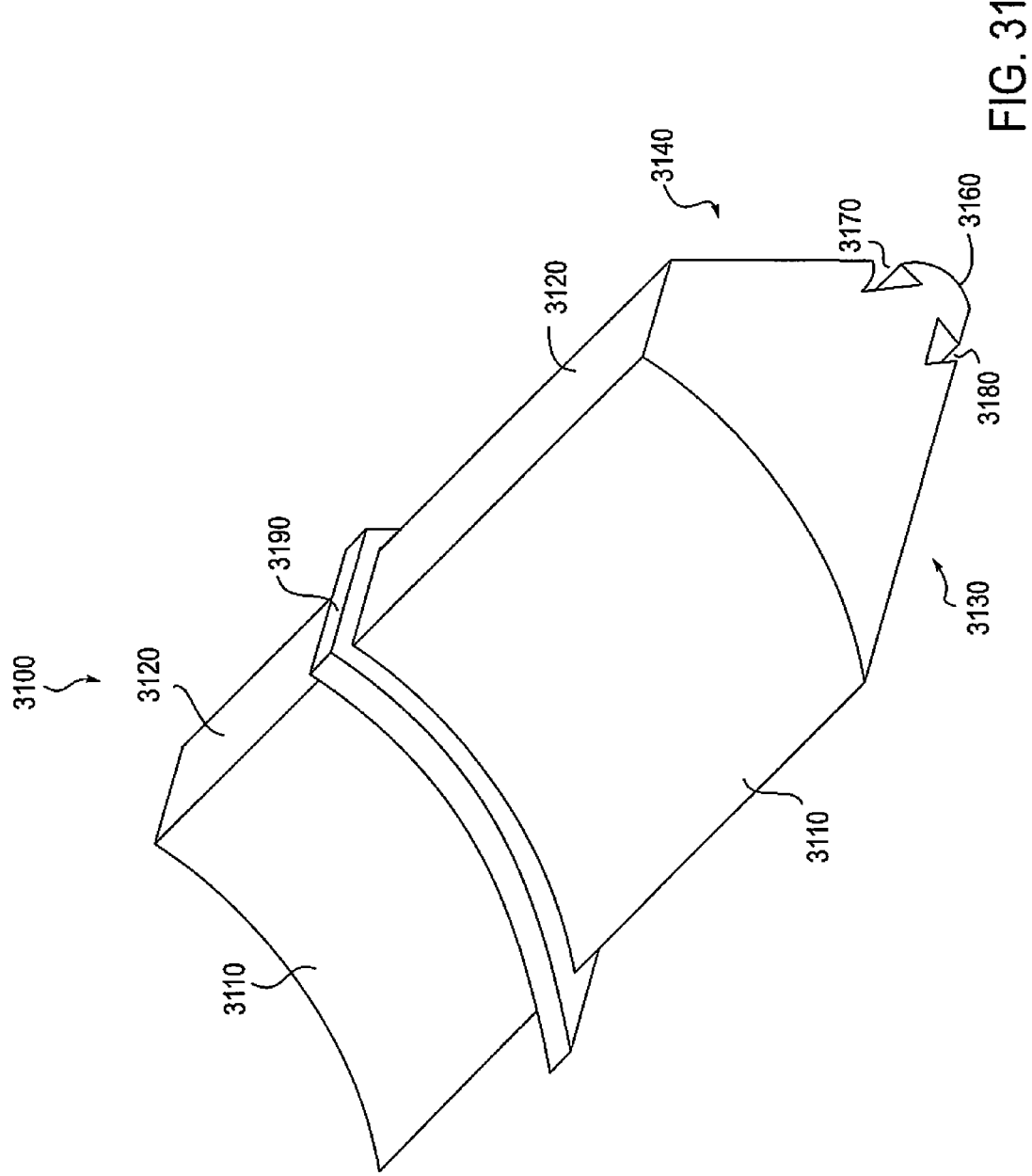
FIG. 31 illustrates an embodiment of a connector suitable for use with various embodiments of the rails.

Various options exist for connecting a series of rails or a set of rails in a corner configuration. FIG. 31 illustrates an embodiment of a connector suitable for use with various embodiments of the rails. Connector 3100 is a butt connector—suitable for two rails with abutting ends. The drawing, in a perspective view, provides a somewhat distorted indication of the true shape of the connector 3100, in that it would be shaped to slide easily into a main rail such as main rail 1800. Thus, sloped face 3110 is connected to bottom face 3130 and to top 3120. Top 3120 is connected to side 3140, and both side 3140 and bottom face 3130 are connected to corner 3160. Between side 3140 and corner 3160 is defined a slot 3170 which may be understood as a V-slot. Similarly, between bottom face 3130 and corner 3160 is defined slot 3180, which is another V-slot. The V-slots are similar to T-slots, but provide angled walls rather than the well-defined T-shaped slots found in many standard components.

End 3150 closes the end of the connector 3100, and would be inserted into a rail 1800. To avoid having the connector slide all the way through the rail and to provide an approximately uniform exterior, ridge 3190 is raised at approximately the midpoint of the connector 3100. Ridge 3190 preferably approximates the outer surface of a rail 1800, such that a rail 1800 mating with ridge 3190 provides a relatively smooth transition. Thus, when each end 3150 of connector 3100 is inserted into a separate rail 1800, the joined set of three pieces appears from outward observation to be a single unitary piece.

Connector 3100 may be fastened to a rail 1800 through a variety of ways. For example, fasteners such as screws or similar components may be used. Alternatively, a friction or press-fit may be used. Other examples of known options for fastening components may similarly be substituted in the device.

Figure 32:
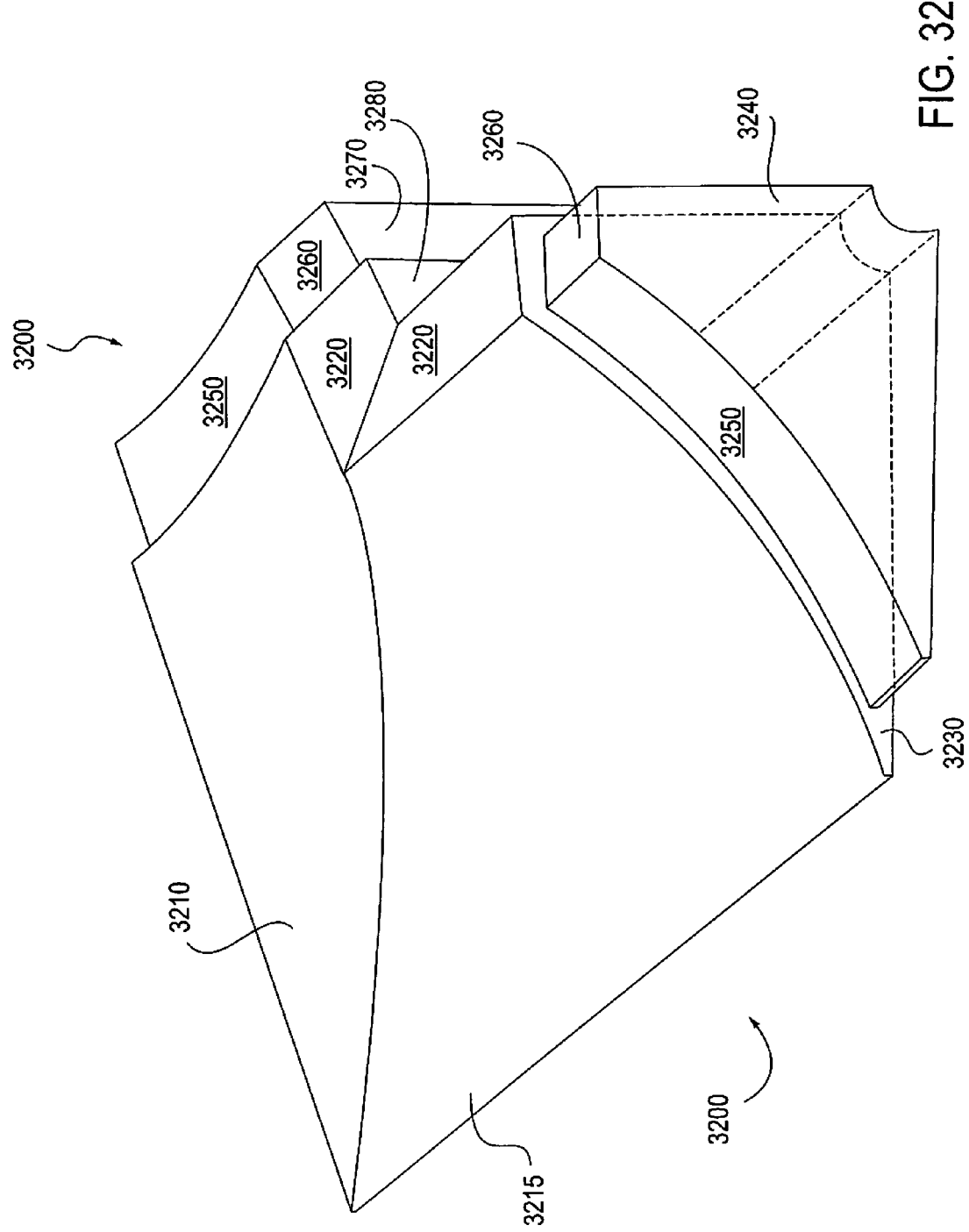
FIG. 32 illustrates an embodiment of an exterior corner connector suitable for use with various embodiments of the rails.

Along with coupling rails together in an abutting relationship, it may be useful to couple rails in a corner configuration, such as for a rectangular or square solar array configuration. FIG. 32 illustrates an embodiment of an exterior corner connector suitable for use with various embodiments of the rails. Corner connector 3200 provides an exterior surface approximately continuous with main rails connected thereto. Thus, outer curved surfaces 3210, top surfaces 3220 and interior side 3280 all provide approximately the same outward appearance seen with a main rail such as rail 1800. Curved surfaces 3250, top surfaces 3260 and side 3270 are all sized to fit inside and extend into such a main rail, allowing for some form of friction fit or other attachment. As illustrated, end 3240 caps the connector 3200 and end surface 3230 provides a surface against which a main rail abuts.

This allows for main rails with flat ends perpendicular to the sides of the rail, rather than requiring rails that are mitered at a 45 degree or other custom angle. Additionally, note that no V-slots are illustrated in this particular embodiment. However, such V-slots may be provided in some embodiments, or the connector may be designed to only fit into other parts of the main rail (e.g. along the curved surface, top surface and bottom surface, for example).

Figure 33:
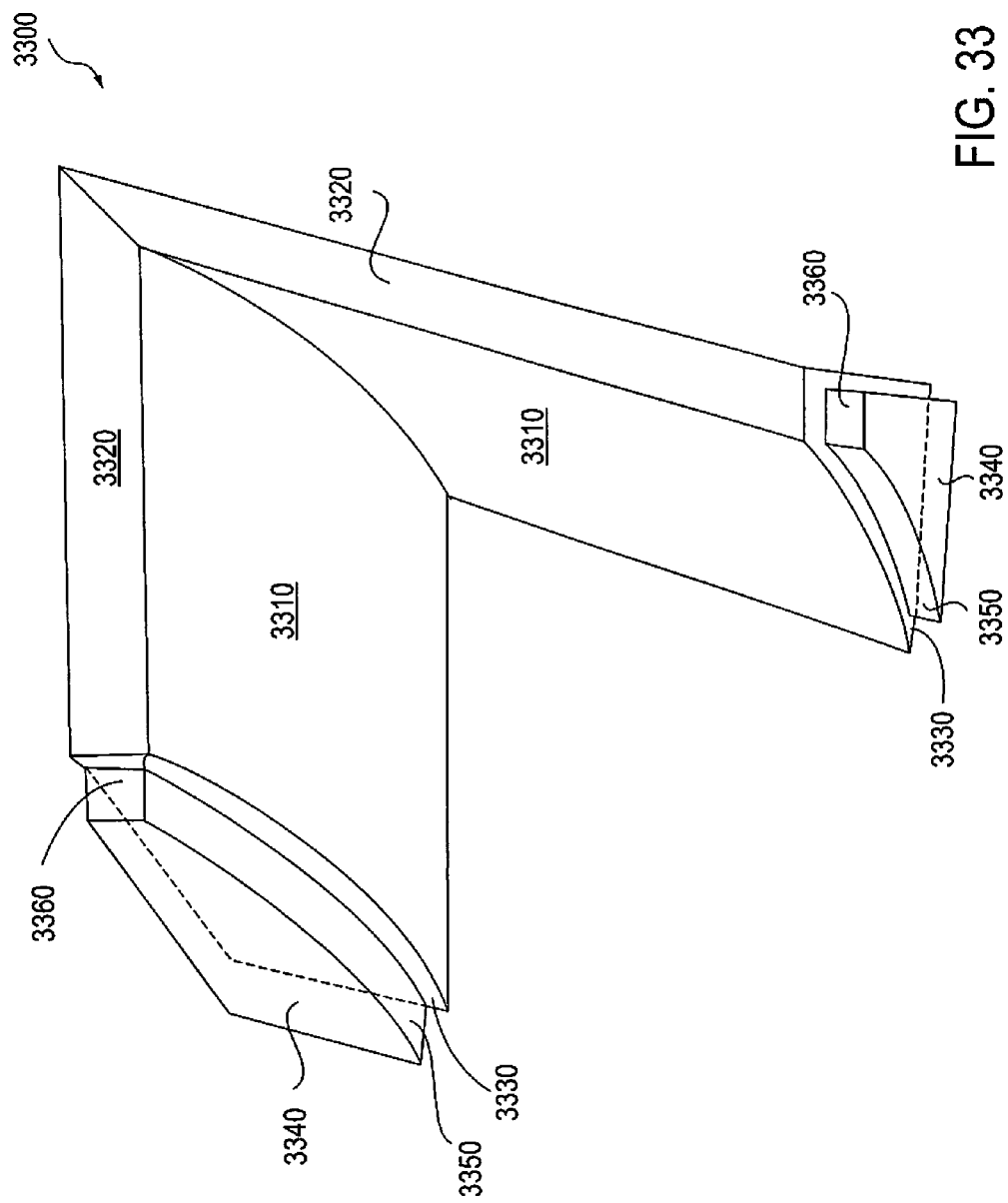
FIG. 33 illustrates an embodiment of an internal corner connector suitable for use with various embodiments of the rails.

Similarly, interior corner connectors may be useful in some situations—where a solar array conforms to a non-rectangular rooftop space, for example. FIG. 33 illustrates an embodiment of an internal corner connector suitable for use with various embodiments of the rails. Connector 3300 includes curved sides 3310 and top surfaces 3320 arranged in a corner configuration. Both connector 3300 and connector 3200 may be arranged for right angle corners or corners measured in a different number of degrees.

Ends 3330 may abut main rails, such that surfaces 3310 and 3320 provide a near continuous appearance. Ends 3340 cap the connector 3300, at the end of interior curved surface 3350 and interior top surface 3360 on each leg of the connector 3300. Thus, surfaces 3350 and 3360 can mate with corresponding surfaces on the inside of a main rail, allowing for some form of friction fit or fastener. Note that the various connectors discussed here may be manufactured in a variety of ways to provide the desired aesthetic and functional structures.

Use of these various connectors allows for a variety of configurations. FIG. 34A illustrates an embodiment of a solar array configured as an N×M array of solar panels. Array 3400 provides a rectangular solar array. Main rails 3410 are connected in an abutting relationship to connectors 3420 and thereby coupled together. Similarly, main rails 3410 are also connected in a corner relationship to corner connectors 3430, providing right-angle corners. Collectively, this provides a rectangular configuration, which can potentially be expanded to most any shape which is N×M, with N and M being integer numbers of solar panels. In practice, interior or center rails (not shown) would likely be included—potentially a large number of interior rails in a large array.

Other shapes may also be provided. FIG. 34B illustrates an alternate embodiment of a solar array, configured in a trapezoidal shape. Array 3440 provides a solar array in the shape of a trapezoid—a quadrilateral (four-sided figure) with two parallel sides. As illustrated, each of rectangular solar panels 3450 are supported on each end by main rails 3410. These main rails are coupled in an abutting relationship by connectors 3420. The corners of the array 3440 are formed through use of corner connectors 3435 (for obtuse angles) and 3437 (for acute angles). Additionally, solar panels 3455 are provided, which have a triangular shape, as may be custom-made or otherwise provided in such a situation.

Note that not all of the rails 3410 need be cut to the same length—the corner and abutting connectors allow for the rails to be cut to a desired length as long as the end of the rail is essentially perpendicular to the sides of the rail. Also, not shown are interior or center rails which would likely be used to provide further support and anchorage to the solar panels 3450 and 3455. Such center rails may be rails such as those illustrated in FIG. 35, below, for example.

Other shapes may also be appropriate. FIG. 34C illustrates another alternate embodiment of a solar array, configured in an octagonal shape. Octagonal array 3470 uses main rails 3410 coupled through corner connectors 3460 to form an octagonal frame. The octagonal frame then supports rectangular solar panes 3450 and triangular solar panels 3455. Again, interior rails are likely to be involved, if for no other reason than to support the interior panel. The flexibility of the system, allowing for any shape for which a corner connector exists, is illustrated by arrays 3440 and 3470.

Figure 35:
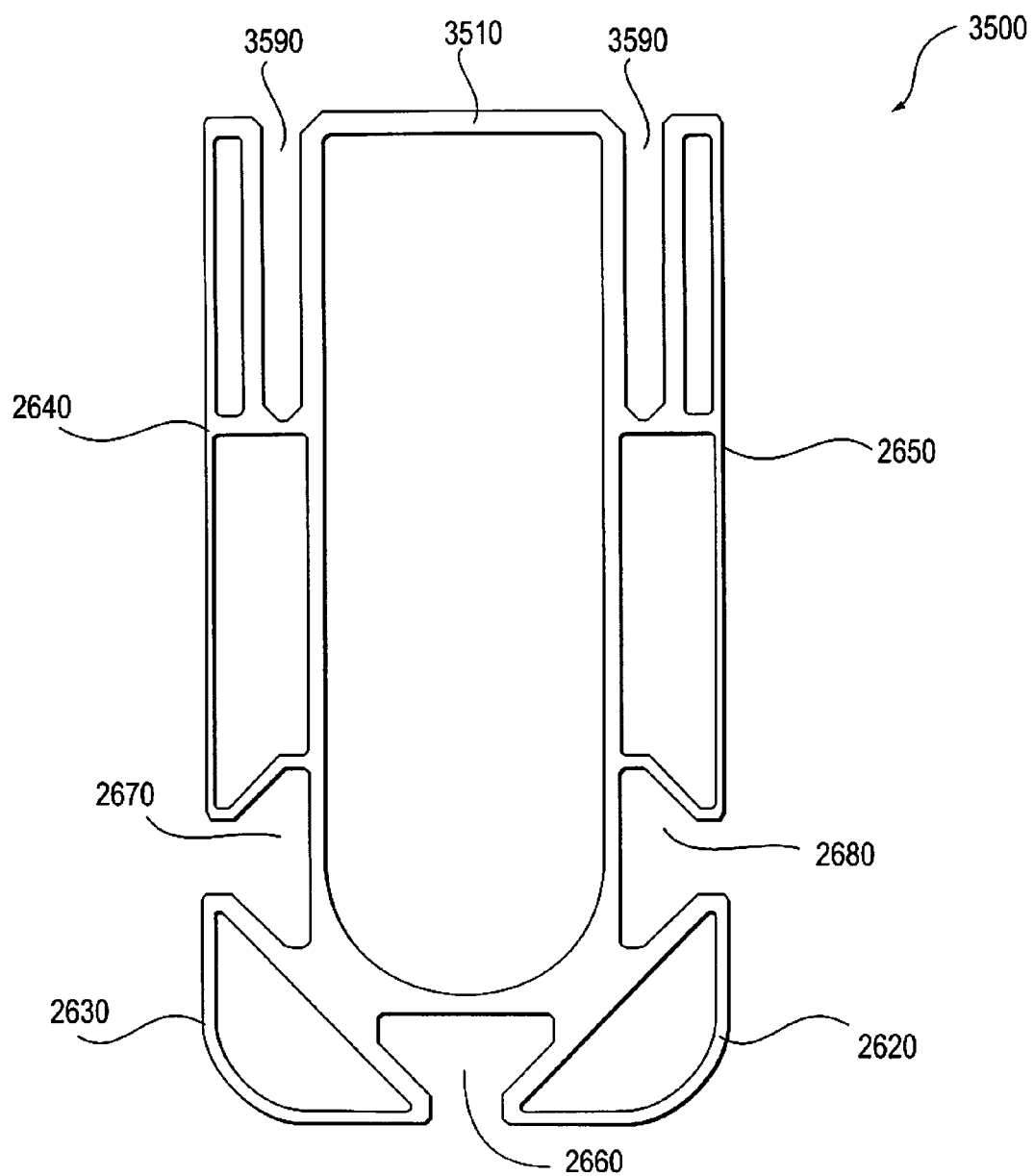
FIG. 35 illustrates an embodiment of a center rail in an end (side) cross-sectional view.
Figure 36:
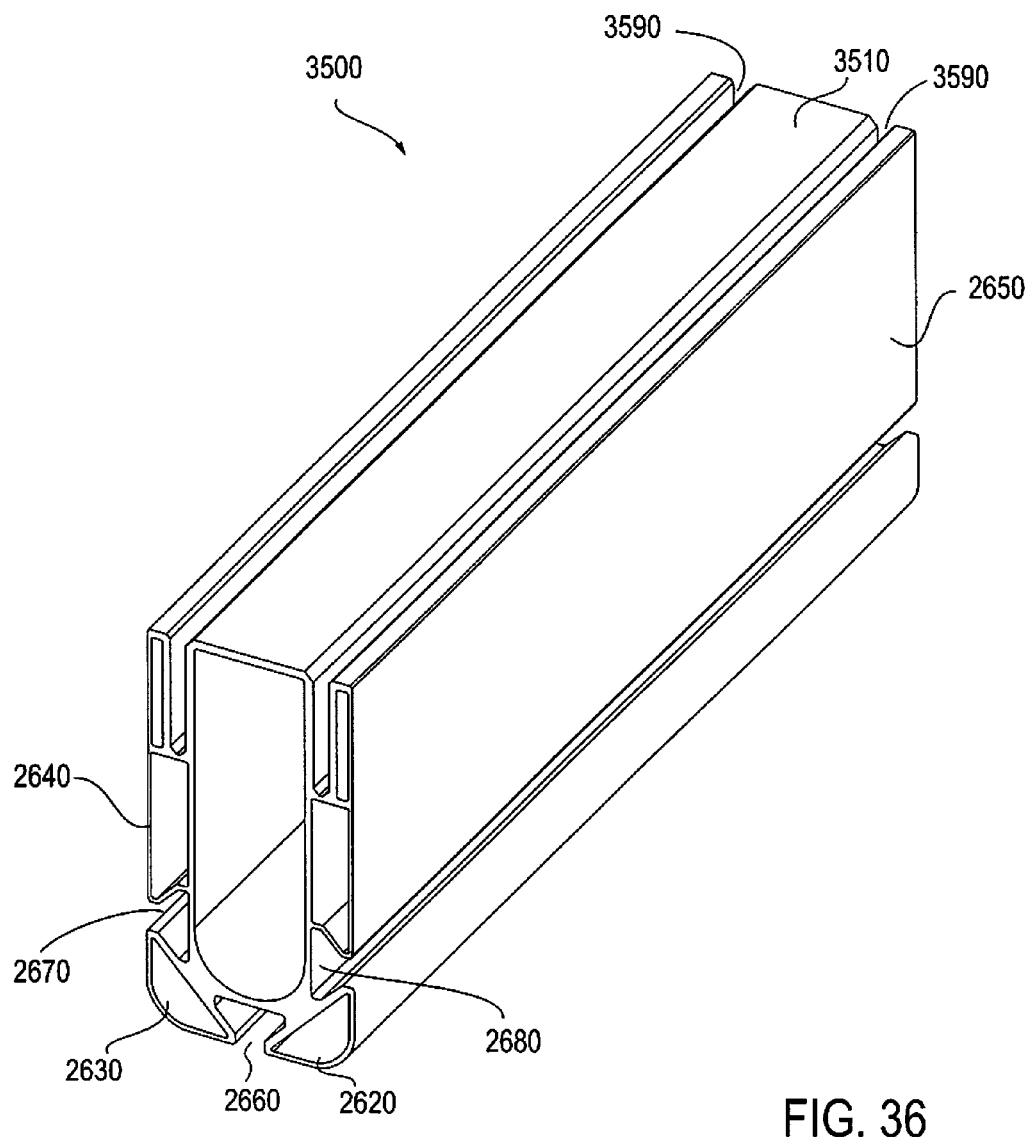
FIG. 36 illustrates an embodiment of the center rail of FIG. 35 in a perspective view.

Center rails can be important or even vital parts of a solar array, providing interior support and potentially making a frame more rigid. FIG. 35 illustrates an embodiment of a center rail in an end (side) cross-sectional view. The sides (2640, 2650), corners (2630, 2620) and V-slots (2660, 2670 and 2680) have been previously described. However, one may expect that a center rail 3500 may be formed with a continuous tap (a slot) 3590 on each side of top 3510, allowing for placement of screws in the tap 3590, and thus fastening of other components such as a cap. FIG. 36 illustrates an embodiment of the center rail of FIG. 35 in a perspective view.

Figure 37:
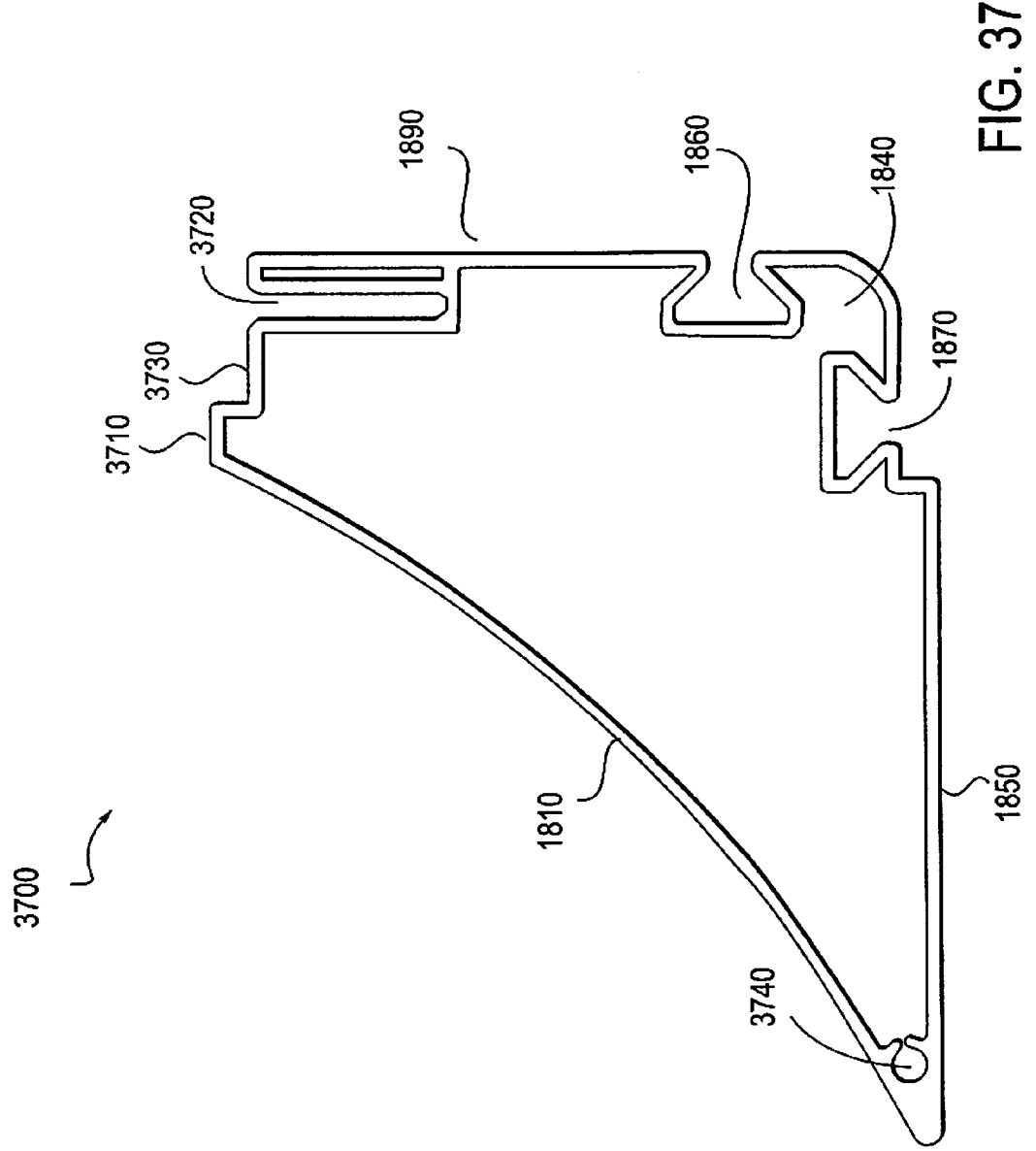
FIG. 37 illustrates an embodiment of a main rail in a side (end) cross-sectional view.

Main rails in such a system have been previously described, but other embodiments may also be employed. FIG. 37 illustrates an embodiment of a main rail in a side (end) cross-sectional view. Similarly to the center rail 3500, main rail 3700 includes a slot 3720 which functions as a tap into which a screw or other fastener may be placed. This tap exists between a flat surface 3730 which may be used to rest a cap and side 1890. Additionally, outer top surface 3710 is provided, allowing for a near-continuous appearance with a cap surface. Additionally, corner connection pocket 3740 is provided such that rails may be coupled through use of pegs for corner or abutting connections, for example.

Figure 38:
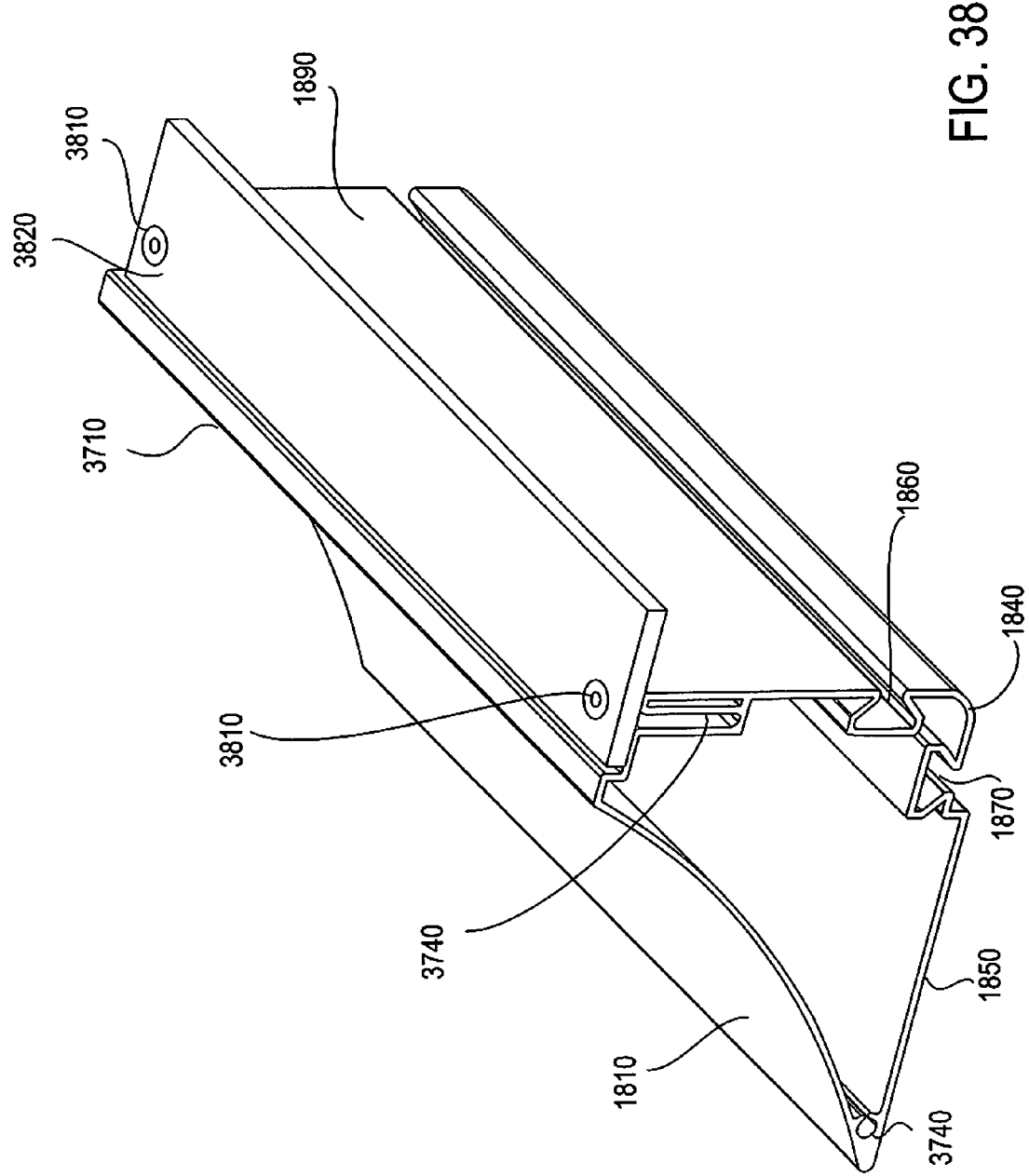
FIG. 38 illustrates the mail rail of FIG. 37 in a perspective view with a cap attached.

FIG. 38 illustrates the main rail of FIG. 37 in a perspective view with a cap attached. As is illustrated, cap 3820 is coupled to main rail 3700 through use of two fasteners 3810. Fasteners 3810 may be #14 metal screws, which may screw into tap 3740 and would be expected to mate with grooves (threads) created in the screwing process. The continuous nature of slot 3740 allows for easy adjustment of the placement of cap 3820. Moreover, some registration errors in the location of through-holes in cap 3820 through which fasteners 3810 pass may be accommodated by slot 3740 and addition of extra through-holes may similarly be accommodated by slot 3740 without the need for modifications to rail 3700.

Note that with the cap 3820 and similar caps, a feature is potentially available which can ease installation and maintenance. Namely, the cap 3820 may be removed from the rest of the assembly, without requiring disassembly of the entire frame. This then potentially allows for access to the panels held in by the cap 3820, and to wiring and components underneath the panels, without requiring any attempt to remove the frame from the roof or remove the anchors from the roof, for example.

Figure 39A:
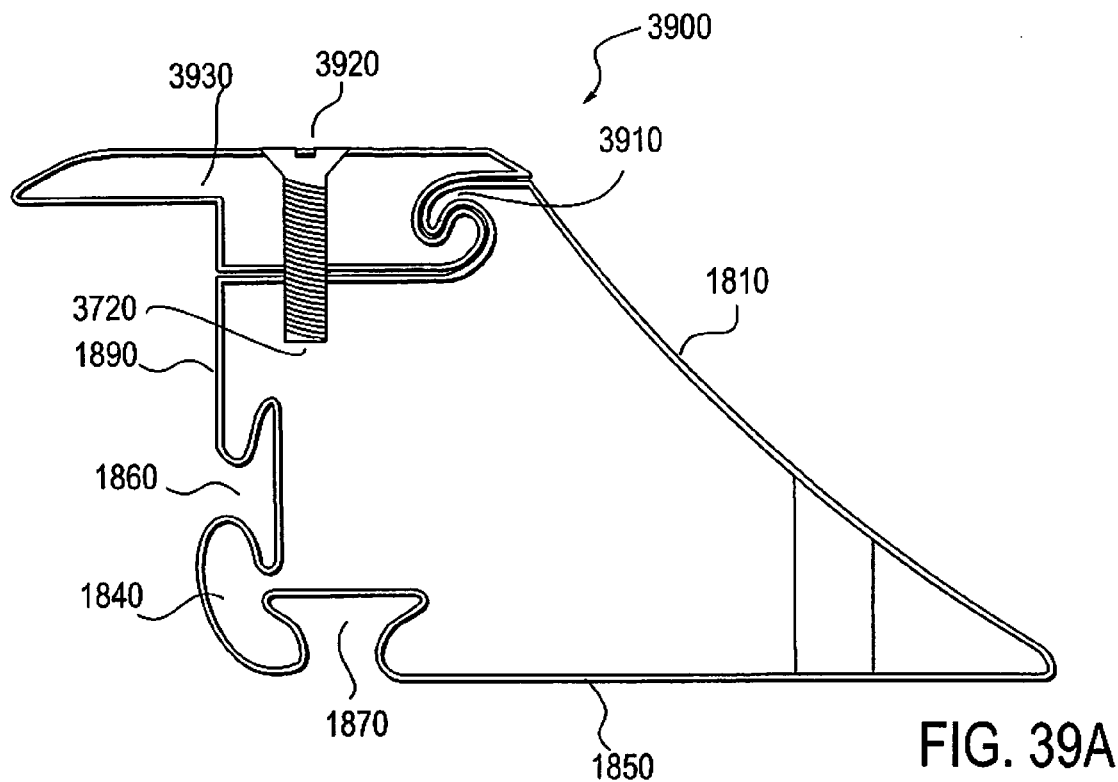
FIG. 39A illustrates an alternate embodiment of a main rail with attached cap in a side (end) cross-sectional view.

Other embodiments of rails and caps may be appropriate in various embodiments of arrays and systems. FIG. 39A illustrates an alternate embodiment of a main rail with attached cap in a side (end) cross-sectional view. As illustrated in the figure, rail 3900 includes a curved lip 3910 which mates with a slot defined in cap 3930. Cap 3930 is also secured through use of fastener 3920 and slot 3740, such that cap 3930 can secure the top of an associated solar panel.

Figure 39B:
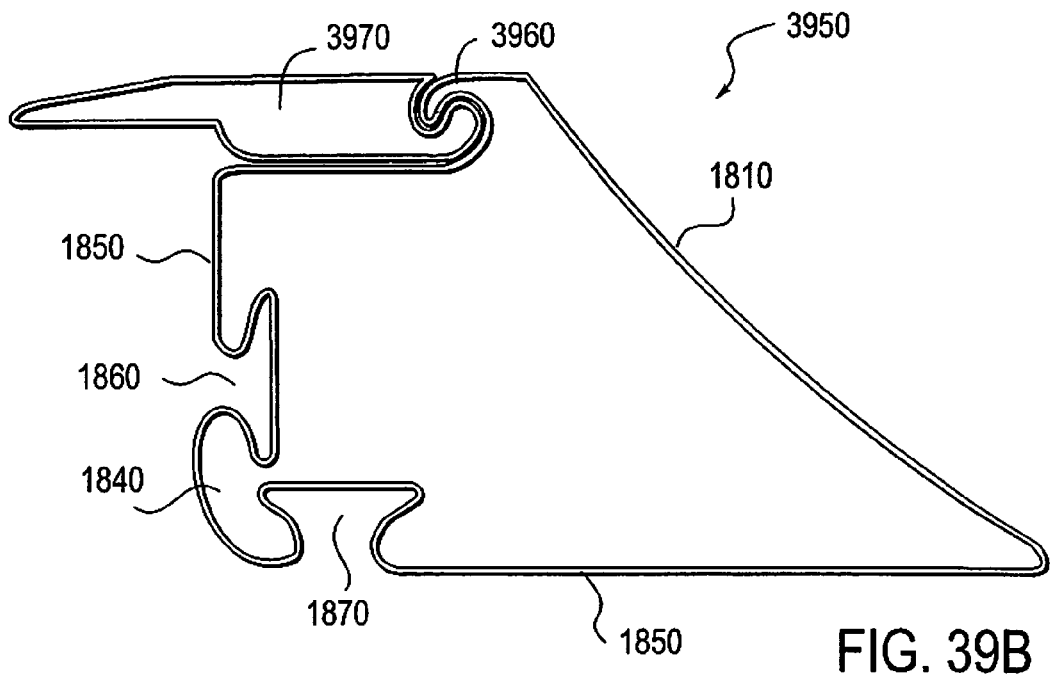
FIG. 39B illustrates an alternate embodiment of a main rail with attached cap in a side (end) cross-sectional view.

FIG. 39B illustrates another alternate embodiment of a main rail with attached cap in a side (end) cross-sectional view. Rail 3950 also includes lip 3960 (which may be similar or the same as lip 3910) at the top of the structure. Cap 3970 may then have a tab which snaps in to the slot defined by lip 3960 and the body of rail 3950. This may allow for a friction or press-fit, not requiring an additional fastener. In particular, opposing forces from lip 3960 and an associated solar panel may keep cap 3970 in place, even as cap 3970 keeps the associated solar panel in place, with rail 3950 anchored to maintain the location of the entire array.

Additionally, viewing rails 3950 and 3900, it becomes apparent that curved surface 1810 need not necessarily be curved in some embodiments. A purpose of the solar array, in some embodiments, is to provide an aesthetically pleasing design, unlike some of the objectively displeasing installations to be found already. Thus, the frame is preferably constructed, in some embodiments, to allow for a design similar to a skylight, with sloped or curved sides, which provide a pleasing appearance to observers viewing such an installation from a road or other nearby location. The exact profile of the rails is thus designed for aesthetic purposes. Additional functional aspects may be incidental, such as allowing for better shedding of water or vegetable matter (e.g. leaves).

Figure 40:
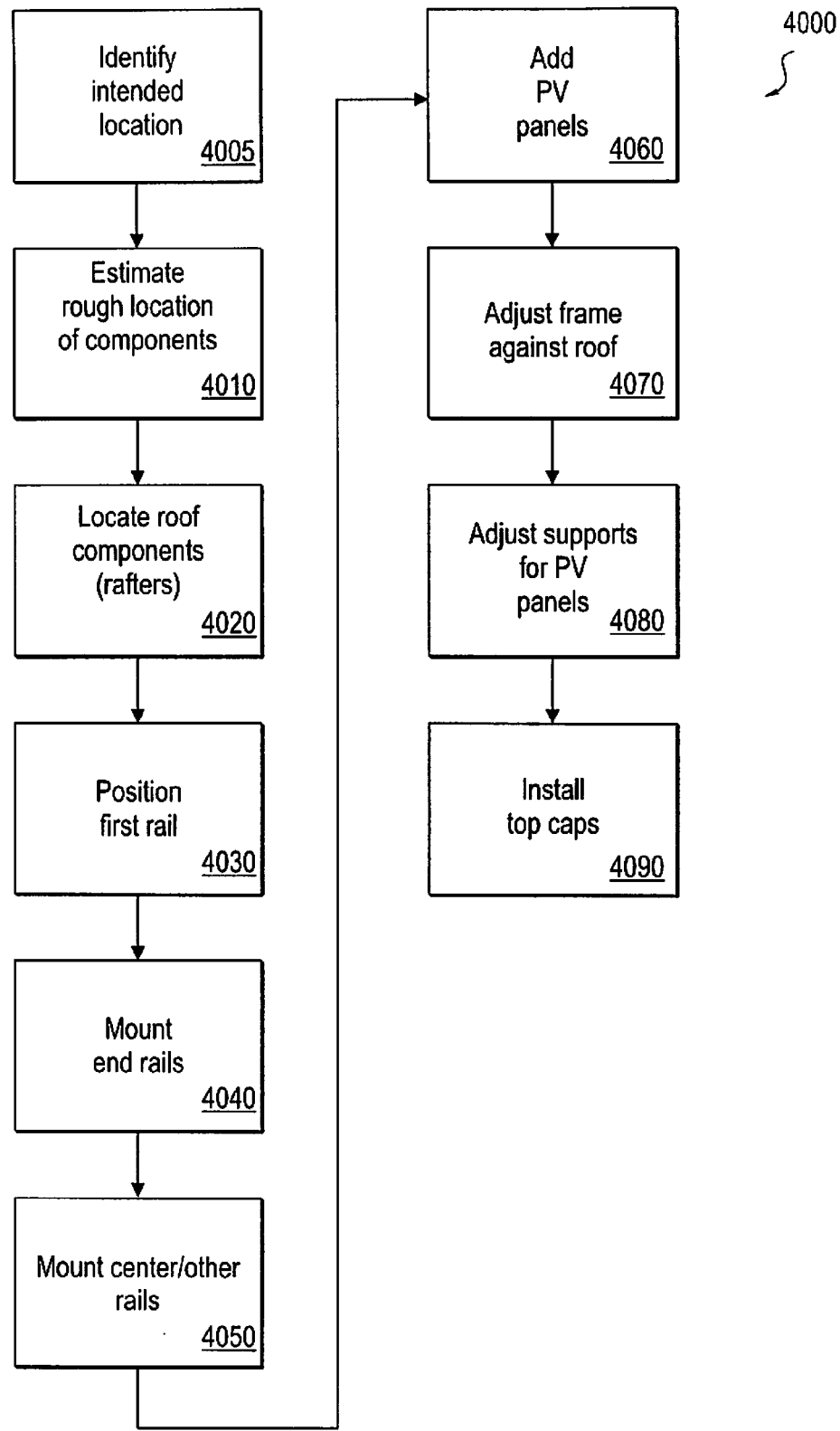
FIG. 40 illustrates an embodiment of a process of installing a solar array.

Installation of these arrays may take on many forms, with various processes available. FIG. 40 illustrates an embodiment of a process of installing a solar array. Process 4000 includes estimating a location, roughly placing components, positioning the various components and fastening them, adding in photovoltaic (solar) panels, adjusting the components, and installing top caps to complete the installation. Not shown is the final satisfactory part of the process—getting off the roof with the installation complete.

Process 4000 initiates with identification of an intended location of a solar array at module 4005. At module 4010, a rough location of various components is estimated, such as main rails (sides of the array), center rails, and associated connectors. At module 4020, location of roof components occurs, such as finding underlying rafters or other structures for anchor purposes. At module 4030, a first rail (a main rail) is positioned in a final position. This final position is essentially correct, and is based on how the rail will be anchored to the roof or other underlying surface. However, the nature of the roof mounting components of FIGS. 22A and 22B, and to a lesser degree the components of FIG. 28, allow for relatively minor adjustments to positions later in the process. The first rail is mounted in position at this stage though.

With the first rail in position, the end rails are then mounted at module 4040, connecting or coupling them to the first rail, and anchoring the end rails to the roof. For the simplest of mountings, as is assumed for this process, there is a first rail, two end rails, and another main rail forming the rectangular frame of the array. Thus, the two end rails are coupled to the first rail through corner connectors. At module 4050, another main rail (a second rail) are mounted, with the second main rail completing the rectangle defined by the first rail and the two end rails. In other installations, modules 4040 and 4050 may include additional rails mounted in line with the first rail, or module 4030 may include mounting a set of first rails which provide a first side of a solar array.

Furthermore, installations may include center rails which are fastened at intermediate points within the frame in more complicated embodiments. Moreover, in some embodiments, frames may also be assembled such that all rails are coupled together before any component is anchored to a support structure such as a roof. In such an instance, the assembled frame may be moved to account for variations in the surface or for aesthetic reasons, for example, and then anchored in place. The adjustable anchor components may potentially provide additional flexibility in such instances, too.

With the rails in place, and the frame essentially assembled, the solar or photovoltaic panels are added at module 4060. This typically would include placement of the panels, addition of any supporting brackets, wiring of the panels, and connection or coupling of panel wiring to external wiring and components such as an inverter or power junction. With the panels in place, the frame is then adjusted against the roof at module 4070. This may involve removing panels temporarily to get at underlying components. Moreover, this is expected to include adjusting the roof mounting components such as those of FIGS. 22A and 22B to move the frame components within the available tolerances provided by the roof mounting components. Typically, this will not involve additional piercing of the roof material, as the roof mounting components will generally allow for much flexibility.

At module 4080, supports for the solar panels are adjusted. This may involve simply sliding supports to new locations and fastening them, or it may involve additional supports added in as part of this array. Moreover, adjustment may be minimal or unnecessary in some instances. Top caps are then installed at module 4090. The top caps may be snapped in or placed and fastened as appropriate. With the top caps in place, the solar array is complete, and the installers may then exit the roof or other location.

Yet another embodiment of a frame may be used as part of a solar array. FIG. 41A provides an illustration of another embodiment of a main or side rail in a perspective view. FIG. 41B provides an illustration of the embodiment of a main or side rail of FIG. 41A in a side view. Assembly 4190 includes main rail 4100, top cap 4155 and bracket 4160, along with various fasteners.

Main rail 4100 has a top surface 4135 in which a T-slot 4125 is formed. Side surface 4110 descends from top surface 4135 to shelf 4105. Shelf 4105 may provide a supporting shelf for a solar panel, for example. Shelf 4105 mates with corner piece 4120. Corner piece 4120 has T-slots formed in both its vertical and horizontal surfaces. Corner piece 4120 also meets bottom 4115, which forms a bottom surface which may support rail 4100. Bottom 4115 is connected to curved outer side 4130, which in turn is connected to top surface 4135. At this junctions of bottom 4115 with outer side 4130 and outer side 4130 with top surface 4135, curved hollows 4140 are formed within the material, allowing for use of dowels or pegs, for example, to couple rails. Note that rail 4100 may be formed through an extrusion process—where reference is made to connections or meetings of parts of rail 4100, this may refer to a transition from one part of an extruded rail to another part of an extruded rail, for example.

Top cap 4155 is coupled to main rail 4100 through use of fasteners such as fastener 4150. Top cap 4155 is illustrated as a flat metal piece which is coupled to main rail 4100 and projects out beyond top surface 4135 to cover part of shelf 4105. This projection allows top cap 4155 to hold a solar panel in place against shelf 4105. Also illustrated is bracket 4160, which has a vertical surface 4165 and a horizontal surface 4170 joined at a right-angle joint. Vertical surface 4165 has two through-holes in this embodiment, through which fasteners 4150 couple bracket 4160 to a T-slot 4125 of rail 4100. Horizontal surface 4170 has a through-hole through which a screw assembly 4170 or similar fastener may be inserted. Screw assembly 4170 may be used to couple with a roof attachment bracket such as that shown in FIG. 22, for example.

FIG. 41C provides an illustration of the embodiment of a main or side rail of FIG. 41A in a side view without additional attachments. Note that main rail 4100 need not have the dimensions shown—those dimensions represent a particular design choice. FIG. 42A provides an illustration of the embodiment of a main or side rail of FIG. 41A in another perspective view. As is apparent, screw assembly 4180 includes a screw and a washer in this embodiment.

Also, note that the embodiment of FIGS. 41-44 is described as having industry-standard T-slots, whereas other embodiments are illustrated and described as using V-slots. T-slots and V-slots may be used essentially interchangeably. Standard fastener components adapted to work with T-slots will work with either of these embodiments, and may be expected to be interchanged with the fasteners pictured. Additionally, as one may understand with reference to the illustrations, the various embodiments may be adapted to work interchangeably without undue experimentation—one may use parts from the embodiment of FIG. 1 with parts from the embodiment of FIG. 31 or the embodiment of FIG. 41, including main rails from each embodiment in some instances.

FIG. 42B provides an illustration of an embodiment of a mounting bracket in a perspective view. Mounting bracket 4160 is shown with fasteners 4150 illustrated. Fasteners 4150 use, in this embodiment, screws with T-shaped nuts attached thereto. The T-shaped nuts may slide into the T-slot of rail 4100, providing a secure attachment between bracket 4160 and rail 4100.

FIG. 42C provides an illustration of the embodiment of a main or side rail of FIG. 41A as part of a solar array. As is apparent, solar array 4200 includes a set of solar panels 4210 and a set of rails 4100 which support the solar panels 4210. Solar array 4200 may thus be mounted on a roof or other platform, providing an aesthetically pleasing appearance and a sturdy connection to the roof, for example.

Figure 43:
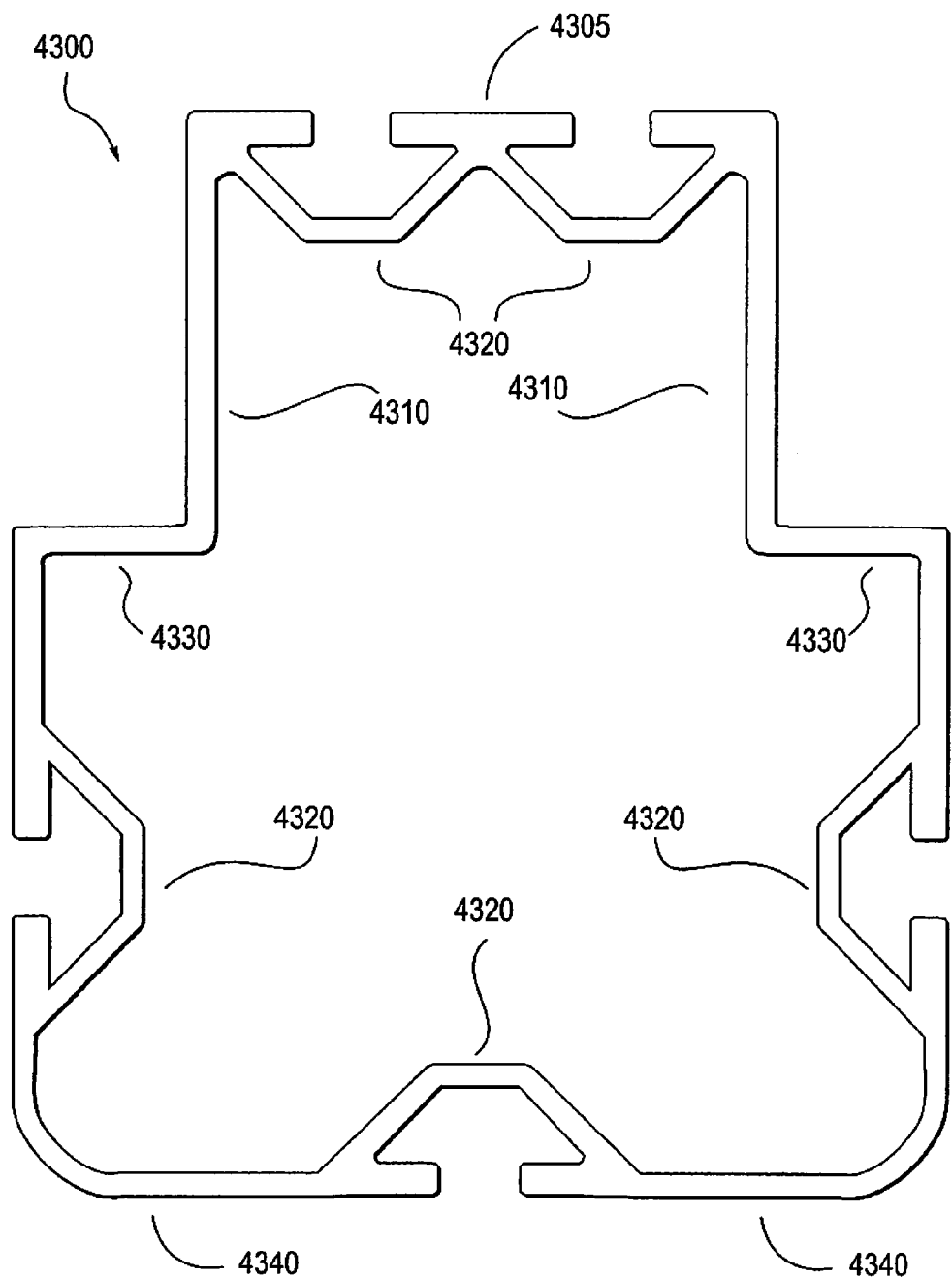
FIG. 43 provides an illustration of an embodiment of a center rail in a side view.

Some arrays may require internal support along with the exterior support of the rails 4100. FIG. 43 provides an illustration of an embodiment of a center rail in a side view. Center rail 4300 includes top surface 4305 which is attached to sides 4310. Sides 4310 are also attached to shelves 4330. Shelves 4330 meet two lower corners 4340, each of which has a side, a rounded corner, and forms part of a base. T-slots 4320 are formed in lower corners 4340 and in top surface 4305. With two T-slots 4320 in top surface 4305, a solar panel may be secured against each shelf 4330 independently of a solar panel on the opposite shelf 4330.

Figure 44:
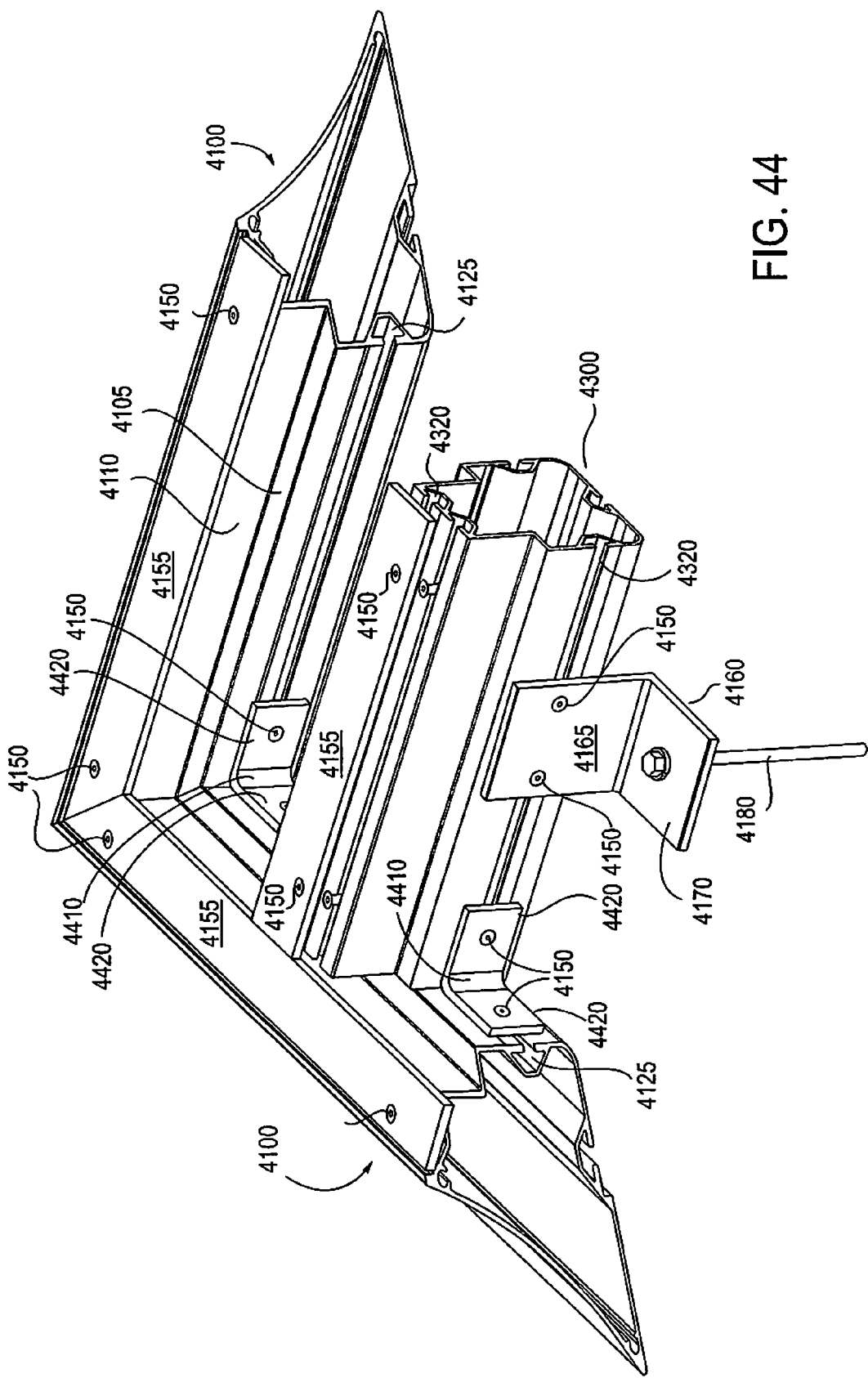
FIG. 44 provides an illustration of connections between embodiments of main rails of FIG. 41A and embodiments of the side rail of FIG. 43.

Putting the main rails of FIG. 41 and the center rail of FIG. 43, one may provide a frame for any number of solar panels—making up a solar array. FIG. 44 provides an illustration of connections between embodiments of main rails of FIG. 41A and embodiments of the side rail of FIG. 43. Frame 4400 is illustrated as including two main rails 4100 and a center rail 4300. As illustrated, the main rails 4100 meet at a 45 degree angle junction. This junction may be provided by cutting an extruded main rail at a 45 degree angle, for example. At this junction, a corner bracket 4410 is attached to each of the main rails 4100 through use of fasteners 4150 in the T-slots 4125 of rails 4100. The fasteners 4150 attach to the corner bracket 4410 at through-holes in each of the two sides 4420 of bracket 4410.

A similar attachment mechanism is provided between a main rail 4100 and a center rail 4300. Again, a corner bracket 4410 couples a main rail 4100 to a center rail 4300 through use of fasteners 4150 attached to through-holes of sides 4420 and T-slots of main rail 4100 (T-slot 4125) and center rail 4300 (T-slot 4320). Not illustrated is a second corner bracket 4410 attached to the other side of center rail 4300 and a corresponding main rail 4100. Also illustrated is top cap 4155 coupled to center rail 4300 on one side of center rail 4300—allowing for secure mounting of a solar panel within the confines of the main rails 4100 and center rail 4300, with the panel supported by shelf 4310 of center rail 4300 and by the shelves 4105 of main rails 4100. Note that the top caps 4155 of main rails 4100 are mounted to the main rails 4100 and also meet at a 45 degree angle. Also shown is bracket 4160 mounted to center rail 4300 by attachment of two fasteners 4150 through vertical surface 4165 to T-slot 4320 of center rail 4300.

Installation has been discussed with respect to mounting a frame or array on a roof top. Other surfaces may be suitable, such as a carport, or trellis-style mount. Similarly, ledges may extend from a building on which solar arrays may be mounted. Moreover, ground-mounting may be appropriate in some circumstances. For example, a ground mount may involve poles sunk in the ground, with the array attached to the poles in a relatively conventional manner, or with the array attached to a platform attached to a pole or poles, for example. Moreover, poles (or a more direct connection) may be used to attach a solar array to a structure which does not necessarily have a fixed location, such as a boat or yacht, for example.

One skilled in the art will appreciate that although specific examples and embodiments of the system and methods have been described for purposes of illustration, various modifications can be made. For example, embodiments of the present invention may be applied to many different types of structures and customers and to many different types of databases, systems and application programs. Moreover, features of one embodiment may be incorporated into other embodiments, even where those features are not described together in a single embodiment within the present document. Similarly, embodiments illustrated in this document may be implemented without all of the features or aspects illustrated or described.

What is claimed is:

1. An apparatus, comprising:
   a first corner support including two perpendicular members each having an internal support ledge;
   a second corner support including two perpendicular members each having an internal support ledge and coupled to the first corner support;
   a third corner support including two perpendicular members each having an internal support ledge and coupled to the second corner support;
   a fourth corner support including two perpendicular members each having an internal support ledge and coupled to the third corner support and the first corner support, the first, second, third and fourth corner supports forming a generally rectangular shape; and a solar panel having edges supported by the internal support ledges of the first, second, third and fourth corner supports;
   wherein each of the first, second, third and fourth corner supports have an upward extending flange at a first end and a downward extending flange at a second end, the upward extending flange and the downward extending flanges formed to define slots at the first end and second end of each corner support, the upward and downward extending flanges formed to interlock perpendicularly to a plane of the generally rectangular shape with the defined slots of corresponding flanges on other corner supports.

2. The apparatus of claim 1, wherein:
   each of the first, second, third and fourth corner supports have conduits on an underside of each corner support.

3. The apparatus of claim 1, wherein:
   each of the first, second, third and fourth corner supports have slots through a base portion of each corner support below the corresponding internal support ledge of each corner support.

4. The apparatus of claim 1, wherein:
   the first corner support and the second corner support have vertical slots extending below the internal support ledge at points laterally across the generally rectangular shape; and
   further comprising:
   a first cross-bar support having flanges extending from a first end and a second end, the flanges mating with the slots of the first and second corner supports, the cross-bar support under the solar panel.

5. The apparatus of claim 4, wherein:
   the third corner support and the fourth corner support have vertical slots extending below the internal support ledge at points laterally across the generally rectangular shape;

and
further comprising:
a second cross-bar support having flanges extending from a first end and a second end, the flanges mating with the slots of the third and fourth corner supports, the cross-bar support under the solar panel.

6. The apparatus of claim 1, wherein:
the first corner support, second corner support, third corner support and fourth corner support are filled with ballast material.

7. The apparatus of claim 6, wherein:
the ballast material is sand.

8. The apparatus of claim 6, wherein:
the ballast material is water.

9. The apparatus of claim 1, wherein:
the first corner support, second corner support, third corner support and fourth corner support are coupled to a supporting surface.

10. The apparatus of claim 9, wherein:
the supporting surface is a roof of a building.

11. The apparatus of claim 9, wherein:
the supporting surface is a surface projecting out of a building.

12. The apparatus of claim 9, wherein:
the first corner support, second corner support, third corner support and fourth corner support are coupled to a supporting surface through use of fasteners.

13. The apparatus of claim 1, wherein:
the solar panel is a panel of water heating material and associated pipes.

14. The apparatus of claim 2, wherein the conduits through each of the first, second, third, and fourth corner supports are configured to pass through electrical cables.

* * * * *